United States Patent
Chang et al.

(10) Patent No.: US 10,261,633 B2
(45) Date of Patent: Apr. 16, 2019

(54) TOUCH SENSITIVE PROCESSING APPARATUS, ELECTRONIC SYSTEM AND METHOD THEREOF FOR CONFIGURING INTERCONNECTION PARAMETERS WITH TOUCH PANEL

(71) Applicant: EGALAX_EMPIA TECHNOLOGY INC., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 1 day.

(21) Appl. No.: 15/723,289

(22) Filed: Oct. 3, 2017

(65) Prior Publication Data

US 2018/0095599 A1 Apr. 5, 2018

Related U.S. Application Data

(60) Provisional application No. 62/490,120, filed on Apr. 26, 2017, provisional application No. 62/403,934, filed on Oct. 4, 2016.

(51) Int. Cl.
*G06F 3/044* (2006.01)
*G06F 3/14* (2006.01)
*G06F 3/041* (2006.01)
*G09G 5/14* (2006.01)
*G06F 3/0354* (2013.01)

(52) U.S. Cl.
CPC ............ *G06F 3/0418* (2013.01); *G06F 3/044* (2013.01); *G06F 3/1423* (2013.01); *G09G 5/14* (2013.01); *G06F 3/03545* (2013.01); *G06F 2203/04103* (2013.01); *G06F 2203/04107* (2013.01); *G09G 2354/00* (2013.01); *G09G 2360/04* (2013.01)

(58) Field of Classification Search
CPC ...... G06F 3/0418; G06F 3/044; G06F 3/1423; G06F 3/03545; G06F 2203/04103; G06F 2203/04107; G09G 5/14; G09G 2354/00; G09G 2360/04; G09G 3/006
USPC ........................................................ 345/174
See application file for complete search history.

(56) References Cited

U.S. PATENT DOCUMENTS

| | | | | |
|---|---|---|---|---|
| 2008/0170040 A1* | 7/2008 | Tanabe | .................... | G06F 3/041 345/173 |
| 2008/0252608 A1* | 10/2008 | Geaghan | ................. | G06F 3/044 345/173 |
| 2011/0012860 A1* | 1/2011 | Yeh | ........................ | G06F 3/0416 345/174 |

(Continued)

*Primary Examiner* — Claire X Pappas
*Assistant Examiner* — Ngan T Pham Lu
(74) *Attorney, Agent, or Firm* — Wpat, PC

(57) ABSTRACT

The present application provides a touch sensitive processing method for configuring interconnection parameters between a touch panel and a touch sensitive processing apparatus in an electronic system. The method comprises: connecting, by an interconnection network of the apparatus, P first circuits of a first apparatus connector with a detecting circuit of the touch sensitive processing apparatus, respectively; detecting, by the detecting circuit, an impedance value of each of the first circuits sequentially via the interconnection network; and determining that there are M consecutive first touch sensitive electrodes connected to the M consecutive first circuits based on the impedance values.

49 Claims, 20 Drawing Sheets

(56) References Cited

U.S. PATENT DOCUMENTS

| | | | | |
|---|---|---|---|---|
| 2012/0161805 A1* | 6/2012 | Jung | ................. | G09G 3/006 |
| | | | | 324/754.07 |
| 2014/0192490 A1* | 7/2014 | Taylor | ................. | G06F 3/041 |
| | | | | 361/749 |
| 2015/0177314 A1* | 6/2015 | Tran | ................. | G06F 3/044 |
| | | | | 324/756.05 |
| 2016/0364068 A1* | 12/2016 | Cheng | ................. | G06F 3/0416 |
| 2017/0185185 A1* | 6/2017 | Yoo | ................. | G06F 3/044 |
| 2017/0185210 A1* | 6/2017 | Zhou | ................. | G06F 3/0412 |
| 2017/0205956 A1* | 7/2017 | Li | ................. | G06F 11/2221 |
| 2017/0235392 A1* | 8/2017 | Ishii | ................. | G06F 3/0416 |
| | | | | 345/174 |
| 2018/0173335 A1* | 6/2018 | Gong | ................. | G01R 31/02 |

\* cited by examiner

TOUCH SENSITIVE PROCESSING APPARATUS, ELECTRONIC SYSTEM AND METHOD THEREOF FOR CONFIGURING INTERCONNECTION PARAMETERS WITH TOUCH PANEL

CROSS REFERENCE TO RELATED APPLICATIONS

The present application claims the benefits of U.S. provisional patent application 62/403,934, filed on Oct. 4, 2016 and U.S. provisional patent application 62/490,120, filed on Apr. 26, 2017.

FIELD OF THE INVENTION

The present application is related to touch sensitive processing apparatuses, and more particularly, to a touch sensitive processing apparatus, an electronic system and a method thereof capable of automatically detecting interconnection parameters of touch sensitive electrodes; more particularly, to a touch sensitive processing apparatus, electronic system and a method for detecting defects on a touch panel; and more particularly, to an electronic system, a host and a method thereof for determining correspondences between multiple display processing apparatuses and multiple touch sensitive processing apparatuses.

BACKGROUND OF THE INVENTION

Modern consumer electronic apparatuses usually employ touch screens as their main input/output devices. A typical touch screen usually includes a plurality of touch sensitive electrodes. These touch sensitive electrodes are connected to a touch sensitive processing apparatus. A typical touch sensitive processing apparatus may include one or more packages of integrate circuits and may detect external conductive objects and/or styli approximating or touching the touch screen via the connected touch sensitive electrodes.

For manufacturers of the touch sensitive processing apparatus, a particular model of the touch sensitive processing apparatus can be designed such that it is compatible with numerous touch screen modules of different brands. These touch screen modules are usually of different sizes and with different amounts of touch sensitive electrodes. Therefore, for manufacturers of many different electronic apparatuses, it is advantages to use a single model of the touch sensitive processing apparatus for different touch screen modules in different electronic apparatuses. Once assembled, parameters of the touch sensitive processing apparatus have to be set according to the type of electronic apparatus. However, variations may occur in the manufacturing processes, even for touch screen modules of the same model. As such, the parameters of the touch sensitive processing apparatus need to be calibrated and tested in order for the touch sensitive function of the electronic apparatuses to meet the factory standard.

In addition, touch sensitive function is susceptible to electromagnetic interference around the electronic apparatus. For an electronic apparatus that meets the factory standard, the parameters may still have to be updated or calibrated when used in different locations in order to function properly under the specific environment. Therefore, a method that allows a user or a manufacturer to easily setup and/or test a touch sensitive processing apparatus in an electronic apparatus is needed.

Moreover, during manufacturing of touch screens or touch panels, deviations or even errors may occur, such as broken touch electrodes, deviations of line width, shapes or designs etc. When a touch sensitive processing apparatus uses such a defective touch panel, problems may occur. For example, errors in the locations of detected external conductive objects or styli may exceed the tolerance range, or even the touch sensitive processing apparatus fails to detect any external conductive objects or styli. Therefore, there is a need for a touch sensitive processing apparatus capable of detecting defects of a touch panel in order to identify the defects during testing on the assembly line.

On the other hand, there is a need for a method for detecting interconnection parameters between a touch panel and a touch sensitive processing apparatus, and a touch sensitive processing apparatus that implements the method. This method is capable of detecting the number of touch sensitive electrodes on the touch panel, and the specific circuits on the touch sensitive processing apparatus that are connected to these touch sensitive electrodes. On the other hand, there is a need for a touch sensitive processing method and apparatus for determining if there are defects in touch sensitive electrodes on a touch panel, and if so, the touch sensitive electrodes that are defective. On the other hand, there is a need for an electronic system for determining correspondences between multiple display processing apparatuses and multiple touch sensitive processing apparatuses to determine which display processing apparatus and which touch sensitive processing apparatus correspond to a specific one of multiple touch panels.

SUMMARY OF THE INVENTION

In an embodiment of the present invention, an electronic system for configuring interconnection parameters between a touch panel and a touch sensitive processing apparatus is provided. The electronic system includes a first apparatus connector, the touch panel and the touch sensitive processing apparatus. The touch panel including: M parallel first touch sensitive electrodes covering the touch panel, wherein M is a positive integer equal to or greater than 2; and a first touch sensitive electrode connector for sequentially bundling the M first touch sensitive electrodes. The first apparatus connector is used for sequentially bundling P first circuits that are connected with the M first touch sensitive electrodes and connecting with the first touch sensitive electrode connector, wherein P is a positive integer greater than M. The touch sensitive processing apparatus includes: a detecting circuit; an interconnection network for connecting the P first circuits of the first apparatus connector with the detecting circuit; and a microprocessor connected with the detecting circuit and the interconnection network and configured for detecting, by the detecting circuit, an impedance value of each of the P first circuits sequentially via the interconnection network to determine that there are M consecutive first circuits in the P first circuits connected with the M consecutive first touch sensitive electrodes based on the impedance values. As such, this embodiment is capable of detecting how many first touch sensitive electrodes there are, and which first circuits in the P first circuits are connected with these first touch sensitive electrodes.

In an embodiment of the present invention, a touch sensitive processing apparatus for configuring interconnection parameters between a touch panel in an electronic system and the touch sensitive processing apparatus is provided. The touch panel includes M parallel first touch sensitive electrodes covering the touch panel, wherein M is a positive integer equal to or greater than 2, and a first touch sensitive electrode connector for sequentially bundling the M first touch sensitive electrodes. The electronic system includes a first apparatus connector for sequentially bundling P first circuits that are connected with the M first touch sensitive electrodes and connecting with the first touch sensitive electrode connector, wherein P is a positive integer greater than M. The touch sensitive processing apparatus includes: a detecting circuit, an interconnection network for connecting the P first circuits of the first apparatus connector with the detecting circuit, and a microprocessor connected with the detecting circuit and the interconnection network. The microprocessor is configured for detecting, by the detecting circuit, an impedance value of each of the P first circuits sequentially via the interconnection network to determine that there are M consecutive first circuits in the P first circuits connected with the M consecutive first touch sensitive electrodes based on the impedance values. As such, this embodiment is capable of detecting how many first touch sensitive electrodes there are, and which first circuits in the P first circuits are connected with these first touch sensitive electrodes.

In an embodiment of the present invention, a touch sensitive processing method for configuring interconnection parameters between a touch panel and the touch sensitive processing apparatus in an electronic system is provided. The touch panel includes M parallel first touch sensitive electrodes covering the touch panel, wherein M is a positive integer equal to or greater than 2, and a first touch sensitive electrode connector for sequentially bundling the M first touch sensitive electrodes. The electronic system includes a first apparatus connector for sequentially bundling P first circuits that are connected with the M first touch sensitive electrodes and connecting with the first touch sensitive electrode connector, wherein P is a positive integer greater than M. The touch sensitive processing method includes: connecting, by an interconnection network of the touch sensitive processing apparatus, the P first circuits of the first apparatus connector with a detecting circuit of the touch sensitive processing apparatus; and having the detecting circuit detect, via the interconnection network, an impedance value of each of the P first circuits sequentially via the interconnection network to determine that there are M consecutive first circuits in the P first circuits connected with the M consecutive first touch sensitive electrodes based on the impedance values. As such, this embodiment is capable of detecting how many first touch sensitive electrodes there are, and which first circuits in the P first circuits are connected with these first touch sensitive electrodes.

In an embodiment of the present invention, an electronic system for configuring interconnection parameters between a touch panel and a touch sensitive processing apparatus is provided. The electronic system includes: the touch panel and the touch sensitive processing apparatus. The touch panel includes M parallel first touch sensitive electrodes covering the touch panel, wherein M is a positive integer equal to or greater than 2; N parallel second touch sensitive electrodes covering the touch panel, wherein each first touch sensitive electrode intersects with the N second touch sensitive electrodes to form N touch sensitive sensing areas, and N is a positive integer equal to or greater than 2; a first touch sensitive electrode connector for sequentially bundling the M first touch sensitive electrodes; and a second touch sensitive electrode connector for sequentially bundling the N second touch sensitive electrodes. The electronic system further includes: a first apparatus connector for sequentially bundling P first circuits that are connected with the M first touch sensitive electrodes and connecting with the first touch sensitive electrode connector, wherein P is a positive integer greater than M, and a second apparatus connector for sequentially bundling Q second circuits that are connected with the N second touch sensitive electrodes and connecting with the second touch sensitive electrode connector, wherein Q is a positive integer greater than N. The touch sensitive processing apparatus includes: a detecting circuit, a drive circuit; an interconnection network for connecting the P first circuits of the first apparatus connector with the drive circuit and for connecting the Q second circuits of the second apparatus connector with the detecting circuit; and a microprocessor connected with the drive circuit, the detecting circuit and the interconnection network. The microprocessor is configured for having the drive circuit emit a drive signal from at least one of the first touch sensitive electrodes via the interconnection network; and having the detecting circuit detect, via the interconnection network, that there are N consecutive second circuits in the Q second circuits connected with the N consecutive second touch sensitive electrodes. Accordingly, this embodiment is capable of knowing how many second circuits are connected with the second touch sensitive electrodes, and which of these second circuits are connected with the second touch sensitive electrodes.

In an embodiment of the present invention, a touch sensitive processing apparatus for configuring interconnection parameters between a touch panel and the touch sensitive processing apparatus in an electronic system is provided. The touch panel includes M parallel first touch sensitive electrodes covering the touch panel, wherein M is a positive integer equal to or greater than 2; and N parallel second touch sensitive electrodes covering the touch panel, wherein each first touch sensitive electrode intersects with the N second touch sensitive electrodes to form N touch sensitive sensing areas, and N is a positive integer equal to or greater than 2. The touch panel further includes: a first touch sensitive electrode connector for sequentially bundling the M first touch sensitive electrodes; and a second touch sensitive electrode connector for sequentially bundling the N second touch sensitive electrodes. The electronic system includes: a first apparatus connector and a second apparatus connector, wherein the first apparatus connector is used for sequentially bundling P first circuits that are connected with the M first touch sensitive electrodes and connecting with the first touch sensitive electrode connector, wherein P is a positive integer greater than M, and the second apparatus connector is used for sequentially bundling Q second circuits that are connected with the N second touch sensitive electrodes and connecting with the second touch sensitive electrode connector, wherein Q is a positive integer greater than N. The touch sensitive processing apparatus includes: a detecting circuit, a drive circuit; an interconnection network for connecting the P first circuits of the first apparatus connector with the drive circuit and for connecting the Q second circuits of the second apparatus connector with the detecting circuit; and a microprocessor connected with the drive circuit, the detecting circuit and the interconnection network. The microprocessor is configured for having the drive circuit emit a drive signal from at least one of the first touch sensitive electrodes via the interconnection network; and having the detecting circuit detect, via the interconnection network, that there are N consecutive second circuits in the Q second circuits connected with the N consecutive second touch sensitive electrodes. Accordingly, this embodiment is capable of knowing how many second circuits are connected with the second touch sensitive electrodes, and which of these second circuits are connected with the second touch sensitive electrodes.

In an embodiment of the present invention, a touch sensitive processing method for configuring interconnection parameters between a touch panel and a touch sensitive processing apparatus in an electronic system is provided. The touch panel includes M parallel first touch sensitive electrodes covering the touch panel, wherein M is a positive integer equal to or greater than 2; and N parallel second touch sensitive electrodes covering the touch panel, wherein each first touch sensitive electrode intersects with the N second touch sensitive electrodes to form N touch sensitive sensing areas, and N is a positive integer equal to or greater than 2. The touch panel further includes: a first touch sensitive electrode connector for sequentially bundling the M first touch sensitive electrodes; and a second touch sensitive electrode connector for sequentially bundling the N second touch sensitive electrodes. The electronic system includes: a first apparatus connector and a second apparatus connector, wherein the first apparatus connector is used for sequentially bundling P first circuits that are connected with the M first touch sensitive electrodes and connecting with the first touch sensitive electrode connector, wherein P is a positive integer greater than M, and the second apparatus connector is used for sequentially bundling Q second circuits that are connected with the N second touch sensitive electrodes and connecting with the second touch sensitive electrode connector, wherein Q is a positive integer greater than N. The touch sensitive processing method includes: connecting, via an interconnection network, the P first circuits of the first apparatus connector with a drive circuit of the touch sensitive processing apparatus, and the Q second circuits of the second apparatus connector with a detecting circuit of the touch sensitive processing apparatus; having the drive circuit emit a drive signal from at least one of the first touch sensitive electrodes via the interconnection network; and having the detecting circuit detect, via the interconnection network, that there are N consecutive second circuits in the Q second circuits connected with the N consecutive second touch sensitive electrodes. Accordingly, this embodiment is capable of knowing how many second circuits are connected with the second touch sensitive electrodes, and which of these second circuits are connected with the second touch sensitive electrodes.

In an embodiment of the present invention, an electronic system for detecting defects of a touch panel is provided. The electronic system includes: a host, the touch panel and a touch sensitive processing apparatus. The host is used for executing an operating system to control the electronic system. The touch panel includes a plurality of parallel first touch sensitive electrodes and a plurality of parallel second touch sensitive electrodes, wherein the plurality of first and second touch sensitive electrodes form a plurality of touch sensitive areas. The touch sensitive processing apparatus includes: a detecting circuit, a drive circuit; an interconnection network for connecting the plurality of second touch sensitive electrodes with the detecting circuit and for connecting at least one of the first touch sensitive electrodes with the drive circuit; and a microprocessor configured for having the drive circuit emit a drive signal from the at least one of the first touch sensitive electrodes; having the detecting circuit detect the drive signal via the plurality of second touch sensitive electrodes; calculating a phase shift between each neighboring pair of second touch sensitive electrodes of the plurality of second touch sensitive electrodes; and when the phase shift is larger than a phase shift threshold, determining at least one of the two second touch sensitive electrodes is faulty and reporting information related to the defect to the host. As such, this embodiment is capable of detecting which second touch sensitive electrodes are faulty, and informing the host and in turn the user about the defects.

In an embodiment of the present invention, a touch sensitive processing apparatus for detecting defects of a touch panel of an electronic system is provided. The electronic system includes: a host and the touch panel. The host is used for executing an operating system to control the electronic system. The touch panel includes a plurality of parallel first touch sensitive electrodes and a plurality of parallel second touch sensitive electrodes, wherein the plurality of first and second touch sensitive electrodes form a plurality of touch sensitive areas. The touch sensitive processing apparatus includes: a detecting circuit, a drive circuit; an interconnection network for connecting the plurality of second touch sensitive electrodes with the detecting circuit and for connecting at least one of the first touch sensitive electrodes with the drive circuit; and a microprocessor configured for having the drive circuit emit a drive signal from the at least one of the first touch sensitive electrodes; having the detecting circuit detect the drive signal via the plurality of second touch sensitive electrodes; calculating a phase shift between each neighboring pair of second touch sensitive electrodes of the plurality of second touch sensitive electrodes; and when the phase shift is larger than a phase shift threshold, determining at least one of the two second touch sensitive electrodes is faulty and reporting information related to the defect to the host. As such, this embodiment is capable of detecting which second touch sensitive electrodes are faulty, and informing the host and in turn the user about the defects.

In an embodiment of the present invention, a touch sensitive processing method adaptable to a touch sensitive processing apparatus for detecting defects of a touch panel of an electronic system is provided. The electronic system includes: a host, the touch sensitive processing apparatus and the touch panel. The host is used for executing an operating system to control the electronic system. The touch panel includes a plurality of parallel first touch sensitive electrodes and a plurality of parallel second touch sensitive electrodes, wherein the plurality of first and second touch sensitive electrodes form a plurality of touch sensitive areas. The touch sensitive processing apparatus includes: a detecting circuit, a drive circuit and an interconnection network. The touch sensitive processing method includes: connecting, via the interconnection network, the plurality of second touch sensitive electrodes with the detecting circuit, and the plurality of first touch sensitive electrodes with the drive circuit; having the drive circuit emit a drive signal from at least one of the first touch sensitive electrodes; having the detecting circuit detect the drive signal via the plurality of second touch sensitive electrodes; calculating a phase shift between each neighboring pair of second touch sensitive electrodes of the plurality of second touch sensitive electrodes; and when the phase shift is larger than a phase shift threshold, determining at least one of the two second touch sensitive electrodes is faulty and reporting information related to the defect to the host. As such, this embodiment is capable of detecting which second touch sensitive electrodes are faulty, and informing the host and in turn the user about the defects.

In an embodiment of the present invention, a host for determining correspondences between a plurality of display processing apparatuses and a plurality of touch sensitive processing apparatuses is provided. The host is connected with an electronic system including a first touch screen and a second touch screen. The first touch screen includes a first display interface and a first touch sensitive interface. The second touch screen includes a second display interface and a second touch sensitive interface. The host includes: a first display processing apparatus for connecting with the first display interface; a second display processing apparatus for connecting with the second display interface; a first touch sensitive processing apparatus for connecting with one of the first display interface and the second display interface; a second touch sensitive processing apparatus for connecting with the other one of the first display interface and the second display interface; a peripheral interface for connecting with the first display processing apparatus, the second display processing apparatus, the first touch sensitive processing apparatus and the second touch sensitive processing apparatus; and a processor connected with the peripheral interface configured for: having the first display processing apparatus display a first prompt message via the first touch screen; having the first touch sensitive processing apparatus and the second touch sensitive processing apparatus receive a first touch event; when the first touch event came from the first touch sensitive processing apparatus, then determining that the first touch screen is connected with the first touch sensitive processing apparatus; and when the first touch event came from the second touch sensitive processing apparatus, then determining that the first touch screen is connected with the second touch sensitive processing apparatus. Accordingly, this embodiment is capable of determining the correspondences between a plurality of display processing apparatuses and a plurality of touch sensitive processing apparatuses.

In an embodiment of the present invention, a method adaptable to a processor of a host of an electronic system for determining correspondences between a plurality of display processing apparatuses and a plurality of touch sensitive processing apparatuses is provided. The electronic system includes a first touch screen and a second touch screen. The first touch screen includes a first display interface and a first touch sensitive interface. The second touch screen includes a second display interface and a second touch sensitive interface. The host includes: a first display processing apparatus for connecting with the first display interface; a second display processing apparatus for connecting with the second display interface; a first touch sensitive processing apparatus for connecting with one of the first display interface and the second display interface; a second touch sensitive processing apparatus for connecting with the other one of the first display interface and the second display interface; and a peripheral interface for connecting with the first display processing apparatus, the second display processing apparatus, the first touch sensitive processing apparatus and the second touch sensitive processing apparatus. The method includes: having the first display processing apparatus display a first prompt message via the first touch screen; having the first touch sensitive processing apparatus and the second touch sensitive processing apparatus receive a first touch event; when the first touch event came from the first touch sensitive processing apparatus, then determining that the first touch screen is connected with the first touch sensitive processing apparatus; and when the first touch event came from the second touch sensitive processing apparatus, then determining that the first touch screen is connected with the second touch sensitive processing apparatus. Accordingly, this embodiment is capable of determining the correspondences between a plurality of display processing apparatuses and a plurality of touch sensitive processing apparatuses.

In an embodiment of the present invention, an electronic system for determining correspondences between a plurality of display processing apparatuses and a plurality of touch sensitive processing apparatuses is provided. The electronic system includes a first touch screen, a second touch screen and a host. The first touch screen includes a first display interface and a first touch sensitive interface. The second touch screen includes a second display interface and a second touch sensitive interface. The host includes: a first display processing apparatus for connecting with the first display interface; a second display processing apparatus for connecting with the second display interface; a first touch sensitive processing apparatus for connecting with one of the first display interface and the second display interface; a second touch sensitive processing apparatus for connecting with the other one of the first display interface and the second display interface; a peripheral interface for connecting with the first display processing apparatus, the second display processing apparatus, the first touch sensitive processing apparatus and the second touch sensitive processing apparatus; and a processor connected with the peripheral interface configured for: having the first display processing apparatus display a first prompt message via the first touch screen; having the first touch sensitive processing apparatus and the second touch sensitive processing apparatus receive a first touch event; when the first touch event came from the first touch sensitive processing apparatus, then determining that the first touch screen is connected with the first touch sensitive processing apparatus; and when the first touch event came from the second touch sensitive processing apparatus, then determining that the first touch screen is connected with the second touch sensitive processing apparatus. Accordingly, this embodiment is capable of determining the correspondences between a plurality of display processing apparatuses and a plurality of touch sensitive processing apparatuses.

DETAILED DESCRIPTION OF THE EMBODIMENTS

The present invention is described by the following specific embodiments. However, in addition to those embodiments disclosed herein, the present invention can be widely applied to other embodiments. The scope of the present invention is not limited by these embodiments, but rather those set forth in the claims. In order to facilitate a clear description and for those skilled in the art to readily understand the contents of the present invention, some portions of the diagrams are not drawn to scale; ratios of some elements with respect to other elements are exaggerated; and some details that are not relevant to the present invention are omitted for conciseness of the diagrams. Moreover, additional steps can be added between the steps described in various flowcharts of the present invention. If no cause-and-effect is specifically stated, the present invention does not limit the order in which the steps are executed.

Figure 1:
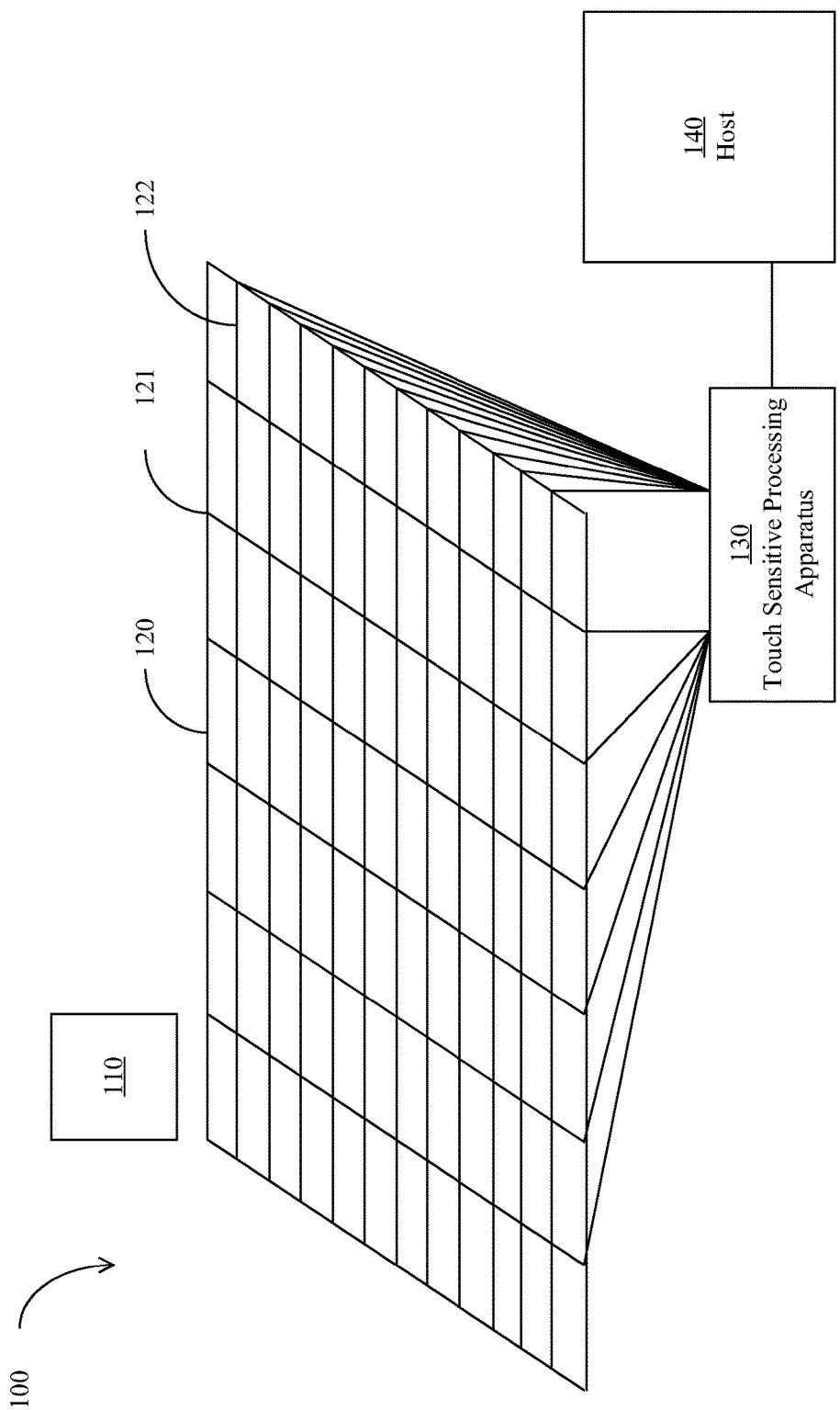
FIG. 1 is a schematic diagram depicting an electronic apparatus 100 in accordance with an embodiment of the present invention.

Referring to FIG. 1, a schematic diagram depicting an electronic apparatus 100 in accordance with an embodiment of the present invention is shown. The electronic apparatus 100 includes an optional stylus 110, a touch screen 120, a touch sensitive processing apparatus 130 connected with the touch screen 120, and a host 140 connected to the touch sensitive processing apparatus 130.

The touch screen 120 can be a simple touch panel or a touch screen controlled by the host to display contents. The touch screen 120 may include a plurality of parallel first electrodes 121 and a plurality of parallel second electrodes 122. The first electrodes 121 and the second electrodes 122 may form a plurality of intersecting sensing areas, and are connected to the touch sensitive processing apparatus 130.

The host 140 can be implemented using a plurality of computer frameworks. In an embodiment, it adopts a personal computer framework, including, for example, a CPU, a memory, a Northbridge, a Southbridge, a storage device such as a hard disk, a keyboard and a mouse. The touch sensitive processing apparatus 130 may be connected to the host 140 via a host interface. For example, the host interface may be PCI, PCI Express, or I²C interface or the like for connecting to the Southbridge. In another embodiment, the host 140 adopts a smart computer framework, including, for example, an application program processor, a modem processor, a memory, a USB master, a flash memory chip, a camera, a microphone and etc. In this example, the host interface may be a USB, I²C or UART interface or the like for connecting directly with the application program processor, or the USB master. When the host 140 is initiated, the touch sensitive processing apparatus 130 uses the first electrodes 121 and the second electrodes 122 to detect any external conductive objects, such as a stylus 110 and/or fingers or the like, on the touch screen 120, and report touch events to the host 140, an operating system or an application program executed by the host 140 via the host interface 132.

The host 140 of FIG. 1 can be used for executing an operating system and an application program executed in the operating system environment. According to an embodiment of the present invention, an application program for calibrating touch sensitive functions is provided to be executed under the operating system environment in the host 140 of FIG. 1. It is called a calibration program. The calibration program can be connected with the touch sensitive processing apparatus 130 via the host interface described above for communicating therewith.

In addition to touch sensitive processing apparatus 130 described, in an embodiment, the calibration program may also be connected to a display control apparatus of the host 140 or its driver program. The display control apparatus is used for controlling the display of the touch screen 120. The calibration program is at least capable of obtaining basic parameters of the touch screen 120, such as the resolution, the size, the refreshing rate etc. from the operating system or the display control apparatus.

Some of the possible functions that can be implemented by the calibration program are introduced below. The calibration program does not necessarily need to implement all of the functions described below, but only one or an arbitrary combinations thereof.

In an embodiment, the calibration program may search for the touch sensitive processing apparatus 130 connected with the host 140, and display one or an arbitrary combination of the following information: the host interface (e.g. USB or I²C) and the type, model, firmware version, version verification number, firmware vendor, firmware core version number, number of inputs (fingers) supported by the firmware of the touch sensitive processing apparatus 130.

Figure 2:
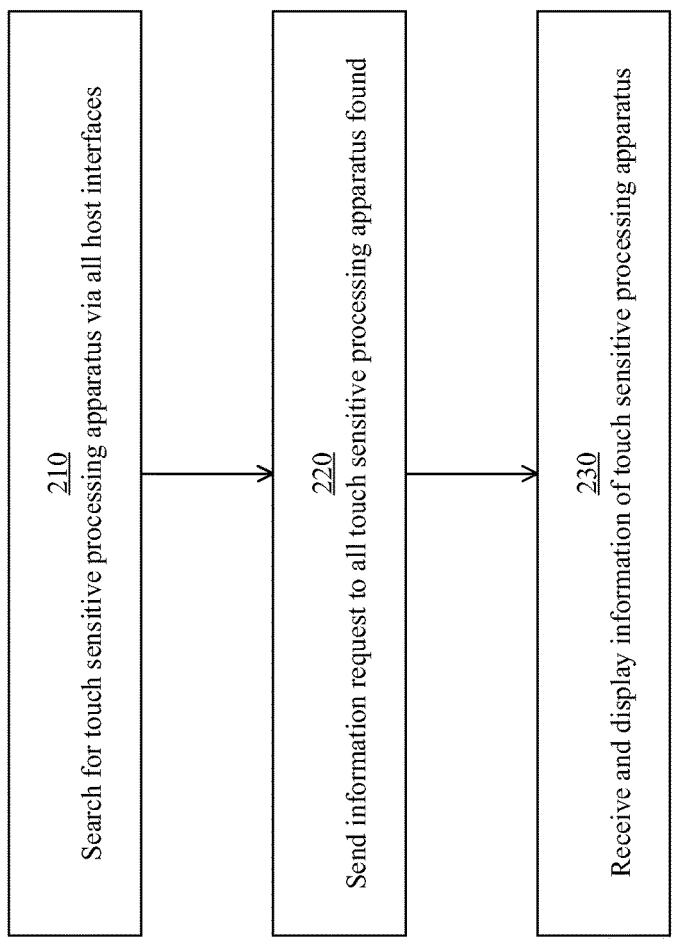
FIG. 2 is a flowchart illustrating a search method according to the above embodiment.

As shown in FIG. 2, a flowchart illustrating a search method according to the above embodiment is shown. In step 210, a touch sensitive processing apparatus 130 is searched via all of the host interfaces. Then, in step 220, an information request is sent to each of the touch sensitive processing apparatus 130 found. Finally, in step 230, information of the touch sensitive processing apparatus 130 is received and displayed.

In an embodiment, the calibration program may control an audio output of the host 140 in order to generate a sound in response to one of the following circumstances: the touch sensitive processing apparatus 130 detects an external conductive object or an active stylus approximating or touching the touch screen 120, and/or the touch sensitive processing apparatus 130 detects that an external conductive object (e.g. a finger) or an active stylus has stopped approximating or touching the touch screen 120. The calibration program may further control the frequency and/or the duration of the sound, so that a user using the calibration program may know precisely whether an external conductive object or an active stylus is approximating or touching the touch screen 120.

In an embodiment, the calibration program may pair up a touch screen 120 with a touch sensitive processing apparatus 130. In an example, the calibration program may detect the number of screens connected to the host 140 via the display control apparatus, and also the number of touch sensitive processing apparatuses 130 connected with the host 140 using the embodiment described with respect to FIG. 2. When the number of screens or touch sensitive processing apparatuses 130 is greater than one, pair-up can be carried out. Since not all screens are touch screens 120, so the number of screens have to be greater than or equal to the number of touch sensitive processing apparatuses 130. Therefore, the calibration program may allow the screens to sequentially display an instruction asking the user to touch the screen that is currently displaying the instruction. In order to avoid touching by accident, a more complicated gesture may be requested. When a particular touch sensitive processing apparatus 130 detects the above touch or gesture, the screen displaying the instruction may be paired up with the touch sensitive processing apparatus 130 receiving the touch signal or the gesture. The calibration program may perform the same to all of the unpaired screens until all of the touch sensitive processing apparatuses 130 are paired up. Of course, it is possible that a touch sensitive processing apparatus 130 is not paired up with a screen, then the calibration program may further display a message on the unpaired screen. If the user determines that a particular touch screen 120 is not paired up with a touch sensitive processing apparatus 130, then it is understood that the touch sensitive electrodes of the touch screen 120 are not connected with that touch sensitive processing apparatus 130.

After pairing, in the displayed information related to the touch sensitive processing apparatus 130 described above, information related to the paired touch screen 120 can also be added. For example, the dimensions of the touch screen, the number of first electrodes 121 and second electrodes 122, or parameters derived therefrom.

In an embodiment, the calibration program may ask the touch screen 120 to display a warning message to warn users not to touch the touch screen 120. During this stage, the calibration program may instruct the touch sensitive processing apparatus 130 to perform hardware detection of the touch screen 120.

Figure 3A:
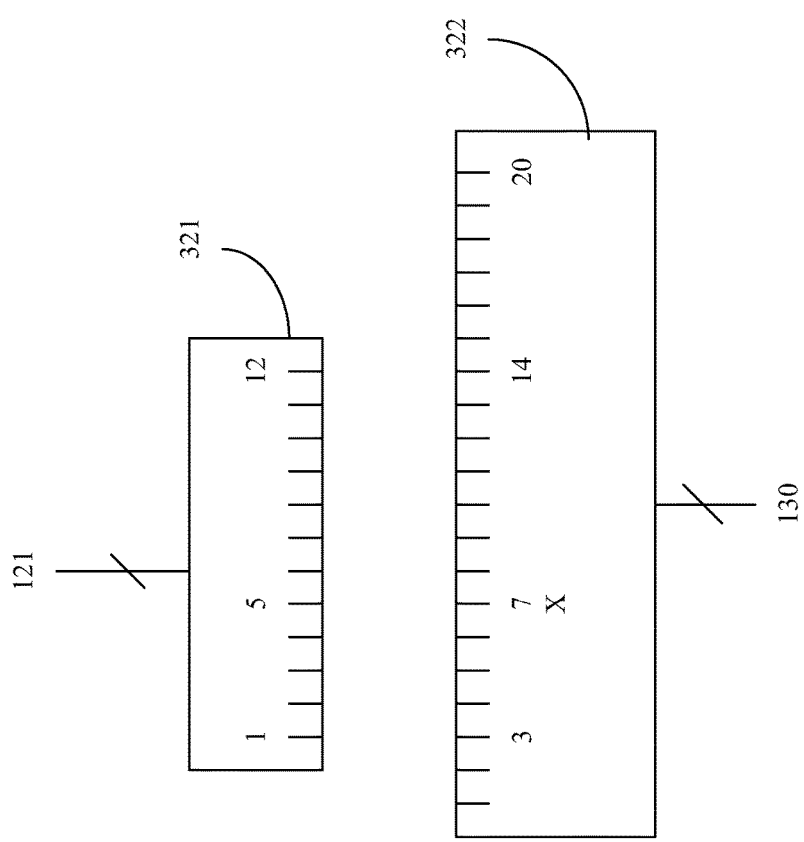
FIG. 3A is a schematic diagram of a touch sensitive electrode connecting interface in accordance with an embodiment of the present invention.

Referring to FIG. 3A, a schematic diagram of a touch sensitive electrode connecting interface in accordance with an embodiment of the present invention is shown. The connecting interface includes a touch sensitive electrode connector 321 and a touch sensitive processing apparatus connector 322. The touch sensitive electrode connector 321 may be connected to the first electrodes 121 or the second electrodes 122 described before. In the example of FIG. 3A, the touch sensitive electrode connector 321 bundles twelve first electrodes 121. The touch sensitive processing apparatus connector 322 may be connected to a touch sensitive electrode interface of the touch sensitive processing apparatus 130. In the example of FIG. 3A, the touch sensitive processing apparatus connector 322 bundles twenty touch sensitive electrode interfaces. In other words, the touch sensitive processing apparatus 130 is designed to accommodate up to twenty first electrodes 121, but in the example of FIG. 3A, the touch screen 120 connected with the touch sensitive processing apparatus 130 only has twelve first electrodes 121.

During assembly of the electronic apparatus 100, an assembly personnel may not connect the $1^{st}$ pin of the touch sensitive electrode connector 321 to the $1^{st}$ pin of the touch sensitive processing apparatus connector 322, resulting in a displacement shown in FIG. 3A, i.e. the $1^{st}$ pin of the touch sensitive electrode connector 321 is actually connected to the $3^{rd}$ pin of the touch sensitive processing apparatus connector 322. The assembly personnel may even reverse the touch sensitive electrode connector 321, resulting in a situation shown in FIG. 3B, i.e. the $1^{st}$ pin of the touch sensitive electrode connector 321 is connected to the $14^{th}$ pin of the touch sensitive processing apparatus connector 322, and the $12^{th}$ pin of the touch sensitive electrode connector 321 is connected to the $3^{rd}$ pin of the touch sensitive processing apparatus connector 322. Moreover, another possible error is to connect the connector for the first electrodes 121 to the interface of the second electrodes 122, and connecting the connector for the second electrodes 122 to the interface of the first electrodes 121. These are errors commonly made during assembly of the electronic apparatus 100. Once assembly is completed, the calibration program and the touch sensitive processing apparatus 130 of the present application can be used to detect the connection relations of the hardware and set the internal parameters of the touch sensitive processing apparatus 130 to adapt to the connection displacements of the hardware.

Figure 3B:
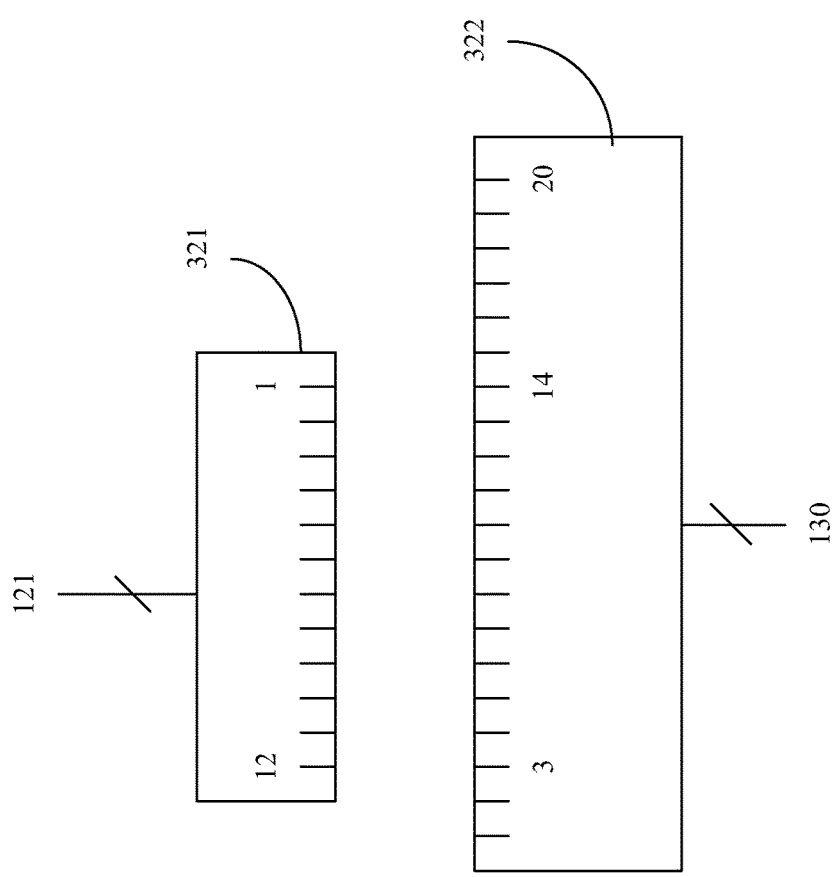
FIG. 3B is another schematic diagram of the touch sensitive electrode connecting interface in accordance with an embodiment of the present invention.

In an embodiment, when the calibration program instructs the touch screen 120 to display a "no touching" message, the calibration program may instruct the touch sensitive processing apparatus 130 to perform detection of electrode connections. Since the first electrodes 121 and the second electrodes 122 have resistances, when connected to the first electrodes 121 or the second electrodes 122, the touch sensitive processing apparatus 130 may detect a change in the resistance of the interface. In the examples of FIGS. 3A and 3B, the touch sensitive processing apparatus 130 may detect a change in resistance in each of the $3^{rd}$ to the $14^{th}$ pins of the touch sensitive processing apparatus connector 322 and determine that there are twelve first electrodes 121. Similarly, the same detection can be performed for the second electrodes 122 to determine the number of the second electrodes 122 and the starting and ending locations of the connected pins.

The resistances of the twelve first electrodes 121 may be different but should fall within a specific range. If one of the first electrodes 121 is different in resistance from the others, then the particular first electrode 121 is presumably broken or having poor electrical contact. For example, the resistances of the $7^{th}$ pin and the $1^{st}$ pin (unconnected) of the touch sensitive processing apparatus connector 322 are in the same range, then the $5^{th}$ first electrode 121 can be seen as broken or having poor contact. The calibration program may also issue a warning to the user. Moreover, the quantities of the first electrodes 121 and the second electrodes 122 are often designed to be in even numbers. If an odd number of first electrodes 121 or second electrodes 122 is detected, then the calibration program may also issue a warning to the user.

In another embodiment, the first electrodes 121 may be instructed to sequentially send out a drive signal, and it can be determined whether the connected second electrodes 122 receive the drive signal. If a particular second electrode 122 fails to receive the corresponding drive signal, then the second electrodes 122 is determined to be broken or have poor contact. If a particular first electrode 121 is instructed to send a drive signal, but none of the second electrodes 122 receives the corresponding drive signal, then this first electrode is determined to be broken or have poor contact. On the contrary, the sending/receiving roles of the first electrodes 121 and the second electrodes 122 can also be swapped for verification.

In an embodiment, in addition to automatic detection, calibration program allows the user to manually input a pin-number parameter for the first electrodes 121 and the second electrodes 122.

In addition to displacement and reverse placement described above with respect to FIGS. 3A and 3B, respectively, the first electrodes 121 may be connected to the connector for the second electrodes of the touch sensitive processing apparatus 130, and the second electrodes 122 connected to the connector for the first electrodes of the touch sensitive processing apparatus 130. Typically, the quantities of the first electrodes 121 and the second electrodes 122 on the touch screen 120 are different, for example, with a ratio of 20:30. If the above resistance detection results in a ratio of 30:20, then it can be determined that a swap between the first and second electrodes 121 and 122 has happened. The touch sensitive processing apparatus 130 can then reset an interconnection network or a router, so as to swap the two using software or firmware without having to take the electronic apparatus 100 apart to rewire the circuits.

In an embodiment, when the circuit connections of the first electrodes 121 and the second electrodes 122 are determined to be correct, the results of the above mutual capacitive sensing can be stored as baseline values.

In an embodiment, the calibration program may instruct the touch screen 120 to issue a warning message prompting the user to touch the touch screen 120 with a finger, an external conductive object, or a passive stylus. As the external conductive object may introduce an external electromagnetic interference into the first electrodes 121 and the second electrodes 122 of the touch screen 120, the touch sensitive processing apparatus 130 can scan the frequency of the interference signal via the first electrodes 121 and/or the second electrodes 122 at the same time.

For example, when performing mutual capacitive detection, the touch sensitive processing apparatus 130 may send drive signals at N different frequencies. When the frequency of the electromagnetic interference signal brought by an external conductive object is harmonic or the same as one or some of frequencies of the N drive signals, at least one frequency that is less affected by the interference is found and used during subsequent mutual capacitive detection.

Figure 4:
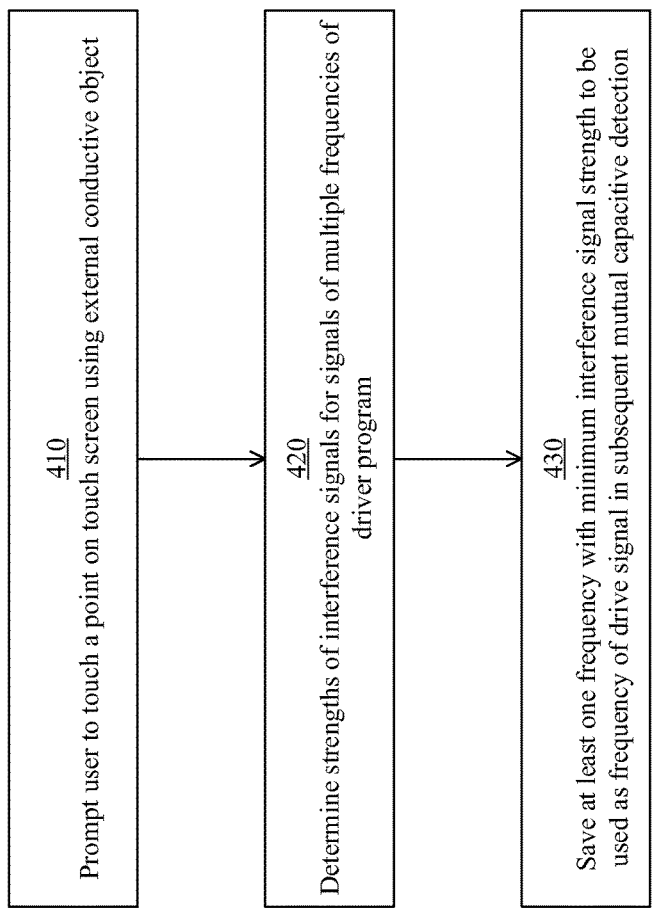
FIG. 4 is a flowchart illustrating a method for detecting an interference frequency in accordance with an embodiment of the present invention.

Referring to FIG. 4, a flowchart illustrating a method for detecting an interference frequency in accordance with an embodiment of the present invention is shown. In step 410, the calibration program instructs the touch screen 120 to prompt the user to touch a point on the touch screen 120 using an external conductive object. Then, in step 420, the touch sensitive processing apparatus 130 uses mutual capacitive detection to determine whether the external conductive object is touching the touch screen 120. If so, then the strengths of interference signals for the signals of multiple frequencies are determined. In step 430, the touch sensitive processing apparatus 130 saves at least one frequency with the minimum interference signal strength, so that this frequency is used as the drive signal in subsequent mutual capacitive detection.

In an embodiment, the calibration program allows the user to see the frequency currently chosen and lets the user decide whether to turn on a frequency change function and adjust the sensitivity of frequency hopping of each frequency (i.e. the interference signal strength value for changing a frequency). The user may also manually choose different frequencies and test the mutual capacitive detection function to determine which frequency results in the least interference.

Return to FIG. 3B, the connectors may be reversely connected. In step 420 of FIG. 4, the user may be prompted to press a certain location to detect these two situations. In an example, there are twenty first electrodes 121 and thirty second electrodes 122. Assuming, in step 410, the user is prompted to press a location near the $5^{th}$ first electrode 121 and the $10^{th}$ second electrode 122, but instead the received location indicates it is near the $16^{th}$ first electrode 121 and the $10^{th}$ second electrode 122, then it can be determined that there is connection displacement in the first electrodes 121. The touch sensitive processing apparatus 130 may store the setting of the reverse connection and use the $20^{th}$ pin of the first electrode connector as the $1^{st}$ pin of the first electrode connector, and the $1^{st}$ pin of the first electrode connector as the $20^{th}$ pin of the first electrode connector, for example. Similarly, if there is a reverse connection in the second electrodes 122, the connector can be reset according to the method above. The touch sensitive processing apparatus 130 can reset an interconnection network or a router, so that the direction of the connector can be swapped using software or firmware without having to take the electronic apparatus 100 apart to rewire the circuits.

In an embodiment, once the touch sensitive processing apparatus 130 has found the best or a preferred frequency for the drive signal, then the calibration program may instruct the touch screen 120 to display a "no touching" warning. When no external conductive object is detected, then calibration setup can be made to the characteristic of each touch sensitive electrode on the touch screen 120. U.S. patent application Ser. Nos. 13/545,291, 13/896,487 and 15/241,552, and their relevant applications filed to various countries by the present inventor have disclosed details of this calibration setup. The touch sensitive processing apparatus 130 may perform relevant detection and setup steps in order to use these parameters during subsequent touch sensitive processing, in particular, providing transmission and reception parameters for the drive signal of analog front-end processing portion corresponding to each first electrode 121.

In an embodiment, the calibration program may instruct the touch screen 120 to display four dots and prompt the user to sequentially select the four dots in order to obtain a correction equation group for screen display dots and touch sensitive dots. U.S. patent application Ser. No. 14/140,795 and its relevant applications filed to various countries by the applicant have disclosed details of such correction. The touch sensitive processing apparatus 130 may perform relevant detection and setup steps in order to use these parameters during subsequent touch sensitive processing.

Figure 5:
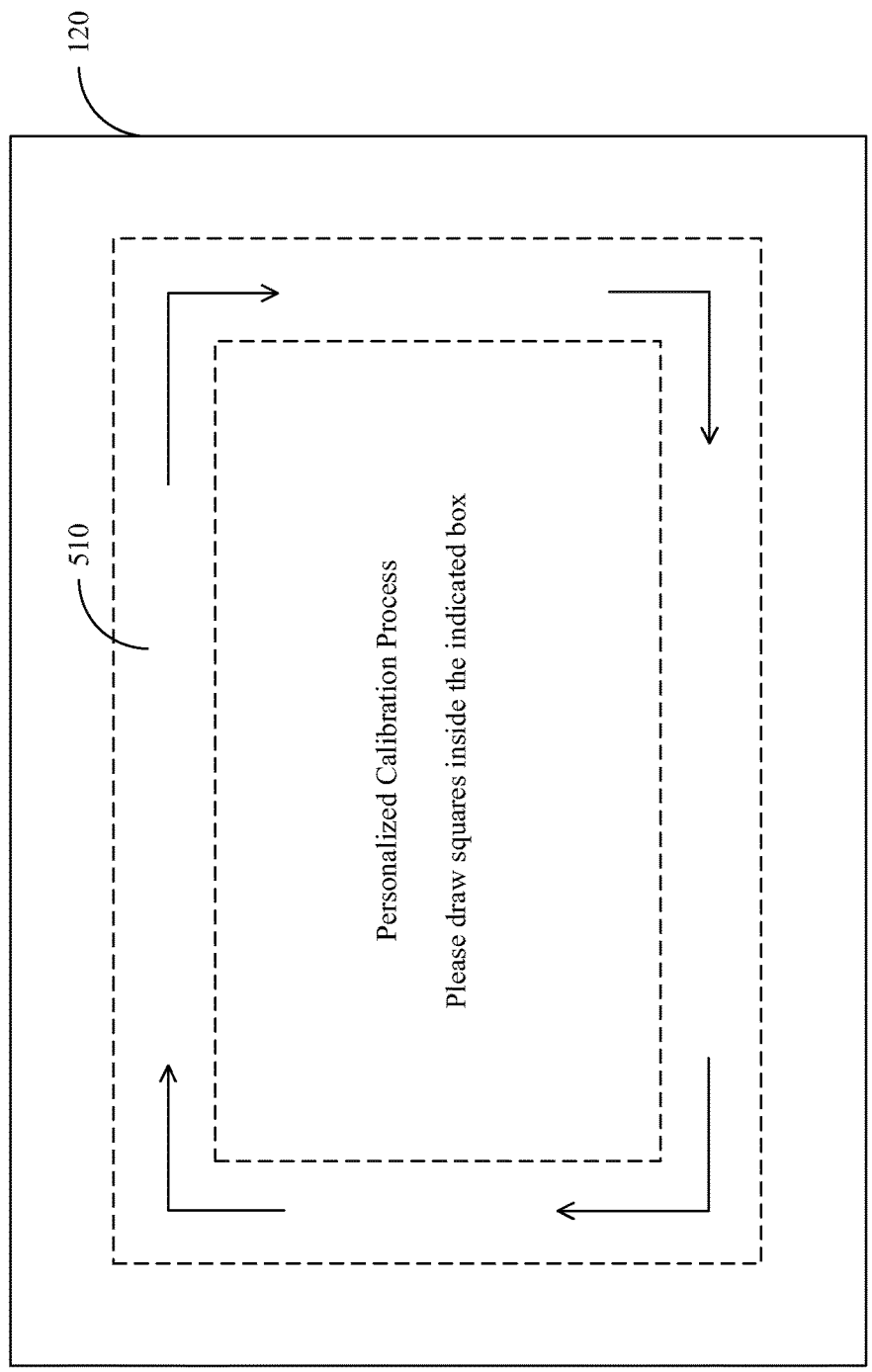
FIG. 5 is a schematic diagram depicting a display of a calibration program in accordance with an embodiment of the present invention.

In the above calibration, the calibration program or the touch sensitive processing apparatus 130 performs detection on the hardware setting of the touch screen 120, as well as electromagnetic interference surrounding the user. In an embodiment, the calibration program or the touch sensitive processing apparatus 130 may also perform detection on a user's personal habit. As shown in FIG. 5, the calibration program may instruct the touch screen 120 to display a rectangular area and prompt the user to trace the rectangle in a clockwise direction several times.

Since the pressure exerted by the fingertip, the change of curvature at turning and the speed at which the fingertip is moving are different among different people, personalization calibration can be carried out. In addition to the example shown in FIG. 5, U.S. patent application Ser. No. 15/016,788 and its relevant applications filed to various countries by the applicant are incorporated herewith as embodiments of this personalization calibration.

In an embodiment, the calibration program allows users to choose the level of detection sensitivity so as to adjust the level of threshold for detecting a touch sensitive signal. If a user finds that the touch detection is not sensitive enough or too sensitive, such that it results in wrong judgements during manipulations, the user can then adjust the sensitivity level himself.

In an embodiment, the calibration program allows users to input the dimensions of the touch screen and the number of inputs (fingers) supported by the touch sensitive processing apparatus 130 themselves. As the computing resources of the touch sensitive processing apparatus 130 is limited, if the number of inputs supported can be reduced, the rate at which touch events are reported per unit time can thus be increased.

Referring back to the embodiment of FIG. 1, a typical mutual capacitive touch sensitive detection may include the following operations. A drive circuit of the touch sensitive processing apparatus 130 provides a drive signal to a first electrode 121. Then, a sensing circuit of the touch sensitive processing apparatus 130 measures a signal via at least one second electrode 122. The drive signal is emitted along the first electrode 121, and sensed by the second electrode 122. Then, a processor of the touch sensitive processing apparatus 130 performs processing on the measured signal. When an external conductive object is in proximity or touching the first electrode 121 or the second electrode 122, abnormality in the measured signal can be detected, thereby determining the proximity/touch location of the external conductive object.

The type of circuits formed by the first electrodes 121 and the second electrodes 122 on the touch screen 110 are resistor-capacitor (RC) circuits. If, during the fabrication process of the touch screen 110, the shapes, the thicknesses and/or the wire diameter of the first electrodes 121 and the second electrodes 122 deviate from the expected, the electrical characteristics of the RC circuits formed will also deviate from the expected. Modern touch sensitive processing devices are capable of further processing a small amount of variations, but when the variation is large, it may result in sensing bias. Therefore, one of the objectives of the present invention is to detect any significant manufacturing detects in the first electrodes 121 or the second electrodes 122 on the touch screen 110. Thus, it can be clarified whether the touch screen manufacturer or the touch sensitive processing apparatus manufacturer is to be held accountable for the defects. Further, when a defect is discovered, the particular first electrode 121 or second electrode 122 is determined to facilitate future review and improvement of the production process.

Figure 6:
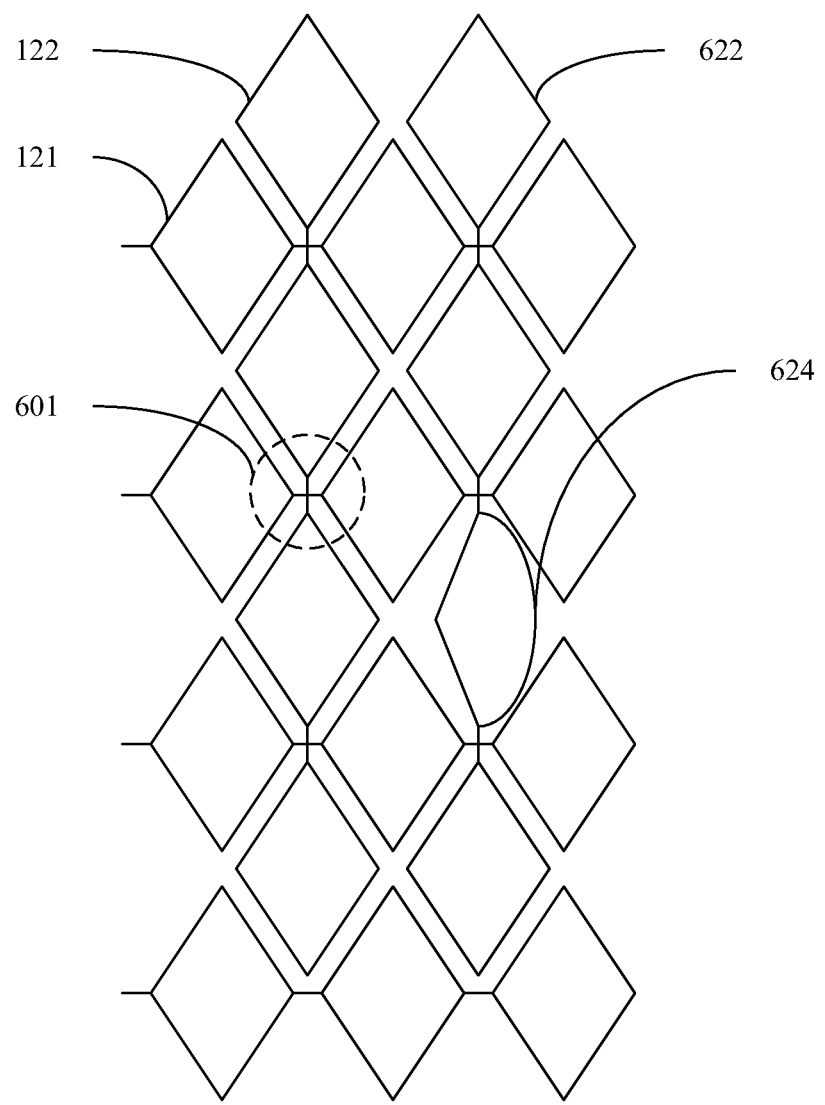
FIG. 6 is a partially-enlarged view of a touch screen.

Referring to FIG. 6, a partially-enlarged view of the touch screen 120 is shown. In the touch screen 120, several first electrodes 121 and two second electrodes 122 and 622 are included. These first electrodes 121 and the second electrode 122 are all made of rhombus conductive pads. One of ordinary skill in the art can appreciate that the first and the second electrodes may be formed in a variety of different shapes. FIG. 6 is merely an exemplary illustration of such. Take the second electrode 122 as an example, bridging circuits 601 are connected between the rhombus conductive pads. As the bridging circuits 601 have a smaller line width, the resistance of the second electrode 122 depends largely on the line width of the bridging circuits 601. The line width of the bridging circuits of the second electrode 222 is similar to that of the second electrode 122, so the resistance of the second electrode 622 is also similar to the resistance of the second electrode 122. However, the second electrode 622 includes a non-rhombus conductive pad 624, resulting in different capacitances with the conductive pads of the first electrode 121. Therefore, the capacitive-resistive effects of the two second electrodes 122 and 622 are not equal, resulting in the sensing bias described above.

Figure 7:
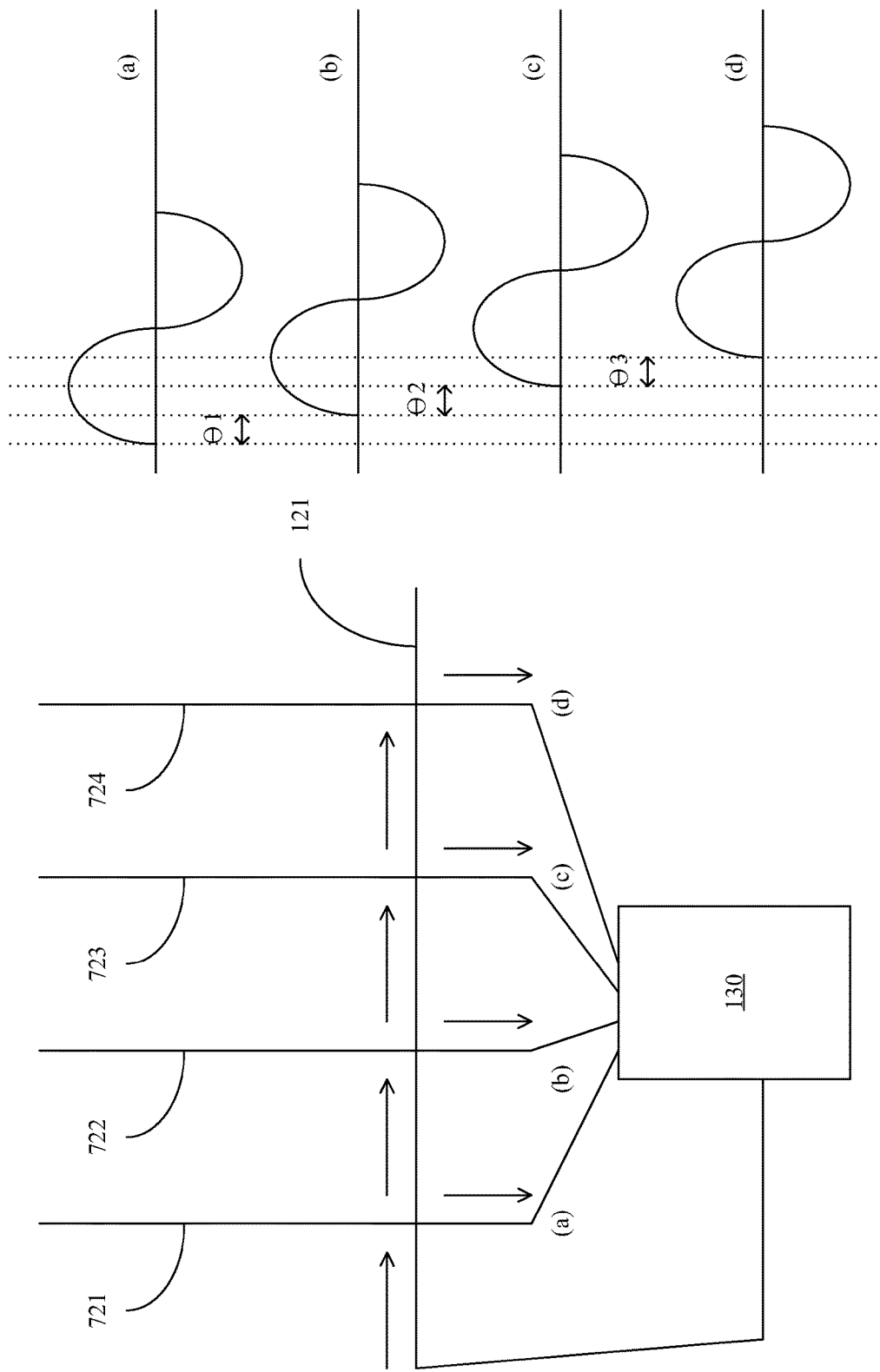
FIG. 7 is a schematic diagram depicting details of a mutual capacitive detection that takes place on a touch screen.

Referring to FIG. 7, a schematic diagram depicting details of the mutual capacitive detection that takes place in the touch screen 120 is shown. A first electrode 121 form four intersections with at least four second electrodes 721~724 of the touch screen 120. The touch sensitive processing apparatus 130 emits a drive signal via the first electrode 121, and receives the sensed drive signal via the four second electrodes 721~724.

Assuming the transmission paths connecting the touch screen 120 and the touch sensitive processing apparatus 130 are equal, the paths travelled by the drive signal are different. For example, the drive signal received via a path (a) will arrive quicker than the drive signal received via a path (b). There will be a phase shift θ1 between the two received signals. Similarly, the drive signal received via the path (c) will arrive quicker than the drive signal received via a path (b). There will be a phase shift θ2 between the two received signals. Similarly, the drive signal received via the path (d) will arrive quicker than the drive signal received via a path (c). There will be a phase shift θ3 between the two received signals. Since the length difference between the paths (a) and (b), between the paths (b) and (c) and between the paths (c) and (d) are more or less the same, the phase shifts θ1, θ2 and θ3 should also be similar, i.e. within a certain range.

Assuming the fourth second electrode 324 encounters some problems during the manufacturing process, the phase shift θ3 would then be considerably different from the other two phase shifts θ1 and θ2. In other words, the difference between θ3 and θ1 or θ2 exceeds said range. Therefore, in accordance with an embodiment of the present invention, the phase shift of the drive signal sensed by each of the second electrodes can be used in determining any process variations of that particular second electrode.

One of ordinary skill in the art can appreciate that an ideal phase shift θ corresponding to a particular first electrode can be calculated in advance based on the size of the touch screen 120 and the material of the first electrodes 121 and the second electrode 122. When the difference between each phase shift θn and the ideal phase shift θ is within a particular range, the touch sensitive processing apparatus 130 determines that the circuit of the first electrode 121 and the circuits of all the second electrodes 122 have no defect.

Figure 8A:
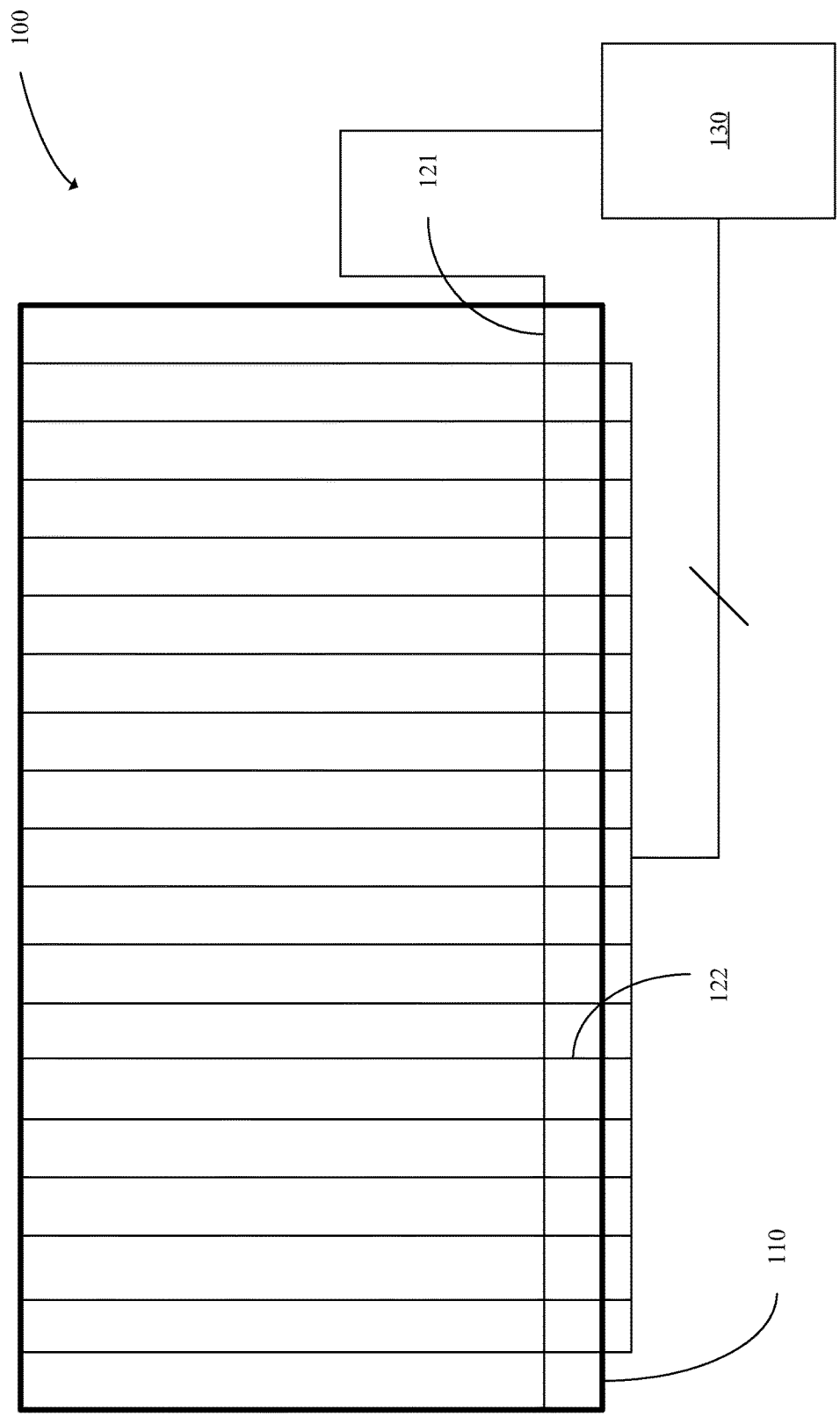
FIGS. 8A-8D are schematic diagrams depicting testing of a touch sensitive system 100 in accordance with an embodiment of the present invention.

Referring to FIG. 8A, a schematic diagram depicting the touch sensitive system 100 in accordance with an embodiment of the present invention is shown. The touch sensitive processing apparatus 130 selects the first electrode 121 that is closest to the sensing circuit to emit the drive signal. When the difference between each phase shift θn and an ideal phase shift θx1 is within a particular range, then the touch sensitive processing apparatus 130 determines that the circuit of the first electrode 121 and the circuits of all the second electrodes 122 have no defect.

Figure 8B:
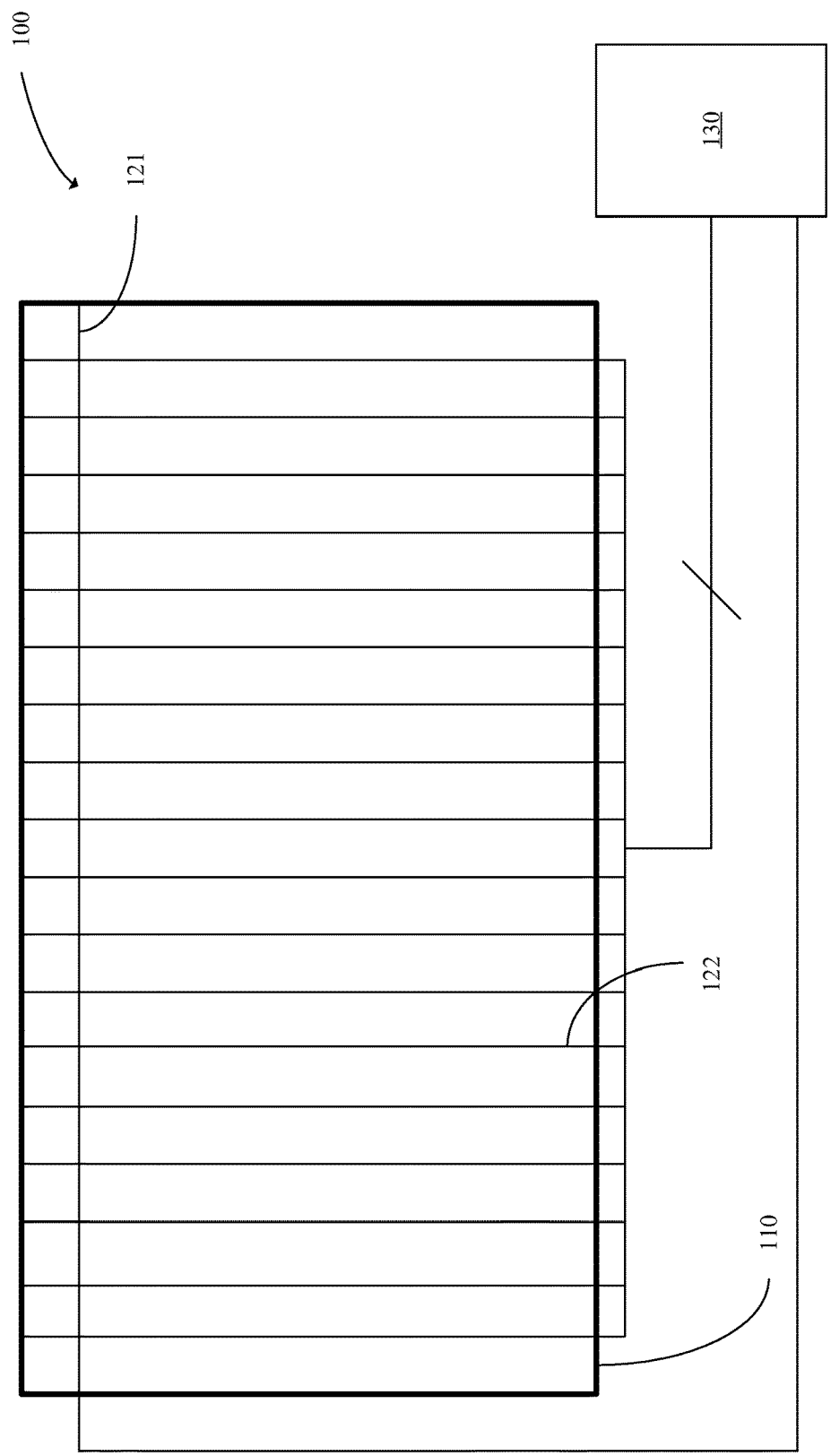

Referring to FIG. 8B, a schematic diagram depicting the touch sensitive system 100 in accordance with an embodiment of the present invention is shown. The touch sensitive processing apparatus 130 selects the first electrode 121 that is furthest from the sensing circuit to emit the drive signal. When the difference between each phase shift θn and another ideal phase shift θxm is within a particular range, then the touch sensitive processing apparatus 130 determines that the circuit of the first electrode 121 and the circuits of all the second electrodes 122 have no defect.

In an embodiment, the test of FIG. 8A can be performed before the test of FIG. 8B. The test of FIG. 8B is optional, and the first electrode 121 of FIG. 8B can be double wounded. That is, both ends of the first electrode are connected to the drive circuit of the touch sensitive processing apparatus 130. When the touch screen 120 passes the tests in FIGS. 8A and 8B, the touch sensitive processing apparatus 130 determines that the circuits of the two outermost first electrodes 121 and all of the second electrode 122 have no defect.

Figure 8C:
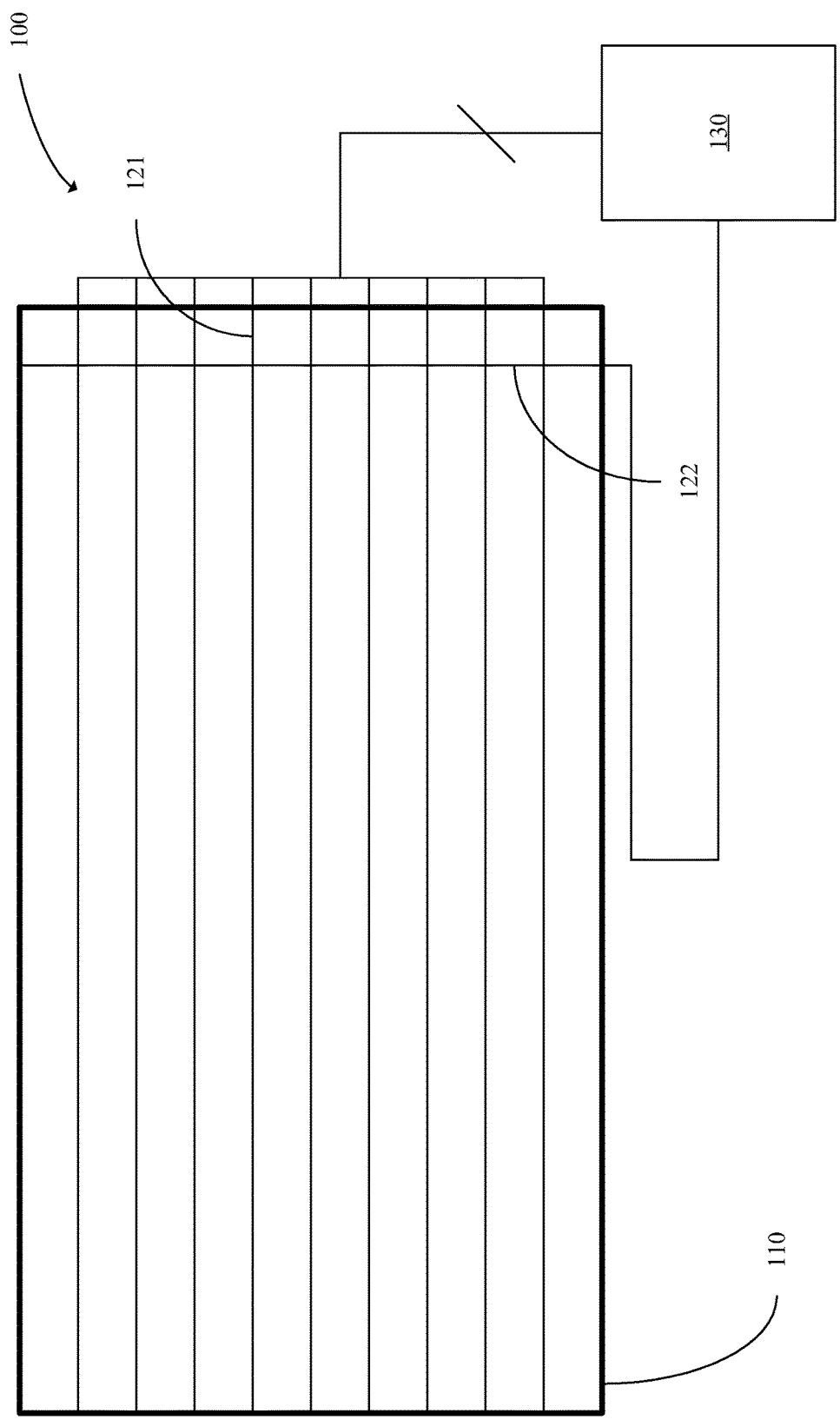

Referring to FIG. 8C, a schematic diagram depicting the touch sensitive system 100 in accordance with an embodiment of the present invention is shown. The difference between FIG. 8C and FIGS. 8A and 8B is that the groups of electrodes connected to the drive circuit and the sensing circuit are swapped. One of ordinary skill in the art can appreciate that, in an embodiment, through a configurable interconnection network, each of the first electrodes and the second electrodes can be selectively connected to the drive circuit and/or the sensing circuit. In this way, the system 100 is capable of implementing the embodiment shown in FIG. 8C. The touch sensitive processing apparatus 130 selects the second electrode 122 closest to the sensing circuit to emit the drive signal, which is received by each of the first electrodes 121. When the difference between each phase shift θn and another ideal phase shift θy1 is within a particular range, then the touch sensitive processing apparatus 130 determines that the circuit of the second electrode 122 and the circuits of all the first electrodes 121 have no defect.

Figure 8D:
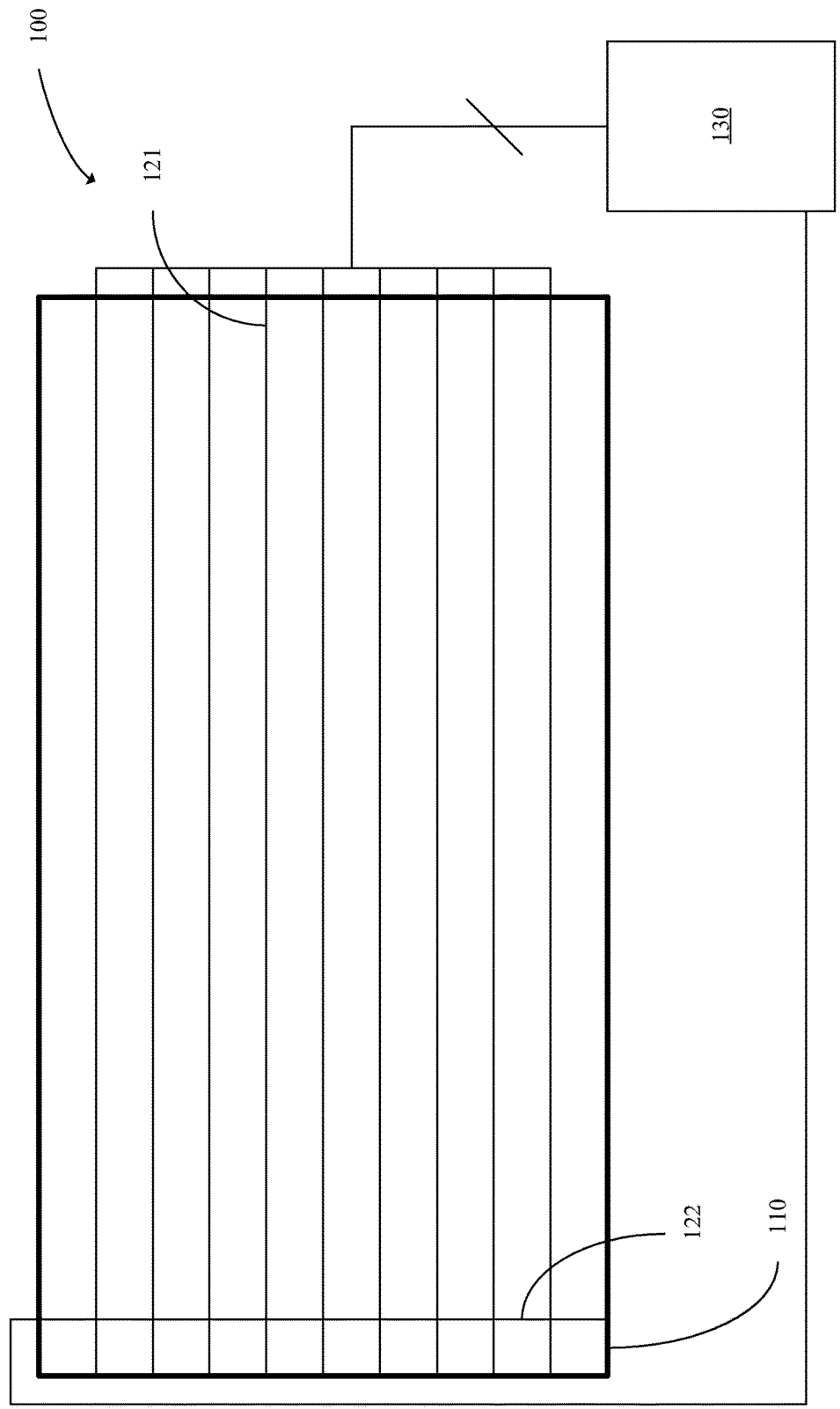

Referring to FIG. 8D, a schematic diagram depicting the touch sensitive system 100 in accordance with an embodiment of the present invention is shown. The difference between FIG. 8D and FIGS. 8A and 8B is in that the groups of electrodes connected to the drive circuit and the sensing circuit are swapped. One of ordinary skill in the art can appreciate that, in an embodiment, through a configurable interconnection network, each of the first electrodes and the second electrodes can be selectively connected to the drive circuit and/or the sensing circuit. In this way, the system 100 is capable of implementing the embodiment shown in FIG. 8D. The touch sensitive processing apparatus 130 selects the second electrode 122 furthest from the sensing circuit to emit the drive signal. When the difference between each phase shift θn and another ideal phase shift θyn is within a particular range, then the touch sensitive processing apparatus 130 determines that the circuit of the second electrode 122 and the circuits of all the first electrodes 121 have no defect.

In an embodiment, the tests for all the second electrodes 122 can be completed by performing only the process of FIG. 8A. In another embodiment, the process of FIG. 8A is performed before performing the process of FIG. 8C. Conversely, the process of FIG. 8C is performed before performing the process of FIG. 8A, thereby completing the tests for all of the first electrodes 121 and the second electrodes 122. In still another embodiment, the processes of FIGS. 8A and 8D can be performed in an arbitrary order to complete the tests for all of the first electrodes 121 and the second electrodes 122. In addition, it is not necessary to select the electrode closest or furthest from the measuring circuit for emitting the drive signal.

There are numerous known approaches for determining whether the phase shifts are similar. In an embodiment, a measured signal can be delayed a particular ideal angle. If the delayed signal coincides with the in-phase signal and the quadrature signal, then the measured signal is determined to be indeed delayed by the ideal angle. Alternatively, a phase detector, a phase comparator or the like can be used. For more information, please refer to the techniques introduced in the following Wikipedia link (https://en.wikipedia.org/wiki/Phase_detector).

Furthermore, this technique can be used to detect interface issues between the touch screen 120 and the touch sensitive processing apparatus 130. In generally, in order to be compatible with touch screens 120 of different dimensions, the touch sensitive processing apparatus 130 is usually designed with a large number of pins, cable connectors or connection circuits for connecting with the first electrodes 121 and the second electrodes 122. For example, there can be M channels or pins for the first electrodes 121, and N channels or pins for the second electrodes 122. This touch sensitive processing apparatus 130 can then be used for any touch screen 110 as long as the number of first electrodes 121 is less than or equal to M and the number of second electrodes 122 is less than or equal to N. The first electrodes 121 on a touch screen 120 are often bundled into an array of pins, while the second electrodes 122 are often bundled into another array of pins. An assembly personnel or a machine has to align the two sets of electrode connectors of the touch screen 120 with the two sets of connectors for the first electrodes 121 and the second electrodes 122 of the touch sensitive processing apparatus 130 in order for the touch sensitive processing apparatus 130 and the touch screen 120 to function properly. However, the alignments of the connectors are rather cumbersome, and as a result, assembly errors often occur. Therefore, an objective of the present invention is to automatically adjust the interconnection network between the connectors and the internal drive circuit and the sensing circuit using the method for detecting defects on the touch screen 120 already described above.

Figure 9:
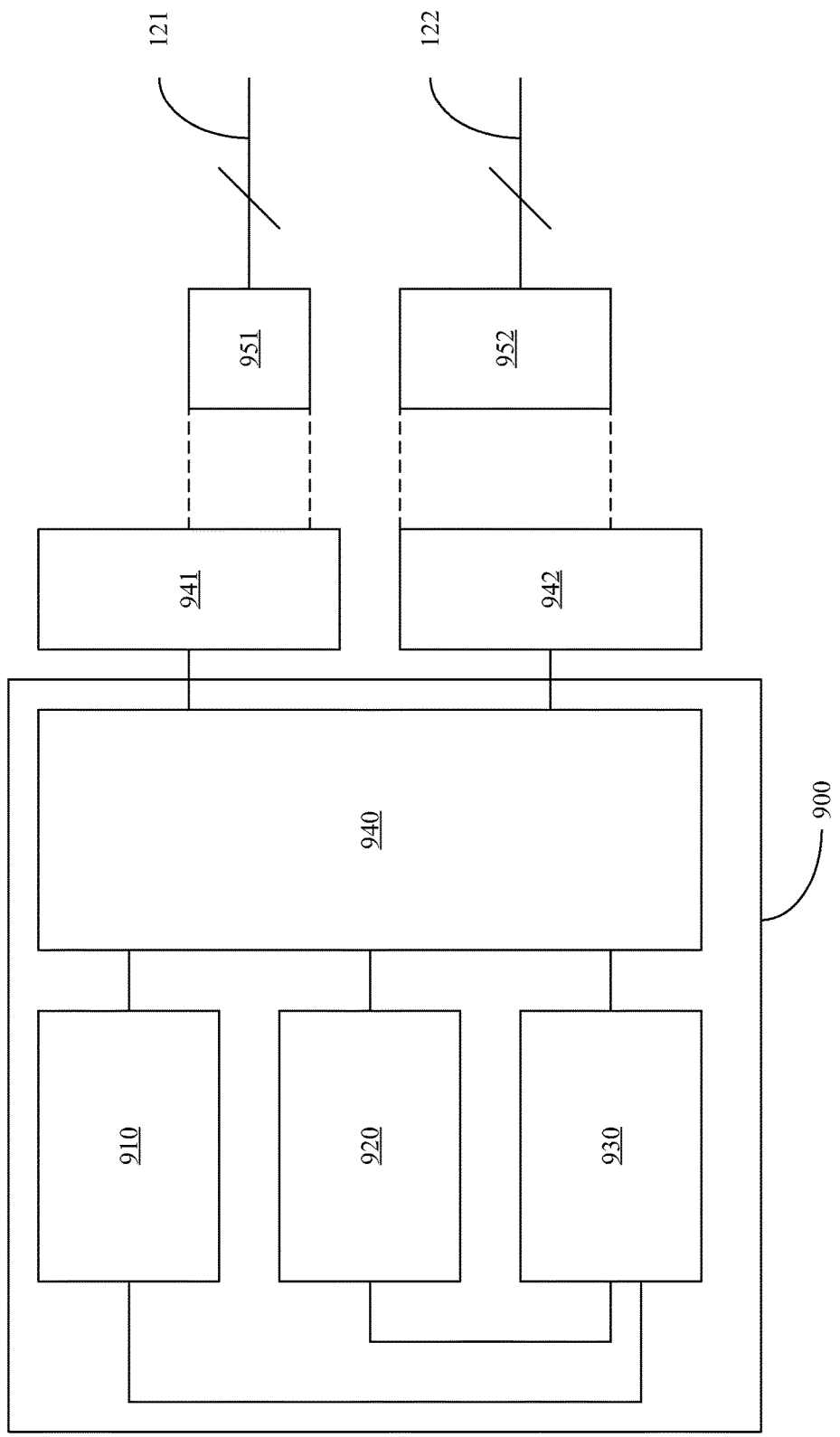
FIG. 9 is a schematic diagram depicting a touch sensitive processing apparatus 900 in accordance with an embodiment of the present invention.

Referring to FIG. 9, a schematic diagram depicting a touch sensitive processing apparatus 900 in accordance with an embodiment of the present invention is shown. The touch sensitive processing apparatus 900 can automatically detect cable connection relations of touch sensitive electrodes of a touch screen. The touch sensitive processing apparatus 900 includes a drive circuit 910, a sensing circuit 920, a processing module 930 and an interconnection network 940. The interconnection network 940 is connected with a first apparatus connector 941 and a second apparatus connector 942. Assuming the touch sensitive processing apparatus 900 provides M first electrode channels and N second electrode channels, then the first apparatus connector 941 has at least M ports, and the second apparatus connector 942 has at least N ports. The interconnection network 940 has at least M+N connections.

The touch screen includes m first electrodes and n second electrodes, wherein M is greater than m, and N is greater than N. All or some of the first electrodes 121 are connected to a first touch sensitive electrode connector 951. All or some of the second electrodes 122 are connected to a second touch sensitive electrode connector 952. The first touch sensitive electrode connector 951 is used for connecting with the first apparatus connector 941. The second touch sensitive electrode connector 952 is used for connecting with the second apparatus connector 942.

The drive circuit 910 and the sensing circuit 920 are connected to the first electrodes 121 and/or the second electrodes 122 of the touch screen via the interconnection network 940. The processing module 930 may configure the routing of the interconnection network 940 as required, such that each of the first electrodes 121 can be connected to the drive circuit 910 or the sensing circuit 920, and each of the second electrodes 122 can be connected to the drive circuit 910 or the sensing circuit 920.

As shown in FIG. 9, when the first touch sensitive electrode connector 951 is arbitrary connected with the first apparatus connector 941 and the second touch sensitive electrode connector 952 is arbitrary connected with second apparatus connector 942, the processing module 930 may instruct the drive circuit 910 to sequentially provide a drive signal to each port of the first apparatus connector 941, while instructing the sensing circuit 920 to measure a signal via each port of the second apparatus connector 942. When a port of the first apparatus connector 941 is not physically connected to a first electrode 121, the sensing circuit 920 will not receive any sensed drive signals. When the sensing circuit 920 receives the drive signal from n lines, the processing module 930 knows which particular port emitted the drive signal, and which n ports received the drive signal. As such, the particular port of the first apparatus connector 941 to which the outermost first electrode 121 is connected can be determined.

Next, the processing module 930 instructs the drive circuit 910 to provide drive signals to the first or the last one of the n circuits (i.e. the second electrodes 122), and determines that a total of m first electrodes 121 have sensed the drive signal. Using these two steps, the processing module 930 is able to find out there are m first electrodes 121 and n second electrodes 122 that are connected to m particular ports in the first apparatus connector 941 and n particular ports in the second apparatus connector 942, respectively. Moreover, based on how quickly the drive signal is received, the processing module 930 can also determine the order in which the m first electrodes 121 are arranged and the order in which the n second electrodes 122 are arranged.

When the processing module 930 has determined the connection pins of the first electrodes 121 and the second electrodes 122, it may perform the defect tests on these electrodes 121 and 122 in accordance with the embodiments of FIGS. 8A to 8D above.

In another embodiment, in addition to the first electrodes 121 and the second electrodes 122, there may be guard traces or wall electrodes surrounding a touch sensitive area of the touch screen 120. The purpose of the guard traces is to shield the first electrodes 121 and the second electrodes 122 from electromagnetic interferences outside the touch sensitive area when the guard traces are grounded or connected to a DC potential. Another purpose of the guard traces is to compensate for insufficient capacitance measurements of border electrodes when the guard traces are floated. In this embodiment, the touch sensitive processing apparatus 130 has to be connected to these guard traces in order to control them in various circumstances.

When a guard trace is provided at either side of the m first electrodes 121, m+2 lines are connected with the first touch sensitive electrode connector 951, in which the interposed m lines are the first electrodes 121, and the outermost two lines are the two guard traces. Similarly, when a guard trace is provided at either side of the n second electrodes 122, n+2 lines are connected with the second touch sensitive electrode connector 952, in which the interposed n lines are the second electrodes 122, and the outermost two lines are the two guard traces.

In general, the shapes and the capacitance measurements of the guard traces are different from those of the first electrodes 121 and second electrodes 122. If the touch sensitive processing apparatus 130 simply uses the above-mentioned processes for testing, then the drive signal may be provided to the guard traces, resulting in error outcomes. Thus, the processes of FIGS. 8A to 8D are modified, such that the drive signal is provided to the second and the second to last electrodes; the sensing results from the first and the last electrodes are discarded; and the test for phase shift is performed only on the second to the second to last electrodes.

If the phase shifts of the first and the last electrodes are considerably different from those of the other electrodes, then the touch sensitive processing apparatus 130 determines that the guard traces are provided on the touch screen 110. Additional control processes can be incorporated for these guard traces.

Moreover, there might be more than one guard trace at either side, for example, the first two and the last two electrodes may be guard traces. One of ordinary skill in the art can appreciate that the processes of FIGS. 8A to 8D above can be modified, such that that the drive signal is provided to the third and the third to last electrodes; the sensing results from the first two and the last two electrodes are discarded; and the phase shift test is performed only on the electrodes therebetween.

In summary of the above, one objective of the present invention is to detect any defects in the first and second electrodes on the touch screen. Another objective of the present invention is to automatically detect the quantities of the first and the second electrodes on the touch screen. Still another objective of the present invention is to determine the connection locations of the connectors of the first and second electrodes. Yet another objective of the present invention is to determine whether the touch screen has any guard traces.

Figure 10A:
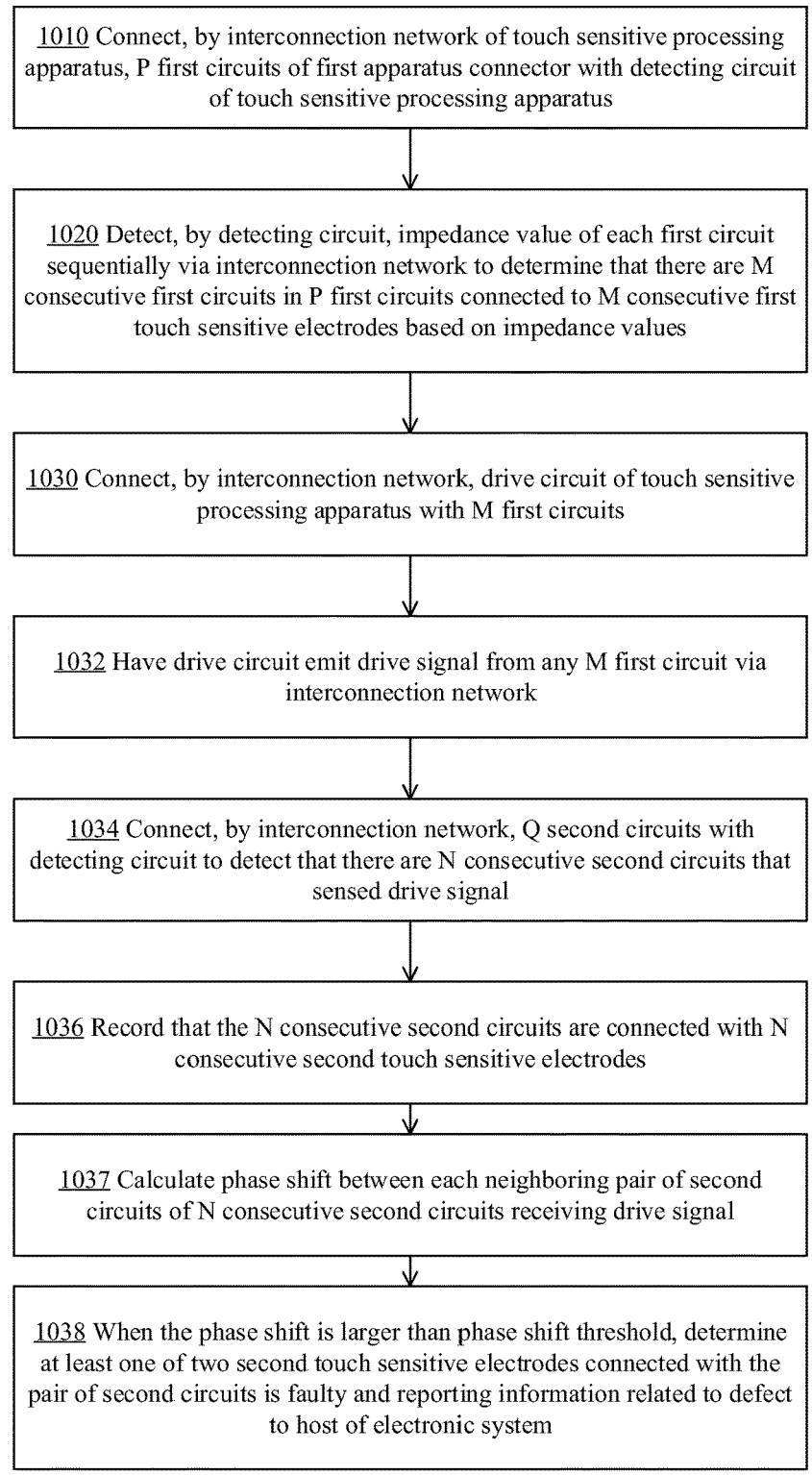
FIG. 10A is a touch sensitive processing method for configuring interconnection parameters between a touch panel and a touch sensitive processing apparatus in an electronic system in accordance with an embodiment of the present invention.

Referring to FIG. 10A, a touch sensitive processing method for configuring interconnection parameters between a touch panel and a touch sensitive processing apparatus in an electronic system in accordance with an embodiment of the present invention is shown. The touch panel includes M parallel first touch sensitive electrodes covering the touch panel, wherein M is a positive integer equal to or greater than 2, and a first touch sensitive electrode connector for sequentially bundling the M first touch sensitive electrodes. The electronic system includes a first apparatus connector for sequentially bundling P first circuits that are connected with the M first touch sensitive electrodes and connecting with the first touch sensitive electrode connector, wherein P is a positive integer greater than M. The touch sensitive processing method includes: step 1010: connecting, by an interconnection network of the touch sensitive processing apparatus, the P first circuits of the first apparatus connector with a detecting circuit of the touch sensitive processing apparatus, respectively; and step 1020: detecting, by the detecting circuit, an impedance value of each of the first circuits sequentially via the interconnection network; and determining that there are M consecutive first circuits in the P first circuits connected to the M consecutive first touch sensitive electrodes based on the impedance values. As such, this embodiment is capable of detecting how many first touch sensitive electrodes there are, and which first circuits in the P first circuits are connected with these first touch sensitive electrodes.

In a variant of the embodiment above, the touch panel further includes N parallel second touch sensitive electrodes covering the touch panel, wherein each first touch sensitive electrode intersects with N second touch sensitive electrodes to form N touch sensitive sensing areas, and N is a positive integer equal to or greater than 2, and a second touch sensitive electrode connector for sequentially bundling the N second touch sensitive electrodes. The electronic system further includes a second apparatus connector for sequentially bundling Q second circuits that are connected with the N second touch sensitive electrodes and connecting with the second touch sensitive electrode connector, wherein Q is a positive integer greater than N. The touch sensitive processing method further includes: step 1030: connecting, by the interconnection network, a drive circuit of the touch sensitive processing apparatus with the M first circuits; step 1032: having the drive circuit emit a drive signal from any one of the M first circuits via the interconnection network; step 1034: connecting, by the interconnection network, the Q second circuits with the detecting circuit to detect that there are N consecutive second circuits that sensed the drive signal; and step 1036, recording that the N consecutive second circuits are connected with the N consecutive second touch sensitive electrodes. As such, this embodiment is capable of detecting how many second touch sensitive electrodes there are, and which second circuits in the Q second circuits are connected to these second touch sensitive electrodes. In a variant of the embodiment above, the touch sensitive processing method further includes: step 1037: calculating a phase shift between each neighboring pair of second circuits of the N consecutive second circuits receiving the drive signal; and step 1038: when the phase shift is larger than a phase shift threshold, determining at least one of the two second touch sensitive electrodes connected with the pair of second circuits is faulty and reporting information related to the defect to a host of the electronic system. As such, the embodiment is capable of detecting which second touch sensitive electrodes are faulty, and informing the host about the defects, which in turn allows a user to know about the defects.

Figure 10B:
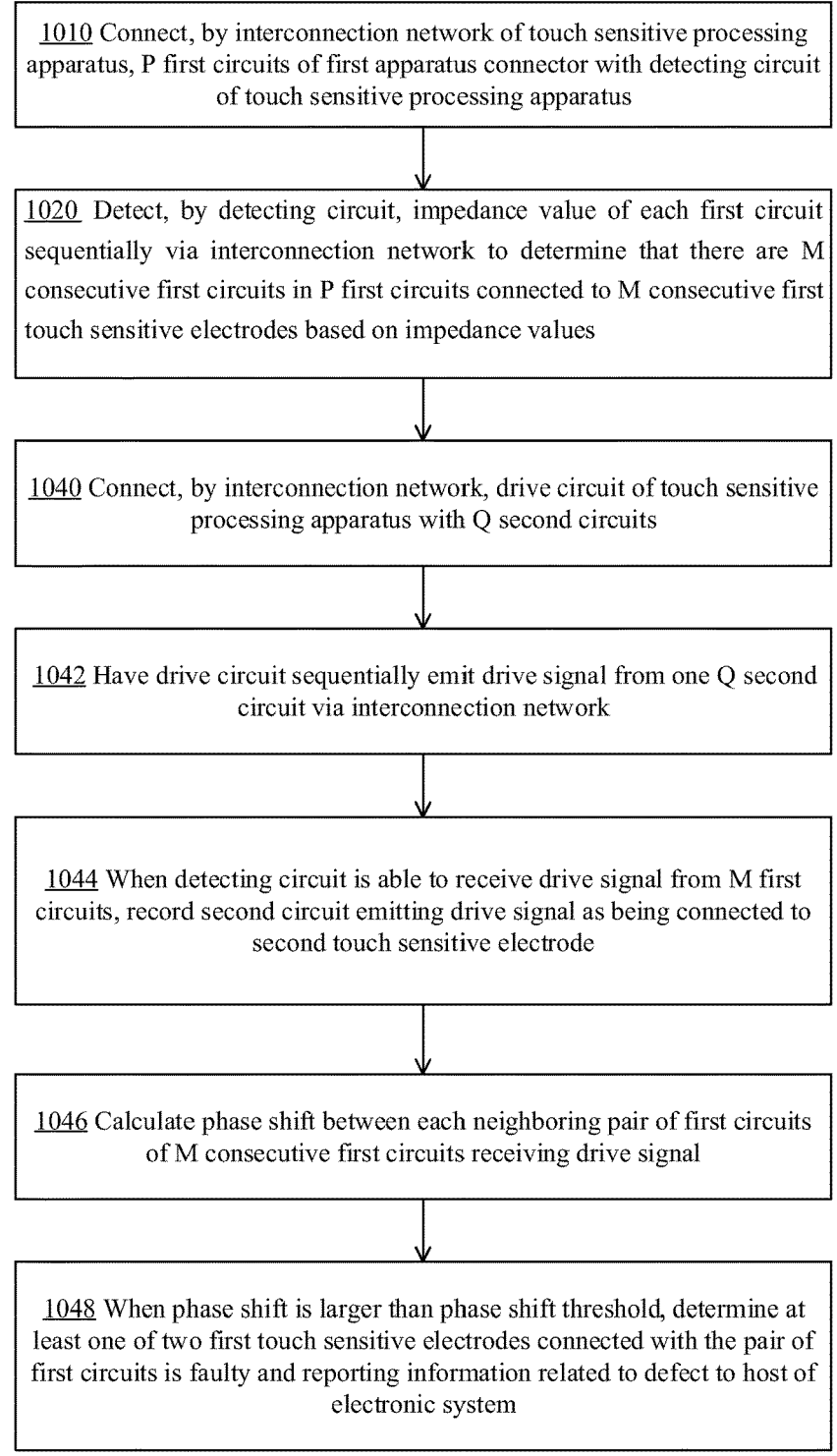
FIG. 10B is a touch sensitive processing method for configuring interconnection parameters between a touch panel and a touch sensitive processing apparatus in an electronic system in accordance with another embodiment of the present invention.

Referring to FIG. 10B, a touch sensitive processing method for configuring interconnection parameters between a touch panel and a touch sensitive processing apparatus in an electronic system in accordance with another embodiment of the present invention is shown. Similar to FIG. 10A, the touch panel further includes N parallel second touch sensitive electrodes covering the touch panel, wherein each first touch sensitive electrode intersects with N second touch sensitive electrodes to form N touch sensitive sensing areas, and N is a positive integer equal to or greater than 2, and a second touch sensitive electrode connector for sequentially bundling the N second touch sensitive electrodes. The electronic system further includes a second apparatus connector for sequentially bundling Q second circuits that are connected with the N second touch sensitive electrodes and connecting with the second touch sensitive electrode connector, wherein Q is a positive integer greater than N. The touch sensitive processing method further includes: step 1040: connecting, by the interconnection network, a drive circuit of the touch sensitive processing apparatus with the Q second circuits; step 1042: having the drive circuit sequentially emit a drive signal from one of the Q second circuits via the interconnection network; step 1044: when the detecting circuit is able to receive the drive signal from the M first circuits, recording the second circuit emitting the drive signal as being connected to a second touch sensitive electrode. As such, this embodiment is capable of detecting how many second touch sensitive electrodes there are, and which second circuits in the Q second circuits are connected to these second touch sensitive electrodes. In a variant of the embodiment above, the touch sensitive processing method further includes: step 1046: calculating a phase shift between each neighboring pair of first circuits of the M consecutive first circuits receiving the drive signal; and step 1048: when the phase shift is larger than a phase shift threshold, determining at least one of the two first touch sensitive electrodes connected with the pair of first circuits is faulty and reporting information related to the defect to a host of the electronic system. As such, the embodiment is capable of detecting which first touch sensitive electrodes are faulty, and informing the host about the defects, which in turn allows a user to know about the defects.

Figure 10C:
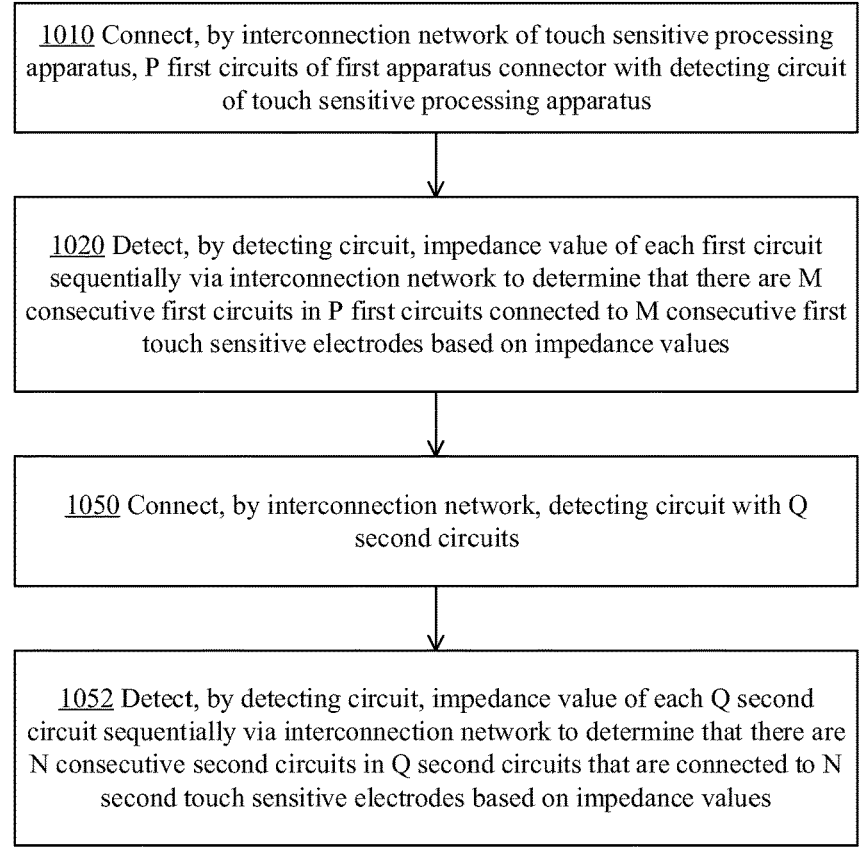
FIG. 10C is a touch sensitive processing method for configuring interconnection parameters between a touch panel and a touch sensitive processing apparatus in an electronic system in accordance with another embodiment of the present invention.

Referring to FIG. 10C, a touch sensitive processing method for configuring interconnection parameters between a touch panel and a touch sensitive processing apparatus in an electronic system in accordance with another embodiment of the present invention is shown. Similar to the embodiment shown in FIG. 10A, the touch panel further includes N parallel second touch sensitive electrodes covering the touch panel, wherein each first touch sensitive electrode intersects with N second touch sensitive electrodes to form N touch sensitive sensing areas, and N is a positive integer equal to or greater than 2, and a second touch sensitive electrode connector for sequentially bundling the N second touch sensitive electrodes. The electronic system further includes a second apparatus connector for sequentially bundling Q second circuits that are connected with the N second touch sensitive electrodes and connecting with the second touch sensitive electrode connector, wherein Q is a positive integer greater than N. The touch sensitive processing method further includes: step 1050: connecting, by the interconnection network, the detecting circuit with the Q second circuits; and step 1052: detecting, by the detecting circuit, an impedance value of each of the Q second circuits sequentially via the interconnection network, and determining that there are N consecutive second circuits in the Q second circuits that are connected to the N second touch sensitive electrodes based on the impedance values. As such, this embodiment is capable of detecting how many second touch sensitive electrodes there are, and which second circuits in the Q second circuits are connected with these second touch sensitive electrodes.

Figure 11:
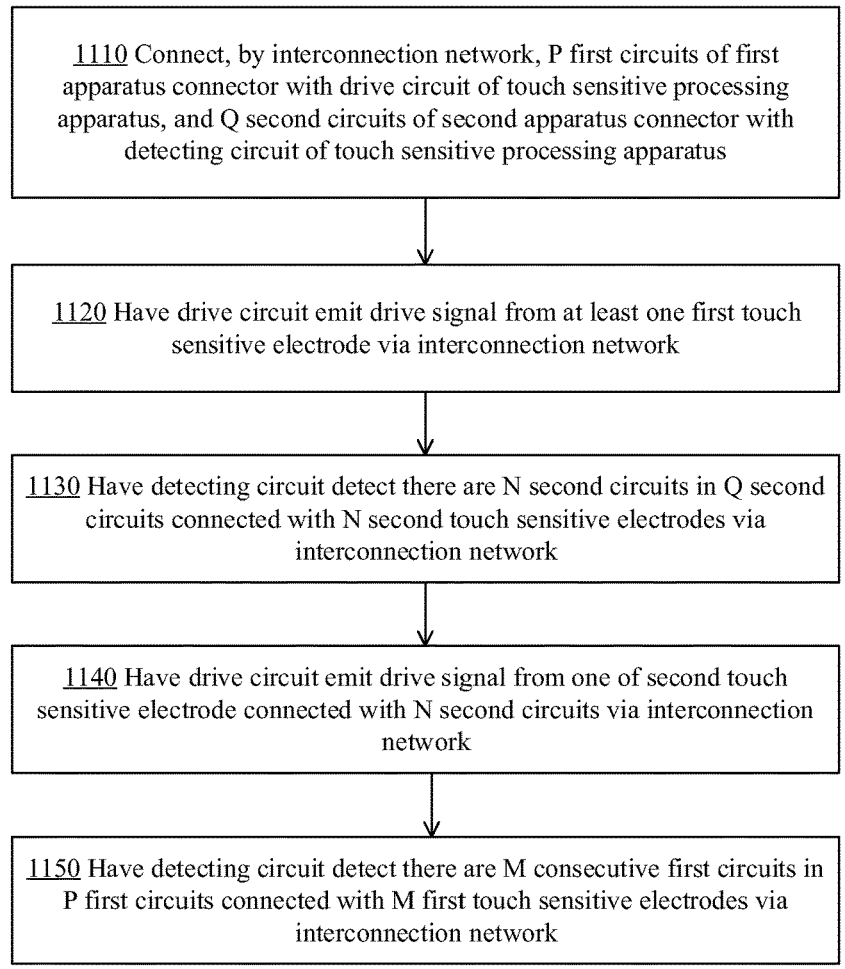
FIG. 11 is a touch sensitive processing method for configuring interconnection parameters between a touch panel and a touch sensitive processing apparatus in an electronic system in accordance with an embodiment of the present invention.

Referring to FIG. 11, a touch sensitive processing method for configuring interconnection parameters between a touch panel and a touch sensitive processing apparatus in an electronic system in accordance with an embodiment of the present invention is shown. The touch panel includes M parallel first touch sensitive electrodes and N parallel second touch sensitive electrodes covering the touch panel, wherein each first touch sensitive electrode intersects with N second touch sensitive electrodes to form N touch sensitive sensing areas, wherein M is a positive integer equal to or greater than 2, and N is a positive integer equal to or greater than 2. The touch panel further includes a first touch sensitive electrode connector for sequentially bundling the M first touch sensitive electrodes, a second touch sensitive electrode connector for sequentially bundling the N second touch sensitive electrodes. The electronic system includes a first apparatus connector and a second apparatus connector, wherein the first apparatus connector is used for sequentially bundling P first circuits that are connected with the M first touch sensitive electrodes and connecting with the first touch sensitive electrode connector, and the second apparatus connector is used for sequentially bundling Q second circuits that are connected with the N second touch sensitive electrodes and connecting with the second touch sensitive electrode connector, wherein Q is a positive integer greater than N. The touch sensitive processing method further includes: step 1110: connecting, by an interconnection network, the P first circuits of the first apparatus connector with a drive circuit of the touch sensitive processing apparatus, and the Q second circuits of the second apparatus connector with a detecting circuit of the touch sensitive processing apparatus; step 1120: having the drive circuit emit a drive signal from at least one of the first touch sensitive electrodes via the interconnection network; and step 1130: having the detecting circuit detect that there are N second circuits in the Q second circuits connected with the N second touch sensitive electrodes via the interconnection network. As such, this embodiment is capable of detecting how many second circuits are connected with the second touch sensitive electrodes, and which second circuits are connected with the second touch sensitive electrodes. In a variant of the above embodiment, the touch sensitive processing method further includes: step 1140: having the drive circuit emit a drive signal from one of second touch sensitive electrodes that are connected with the N second circuits via the interconnection network; and step 1150: having the detecting circuit detect that there are M consecutive first circuits in the P first circuits that are connected with the M first touch sensitive electrodes via the interconnection network. As such, this embodiment is capable of detecting how many first circuits are connected with the first touch sensitive electrodes, and which first circuits are connected with the first touch sensitive electrodes.

Figure 12:
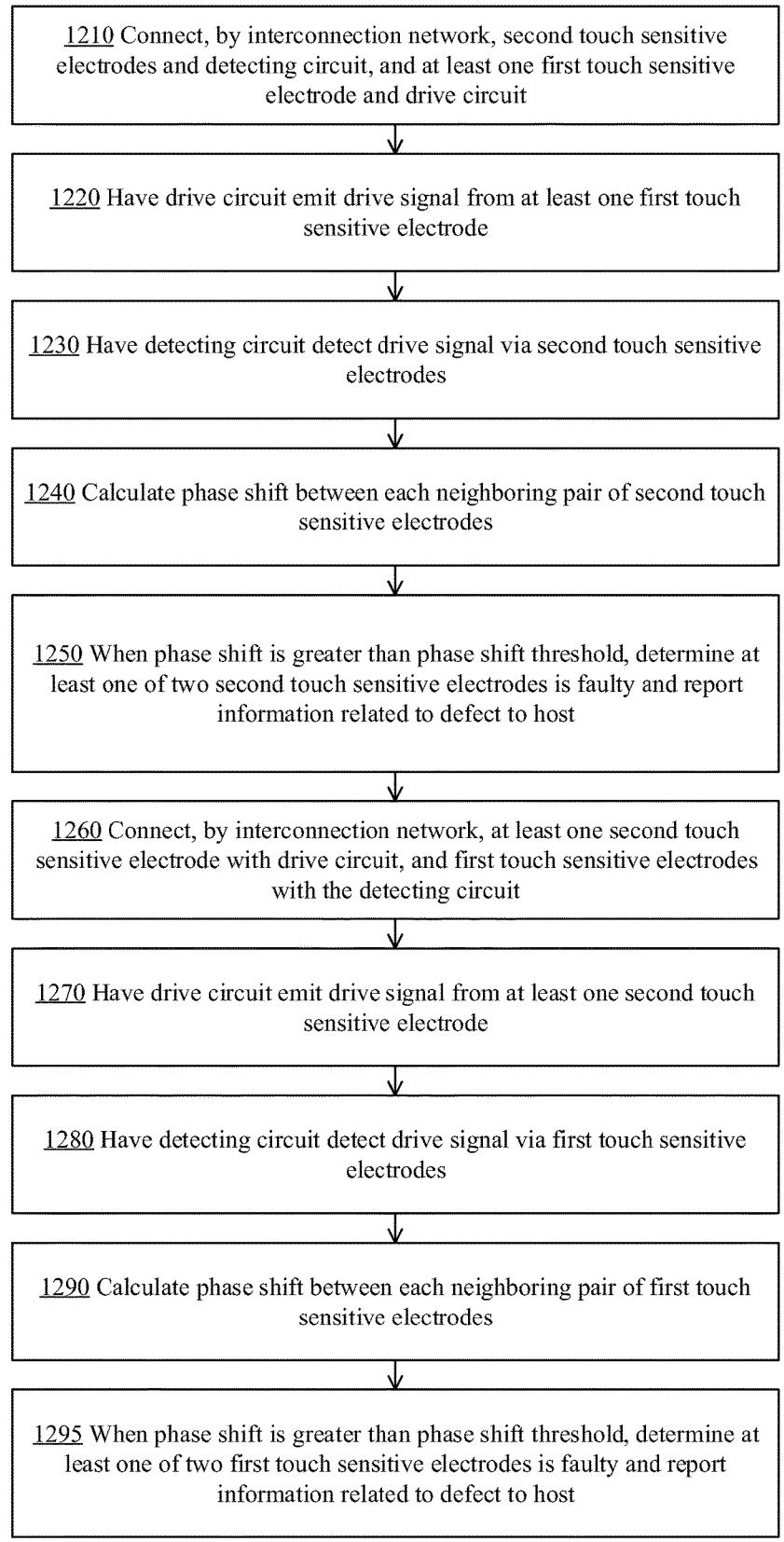
FIG. 12 is a touch sensitive processing method for detecting defects of a touch panel of an electronic system adaptable to a touch sensitive processing apparatus in accordance with an embodiment of the present invention.

Referring to FIG. 12, a touch sensitive processing method for detecting defects of a touch panel of an electronic system adaptable to a touch sensitive processing apparatus in accordance with an embodiment of the present invention is shown. The electronic system includes a host, the touch sensitive processing apparatus and the touch panel. The host is configured for executing an operating system to control the electronic system. The touch panel includes a plurality of first touch sensitive electrodes arranged in parallel and a plurality of second touch sensitive electrodes arranged in parallel, wherein the plurality of first and second touch sensitive electrodes form a plurality of touch sensitive areas. The touch sensitive processing apparatus includes a detecting circuit, a drive circuit and an interconnection network. The touch sensitive processing method includes: step 1210: connecting, by the interconnection network, the plurality of second touch sensitive electrodes and the detecting circuit, and at least one of the first touch sensitive electrodes and the drive circuit; step 1220: having the drive circuit emit a drive signal from the at least one first touch sensitive electrode; step 1230: having the detecting circuit detect the drive signal via the plurality of second touch sensitive electrodes; step 1240: calculating a phase shift between each neighboring pair of the plurality of second touch sensitive electrodes; and step 1250: when the phase shift is greater than a phase shift threshold, determining at least one of the two second touch sensitive electrodes is faulty and reporting information related to the defect to the host. As such, this embodiment is capable of knowing which second touch sensitive electrodes are faulty, and reporting them to the host in order to notify a user. In a variant of the above embodiment, the touch sensitive processing method further includes: step 1260: connecting, by the interconnection network, at least one of the second touch sensitive electrodes and the drive circuit, and the plurality of the first touch sensitive electrodes with the detecting circuit; step 1270: having the drive circuit emit a drive signal from the at least one second touch sensitive electrode; step 1280: having the detecting circuit detect the drive signal via the plurality of first touch sensitive electrodes; step 1290: calculating a phase shift between each neighboring pair of the plurality of first touch sensitive electrodes; and step 1295: when the phase shift is greater than the phase shift threshold, determining at least one of the two first touch sensitive electrodes is faulty and reporting information related to the defect to the host. As such, this embodiment is capable of knowing which first touch sensitive electrodes are faulty, and reporting them to the host in order to notify a user.

Figure 13:
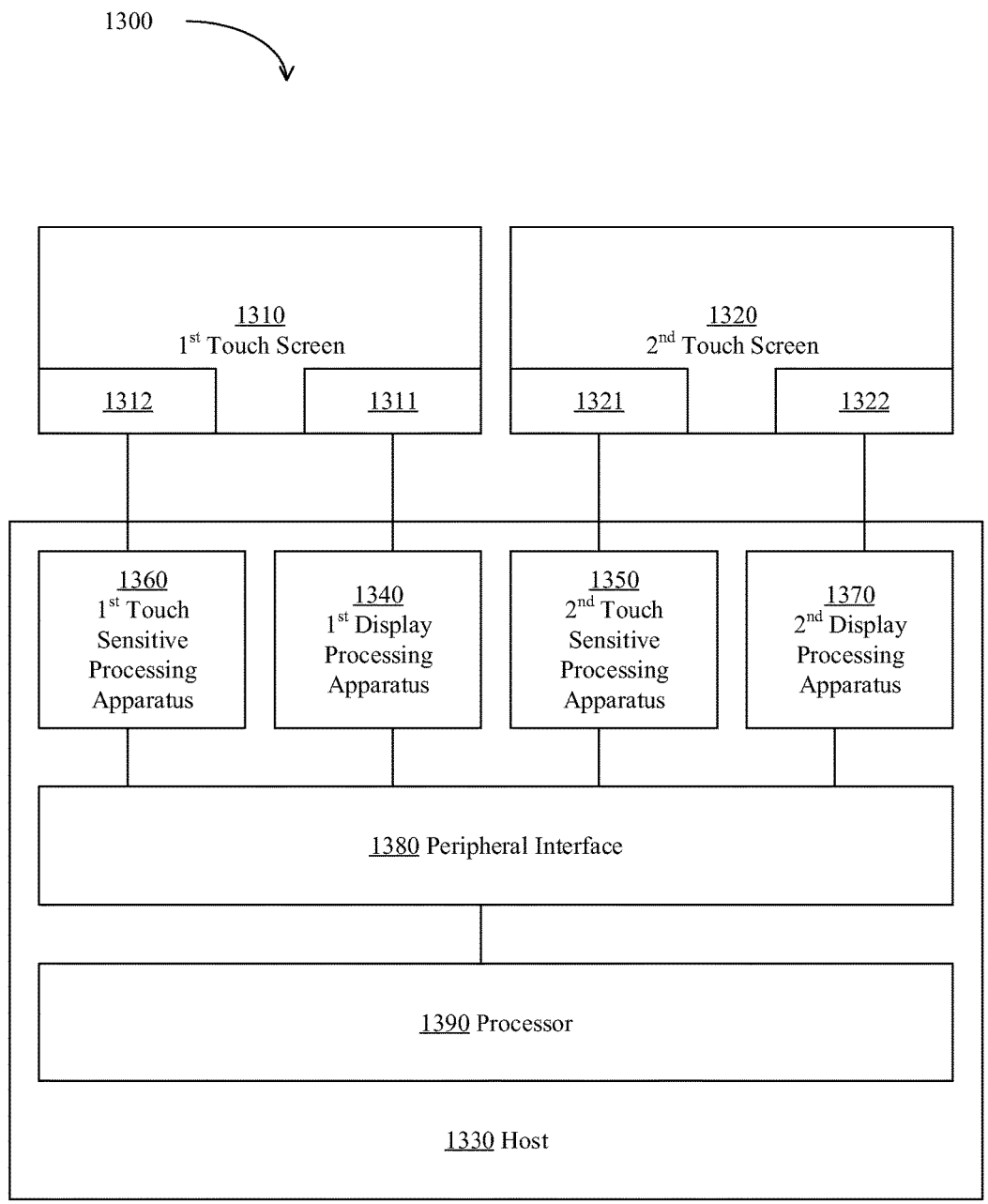
FIG. 13 is an electronic system for determining correspondences between a plurality of display processing apparatuses and a plurality of touch sensitive processing apparatuses in accordance with an embodiment of the present invention.

Referring to FIG. 13, an electronic system 1300 for determining correspondences between a plurality of display processing apparatuses and a plurality of touch sensitive processing apparatuses in accordance with an embodiment of the present invention is shown. The electronic system 1300 includes a first touch screen 1310, a second touch screen 1320 and a host 1330. The first touch screen 1310 includes a first display interface 1311 and a first touch sensitive interface 1312. The second touch screen 1310 includes a second display interface 1321 and a second touch sensitive interface 1322. The host 1330 includes: a first display processing apparatus 1340 for connecting with the first display interface 1311; a second display processing apparatus 1350 for connecting with the second display interface 1321; a first touch sensitive processing apparatus 1360 for connecting with one of the first display interface 1311 and the second display interface 1321; a second touch sensitive processing apparatus 1370 for connecting with the other one of the first display interface 1311 and the second display interface 1321; a peripheral interface 1380 for connecting with the first display processing apparatus 1340, the second display processing apparatus 1350, the first touch sensitive processing apparatus 1360 and the second touch sensitive processing apparatus 1370; and a processor 1390 connected with the peripheral interface 1380 configured for: having the first display processing apparatus 1340 display a first prompt message via the first touch screen 1310; having the first touch sensitive processing apparatus 1360 and the second touch sensitive processing apparatus 1370 receive a first touch event; when the first touch event came from the first touch sensitive processing apparatus 1360, then determining that the first touch screen 1310 is connected with the first touch sensitive processing apparatus 1360; and when the first touch event came from the second touch sensitive processing apparatus 1370, then determining that the first touch screen 1310 is connected with the second touch sensitive processing apparatus 1370. Accordingly, this embodiment is capable of determining the correspondences between a plurality of display processing apparatuses and a plurality of touch sensitive processing apparatuses.

Figure 14:
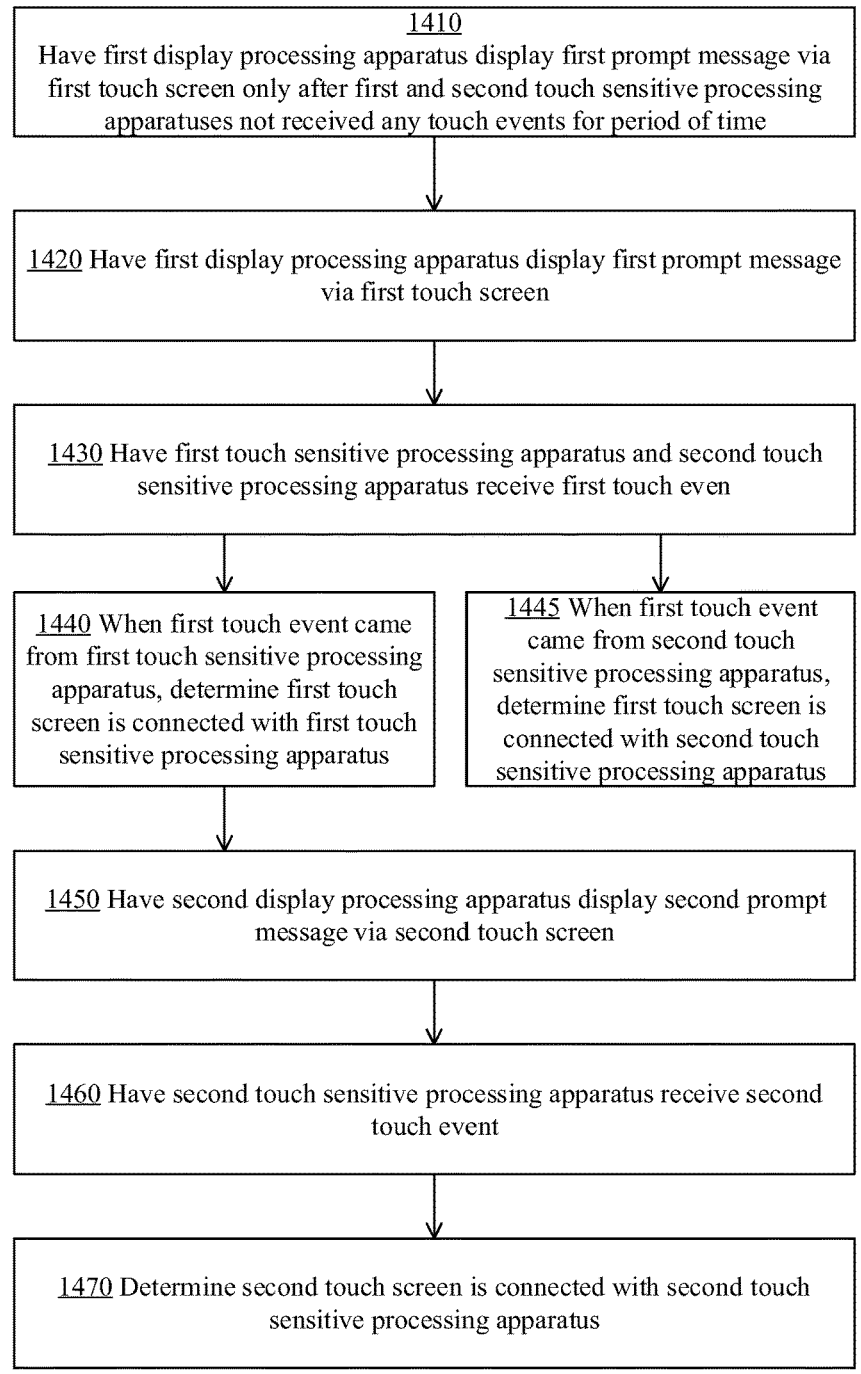
FIG. 14 is a method for determining correspondences between a plurality of display processing apparatuses and a plurality of touch sensitive processing apparatuses adaptable to a processor of a host of an electronic system in accordance with an embodiment of the present invention.

Referring to FIG. 14, a method for determining correspondences between a plurality of display processing apparatuses and a plurality of touch sensitive processing apparatuses adaptable to a processor of a host of an electronic system in accordance with an embodiment of the present invention is shown. The electronic system includes a first touch screen, a second touch screen and a host. The first touch screen includes a first display interface and a first touch sensitive interface. The second touch screen includes a second display interface and a second touch sensitive interface. The host includes: a first display processing apparatus for connecting with the first display interface; a second display processing apparatus for connecting with the second display interface; a first touch sensitive processing apparatus for connecting with one of the first display interface and the second display interface; a second touch sensitive processing apparatus for connecting with the other one of the first display interface and the second display interface; and a peripheral interface for connecting with the first display processing apparatus, the second display processing apparatus, the first touch sensitive processing apparatus and the second touch sensitive processing apparatus. The method includes: step 1420: having the first display processing apparatus display a first prompt message via the first touch screen; step 1430: having the first touch sensitive processing apparatus and the second touch sensitive processing apparatus receive the first touch event; step 1440: when the first touch event came from the first touch sensitive processing apparatus, then determining that the first touch screen is connected with the first touch sensitive processing apparatus; and step 1445: when the first touch event came from the second touch sensitive processing apparatus, then determining that the first touch screen is connected with the second touch sensitive processing apparatus. Accordingly, this embodiment is capable of determining the correspondences between a plurality of display processing apparatuses and a plurality of touch sensitive processing apparatuses.

In a variant of the above embodiment, the method further includes step 1410: having the first display processing apparatus display a first prompt message via the first touch screen only after the first touch sensitive processing apparatus and the second touch sensitive processing apparatus have not received any touch events for a certain period of time. Accordingly, this embodiment eliminates misjudgments caused by accidental touches of the user.

In a variant of the above embodiment, the method further includes step 1450: after determining that the first touch screen is connected with the first touch sensitive processing apparatus, having the second display processing apparatus display a second prompt message via the second touch screen; step 1460: having the second touch sensitive processing apparatus receive the second touch event; and step 1470: determining that the second touch screen is connected with the second touch sensitive processing apparatus.

The electronic system mentioned in the present invention can be, but is not limited to, a computing system such as a desktop computer, a laptop computer, a tablet PC, a smartphone and etc. The host and the processor mentioned in the present invention can be, but are not limited to, the x86 or the x64 system architecture available from Intel, the PA-RSIC system architecture available from HP, the AS400 system architecture available from IBM, or the ARM system architecture available from ARM. The operating system mentioned in the present invention can be, but is not limited to, Windows operating system available from Microsoft, Android operating system, HP-UX operating system, iOS operating system from Apple. The microprocessor mentioned in the present invention can be, but is not limited to, 8051 microprocessor series and i960 microprocessor series from Intel, ARM microprocessor series from ARM, MIPS series, AVR series from Atmel. The detecting circuit mentioned in the present invention can be part of a capacitive detecting circuit in a capacitive touch sensitive apparatus produced by the applicant or other companies. The drive circuit mentioned in the present invention can be part of a capacitive drive circuit in a capacitive touch sensitive apparatus produced by the applicant or other companies. Over billions of electronic apparatuses (e.g. smartphones) including capacitive touch sensitive processing apparatuses have been produced, therefore the applicant believe the detecting circuit, the drive circuit, the microprocessor, the processor, the host, and the operating system described above are well known to those with ordinary skills in the art.

In an embodiment of the present invention, an electronic system for configuring interconnection parameters between a touch panel and a touch sensitive processing apparatus is provided. The electronic system includes a first apparatus connector, the touch panel and the touch sensitive processing apparatus. The touch panel includes M parallel first touch sensitive electrodes covering the touch panel, wherein M is a positive integer equal to or greater than 2, and a first touch sensitive electrode connector for sequentially bundling the M first touch sensitive electrodes. The first apparatus connector is used for sequentially bundling P first circuits that are connected with the M first touch sensitive electrodes and connecting with the first touch sensitive electrode connector, wherein P is a positive integer greater than M. The touch sensitive processing apparatus includes: a detecting circuit, an interconnection network for connecting the P first circuits of the first apparatus connector with the detecting circuit, and a microprocessor. The microprocessor connected with the detecting circuit and the interconnection network is configured for detecting, by the detecting circuit, an impedance value of each of the P first circuits sequentially via the interconnection network to determine that there are M consecutive first circuits in the P first circuits connected with the M consecutive first touch sensitive electrodes based on the impedance values. As such, this embodiment is capable of detecting how many first touch sensitive electrodes there are, and which first circuits in the P first circuits are connected with these first touch sensitive electrodes.

In a variant of the embodiment above, the touch panel further includes: N parallel second touch sensitive electrodes covering the touch panel, wherein each first touch sensitive electrode intersects with the N second touch sensitive electrodes to form N touch sensitive sensing areas, and N is a positive integer equal to or greater than 2; and a second touch sensitive electrode connector for sequentially bundling the N second touch sensitive electrodes. The electronic system further includes: a second apparatus connector for sequentially bundling Q second circuits that are connected with the N second touch sensitive electrodes and connecting with the second touch sensitive electrode connector, wherein Q is a positive integer greater than N. The touch sensitive processing apparatus further includes: a drive circuit, wherein the interconnection network is further used for connecting the drive circuit with the M consecutive first circuits. The microprocessor is further configured for having the drive circuit emit a drive signal from any one of the M first circuits via the interconnection network; connecting, by the interconnection network, the Q second circuits with the detecting circuit to detect that there are N consecutive second circuits that sensed the drive signal; and recording that the N consecutive second circuits are connected with the N consecutive second touch sensitive electrodes. As such, this embodiment is capable of detecting how many second touch sensitive electrodes there are, and which second circuits in the Q second circuits are connected to these second touch sensitive electrodes. In a variant of the embodiment above, when a second circuit did not sense the drive signal, and the second circuits before and after this second circuit have detected the drive signal, the microprocessor then determines that the second touch sensitive electrode connected with this second circuit is faulty, and reports information related to this defect to a host of the electronic system. Accordingly, this embodiment is capable of detecting which second touch sensitive electrodes are faulty and notifying the host and in turn the user about the defects. In a variant of the embodiment above, the microprocessor is configured for determining how the second touch sensitive electrode connector is arranged with respect to the second apparatus connector based on the timing order in which the N consecutive second circuits detected the drive signal. Accordingly, this embodiment is capable of allowing the touch sensitive processing apparatus to know how the second touch sensitive electrode connector is arranged with respect to the second apparatus connector. In a variant of the embodiment above, the microprocessor is further configured for: calculating a phase shift between each neighboring pair of second circuits of the N consecutive second circuits receiving the drive signal; and when the phase shift is larger than a phase shift threshold, determining at least one of the two second touch sensitive electrodes connected with the pair of second circuits is faulty and reporting information related to the defect to a host of the electronic system. As such, this embodiment is capable of detecting which second touch sensitive electrodes are faulty, and informing the host and in turn the user about the defects.

In a variant of the above embodiment, the touch panel further includes: N parallel second touch sensitive electrodes covering the touch panel, wherein each first touch sensitive electrode intersects with N second touch sensitive electrodes to form N touch sensitive sensing areas, and N is a positive integer equal to or greater than 2, and a second touch sensitive electrode connector for sequentially bundling the N second touch sensitive electrodes. The electronic system further includes a second apparatus connector for sequentially bundling Q second circuits that are connected with the N second touch sensitive electrodes and connecting with the second touch sensitive electrode connector, wherein Q is a positive integer greater than N. The touch sensitive processing apparatus further includes: a drive circuit, wherein the interconnection network is further used for connecting the drive circuit with the Q second circuits. The microprocessor is further configured for having the drive circuit sequentially emit a drive signal from one of the Q second circuits via the interconnection network; when the detecting circuit is able to receive the drive signal from the M first circuits, recording the second circuit emitting the drive signal as being connected to a second touch sensitive electrode. As such, this embodiment is capable of detecting how many second touch sensitive electrodes there are, and which second circuits in the Q second circuits are connected to these second touch sensitive electrodes. In a variant of the embodiment above, when a first circuit did not sense the drive signal, and the first circuits before and after this first circuit have detected the drive signal, the microprocessor then determines that the first touch sensitive electrode connected with this first circuit is faulty, and reports information related to this defect to a host of the electronic system. Accordingly, this embodiment is capable of detecting which first touch sensitive electrodes are faulty and notifying the host and in turn the user about the defects. In a variant of the embodiment above, when the P consecutive first circuits did not sense the drive signal, the microprocessor then determines that the second touch sensitive electrode that emitted the drive signal is faulty, and reports information related to this defect to a host of the electronic system. Accordingly, this embodiment is capable of detecting which second touch sensitive electrodes are faulty and notifying the host and in turn the user about the defects. In a variant of the embodiment above, the microprocessor is configured for determining how the first touch sensitive electrode connector is arranged with respect to the first apparatus connector based on the timing order in which the M consecutive first circuits detected the drive signal. Accordingly, this embodiment is capable of allowing the touch sensitive processing apparatus to know how the first touch sensitive electrode connector is arranged with respect to the first apparatus connector. In a variant of the embodiment above, the microprocessor is further configured for: calculating a phase shift between each neighboring pair of first circuits of the M consecutive first circuits receiving the drive signal; and when the phase shift is larger than a phase shift threshold, determining at least one of the two first touch sensitive electrodes connected with the pair of first circuits is faulty and reporting information related to the defect to a host of the electronic system. As such, the embodiment is capable of detecting which first touch sensitive electrodes are faulty, and informing the host about the defects, which in turn allows a user to know about the defects.

In a variant of the above embodiment, the touch panel further includes: N parallel second touch sensitive electrodes covering the touch panel, wherein each first touch sensitive electrode intersects with N second touch sensitive electrodes to form N touch sensitive sensing areas, and N is a positive integer equal to or greater than 2, and a second touch sensitive electrode connector for sequentially bundling the N second touch sensitive electrodes. The electronic system further includes a second apparatus connector for sequentially bundling Q second circuits that are connected with the N second touch sensitive electrodes and connecting with the second touch sensitive electrode connector, wherein Q is a positive integer greater than N. The interconnection network is further used for connecting the detecting circuit with the Q second circuits. The microprocessor is further configured for detecting, by the detecting circuit, an impedance value of each of the Q second circuits sequentially via the interconnection network, and determining that there are N consecutive second circuits in the Q second circuits connected to the N second touch sensitive electrodes based on the impedance values. As such, this embodiment is capable of detecting how many second touch sensitive electrodes there are, and which second circuits in the Q second circuits are connected with these second touch sensitive electrodes.

In a variant of the above embodiment, when the impedance value of a first circuit among the M consecutive first circuits is greater than a first threshold, the microprocessor determines that the first touch sensitive electrode connected with this first circuit is faulty, and reports information related to the defect to a host of the electronic system. As such, the embodiment is capable of detecting which first touch sensitive electrodes are faulty, and informing the host and in turn the user about the defects.

In a variant of the above embodiment, when the impedance value of a second circuit among the N consecutive second circuits is greater than a second threshold, the microprocessor determines that the second touch sensitive electrode connected with this second circuit is faulty, and reports information related to the defect to a host of the electronic system. As such, the embodiment is capable of detecting which second touch sensitive electrodes are faulty, and informing the host and in turn the user about the defects.

In a variant of the above embodiment, the electronic system further includes a display screen and a host connected with the display screen, wherein the display screen and the touch panel form a touch screen. The host is configured for: having the touch screen display a touch point at a touch sensitive area intersecting the Xth first touch sensitive electrode and the Yth second touch sensitive electrode; having the touch sensitive processing apparatus, via the interconnection network, perform capacitive detection using the M consecutive first touch sensitive electrodes and the N consecutive second touch sensitive electrodes to detect a touch event corresponding to the touch point; based on the first touch sensitive electrode and the second touch sensitive electrode corresponding to the touch event, and the Xth first touch sensitive electrode and the Yth second touch sensitive electrode corresponding to the touch point, determining how the M consecutive first touch sensitive electrodes and the N consecutive second touch sensitive electrodes are arranged on the touch screen. Accordingly, this embodiment allows a user of the host to know the arrangement of the M consecutive first touch sensitive electrodes and the N consecutive second touch sensitive electrodes on the touch screen. In a variant of the above embodiment, the host further determines whether the first touch sensitive electrode connector is connected to the first apparatus connector or the second apparatus connector based on the first touch sensitive electrode and the second touch sensitive electrode corresponding to the touch event, and the Xth first touch sensitive electrode and the Yth second touch sensitive electrode corresponding to the touch point. Accordingly, this embodiment allows a user of the host to know the connection relationships between the first and the second touch sensitive electrode connectors and the first and the second apparatus connectors.

In a variant of the above embodiment, the microprocessor determines whether the first touch sensitive electrode connector is connected to the first apparatus connector or the second apparatus connector based on the numbers of the first touch sensitive electrodes and the second touch sensitive electrodes on the touch panel and the sizes of M and N. Accordingly, this embodiment allows a user of the host to know the connection relationships between the first and the second touch sensitive electrode connectors and the first and the second apparatus connectors.

In an embodiment of the present invention, a touch sensitive processing apparatus for configuring interconnection parameters between a touch panel in an electronic system and the touch sensitive processing apparatus is provided. The touch panel includes M parallel first touch sensitive electrodes covering the touch panel, wherein M is a positive integer equal to or greater than 2, and a first touch sensitive electrode connector for sequentially bundling the M first touch sensitive electrodes. The electronic system includes a first apparatus connector for sequentially bundling P first circuits that are connected with the M first touch sensitive electrodes and connecting with the first touch sensitive electrode connector, wherein P is a positive integer greater than M. The touch sensitive processing apparatus includes: a detecting circuit, an interconnection network for connecting the P first circuits of the first apparatus connector with the detecting circuit, and a microprocessor connected with the detecting circuit and the interconnection network. The microprocessor is configured for detecting, by the detecting circuit, an impedance value of each of the P first circuits sequentially via the interconnection network to determine that there are M consecutive first circuits in the P first circuits connected with the M consecutive first touch sensitive electrodes based on the impedance values. As such, this embodiment is capable of detecting how many first touch sensitive electrodes there are, and which first circuits in the P first circuits are connected with these first touch sensitive electrodes.

In a variant of the embodiment above, the touch panel further includes: N parallel second touch sensitive electrodes covering the touch panel, wherein each first touch sensitive electrode intersects with the N second touch sensitive electrodes to form N touch sensitive sensing areas, and N is a positive integer equal to or greater than 2; and a second touch sensitive electrode connector for sequentially bundling the N second touch sensitive electrodes. The electronic system further includes: a second apparatus connector for sequentially bundling Q second circuits that are connected with the N second touch sensitive electrodes and connecting with the second touch sensitive electrode connector, wherein Q is a positive integer greater than N. The touch sensitive processing apparatus further includes: a drive circuit, wherein the interconnection network is further used for connecting the drive circuit with the M consecutive first circuits. The microprocessor is further configured for having the drive circuit emit a drive signal from any one of the M first circuits via the interconnection network; connecting, by the interconnection network, the Q second circuits with the detecting circuit to detect that there are N consecutive second circuits that sensed the drive signal; and recording that the N consecutive second circuits are connected with the N consecutive second touch sensitive electrodes. As such, this embodiment is capable of detecting how many second touch sensitive electrodes there are, and which second circuits in the Q second circuits are connected to these second touch sensitive electrodes. In a variant of the embodiment above, when a second circuit did not sense the drive signal, and the second circuits before and after this second circuit have detected the drive signal, the microprocessor then determines that the second touch sensitive electrode connected with this second circuit is faulty, and reports information related to this defect to a host of the electronic system. Accordingly, this embodiment is capable of detecting which second touch sensitive electrodes are faulty and notifying the host and in turn the user about the defects. In a variant of the embodiment above, the microprocessor is configured for determining how the second touch sensitive electrode connector is arranged with respect to the second apparatus connector based on the timing order in which the N consecutive second circuits detected the drive signal. Accordingly, this embodiment is capable of allowing the touch sensitive processing apparatus to know how the second touch sensitive electrode connector is arranged with respect to the second apparatus connector. In a variant of the embodiment above, the microprocessor is further configured for: calculating a phase shift between each neighboring pair of second circuits of the N consecutive second circuits receiving the drive signal; and when the phase shift is larger than a phase shift threshold, determining at least one of the two second touch sensitive electrodes connected with the pair of second circuits is faulty and reporting information related to the defect to a host of the electronic system. As such, this embodiment is capable of detecting which second touch sensitive electrodes are faulty, and informing the host and in turn the user about the defects.

In a variant of the above embodiment, the touch panel further includes: N parallel second touch sensitive electrodes covering the touch panel, wherein each first touch sensitive electrode intersects with N second touch sensitive electrodes to form N touch sensitive sensing areas, and N is a positive integer equal to or greater than 2, and a second touch sensitive electrode connector for sequentially bundling the N second touch sensitive electrodes. The electronic system further includes a second apparatus connector for sequentially bundling Q second circuits that are connected with the N second touch sensitive electrodes and connecting with the second touch sensitive electrode connector, wherein Q is a positive integer greater than N. The touch sensitive processing apparatus further includes: a drive circuit, wherein the interconnection network is further used for connecting the drive circuit with the Q second circuits. The microprocessor is further configured for having the drive circuit sequentially emit a drive signal from one of the Q second circuits via the interconnection network; when the detecting circuit is able to receive the drive signal from the M first circuits, recording the second circuit emitting the drive signal as being connected to a second touch sensitive electrode. As such, this embodiment is capable of detecting how many second touch sensitive electrodes there are, and which second circuits in the Q second circuits are connected to these second touch sensitive electrodes. In a variant of the embodiment above, when a first circuit did not sense the drive signal, and the first circuits before and after this first circuit have detected the drive signal, the microprocessor then determines that the first touch sensitive electrode connected with this first circuit is faulty, and reports information related to this defect to a host of the electronic system. Accordingly, this embodiment is capable of detecting which first touch sensitive electrodes are faulty and notifying the host and in turn the user about the defects. In a variant of the embodiment above, when the P consecutive first circuits did not sense the drive signal, the microprocessor then determines that the second touch sensitive electrode that emitted the drive signal is faulty, and reports information related to this defect to a host of the electronic system. Accordingly, this embodiment is capable of detecting which second touch sensitive electrodes are faulty and notifying the host and in turn the user about the defects. In a variant of the embodiment above, the microprocessor is configured for determining how the first touch sensitive electrode connector is arranged with respect to the first apparatus connector based on the timing order in which the M consecutive first circuits detected the drive signal. Accordingly, this embodiment is capable of allowing the touch sensitive processing apparatus to know how the first touch sensitive electrode connector is arranged with respect to the first apparatus connector. In a variant of the embodiment above, the microprocessor is further configured for: calculating a phase shift between each neighboring pair of first circuits of the M consecutive first circuits receiving the drive signal; and when the phase shift is larger than a phase shift threshold, determining at least one of the two first touch sensitive electrodes connected with the pair of first circuits is faulty and reporting information related to the defect to a host of the electronic system. As such, the embodiment is capable of detecting which first touch sensitive electrodes are faulty, and informing the host about the defects, which in turn allows a user to know about the defects.

In a variant of the above embodiment, the touch panel further includes: N parallel second touch sensitive electrodes covering the touch panel, wherein each first touch sensitive electrode intersects with N second touch sensitive electrodes to form N touch sensitive sensing areas, and N is a positive integer equal to or greater than 2, and a second touch sensitive electrode connector for sequentially bundling the N second touch sensitive electrodes. The electronic system further includes a second apparatus connector for sequentially bundling Q second circuits that are connected with the N second touch sensitive electrodes and connecting with the second touch sensitive electrode connector, wherein Q is a positive integer greater than N. The interconnection network is further used for connecting the detecting circuit with the Q second circuits. The microprocessor is further configured for detecting, by the detecting circuit, an impedance value of each of the Q second circuits sequentially via the interconnection network, and determining that there are N consecutive second circuits in the Q second circuits connected to the N second touch sensitive electrodes based on the impedance values. As such, this embodiment is capable of detecting how many second touch sensitive electrodes there are, and which second circuits in the Q second circuits are connected with these second touch sensitive electrodes. In a variant of the above embodiment, when the impedance value of a second circuit among the N consecutive second circuits is greater than a second threshold, the microprocessor determines that the second touch sensitive electrode connected with this second circuit is faulty, and reports information related to the defect to a host of the electronic system. As such, the embodiment is capable of detecting which second touch sensitive electrodes are faulty, and informing the host and in turn the user about the defects.

In a variant of the above embodiment, when the impedance value of a first circuit among the M consecutive first circuits is greater than a first threshold, the microprocessor determines that the first touch sensitive electrode connected with this first circuit is faulty, and reports information related to the defect to a host of the electronic system. As such, the embodiment is capable of detecting which first touch sensitive electrodes are faulty, and informing the host and in turn the user about the defects.

In a variant of the above embodiment, the microprocessor determines whether the first touch sensitive electrode connector is connected to the first apparatus connector or the second apparatus connector based on the numbers of the first touch sensitive electrodes and the second touch sensitive electrodes on the touch panel and the sizes of M and N. Accordingly, this embodiment allows a user of the host to know the connection relationships between the first and the second touch sensitive electrode connectors and the first and the second apparatus connectors.

In an embodiment of the present invention, a touch sensitive processing method for configuring interconnection parameters between a touch panel and the touch sensitive processing apparatus in an electronic system is provided. The touch panel includes M parallel first touch sensitive electrodes covering the touch panel, wherein M is a positive integer equal to or greater than 2, and a first touch sensitive electrode connector for sequentially bundling the M first touch sensitive electrodes. The electronic system includes a first apparatus connector for sequentially bundling P first circuits that are connected with the M first touch sensitive electrodes and connecting with the first touch sensitive electrode connector, wherein P is a positive integer greater than M. The touch sensitive processing method includes: connecting, by an interconnection network of the touch sensitive processing apparatus, the P first circuits of the first apparatus connector with a detecting circuit of the touch sensitive processing apparatus; and having the detecting circuit detect, via the interconnection network, an impedance value of each of the P first circuits sequentially via the interconnection network to determine that there are M consecutive first circuits in the P first circuits connected with the M consecutive first touch sensitive electrodes based on the impedance values. As such, this embodiment is capable of detecting how many first touch sensitive electrodes there are, and which first circuits in the P first circuits are connected with these first touch sensitive electrodes.

In a variant of the embodiment above, the touch panel further includes: N parallel second touch sensitive electrodes covering the touch panel, wherein each first touch sensitive electrode intersects with the N second touch sensitive electrodes to form N touch sensitive sensing areas, and N is a positive integer equal to or greater than 2; and a second touch sensitive electrode connector for sequentially bundling the N second touch sensitive electrodes. The electronic system further includes: a second apparatus connector for sequentially bundling Q second circuits that are connected with the N second touch sensitive electrodes and connecting with the second touch sensitive electrode connector, wherein Q is a positive integer greater than N. The touch sensitive processing method further includes: connecting, by the interconnection network, a drive circuit of the touch sensitive processing apparatus with the M first circuits; having the drive circuit emit a drive signal from any one of the M first circuits via the interconnection network; connecting, by the interconnection network, the Q second circuits with the detecting circuit to detect that there are N consecutive second circuits that sensed the drive signal; and recording that the N consecutive second circuits are connected with the N consecutive second touch sensitive electrodes. As such, this embodiment is capable of detecting how many second touch sensitive electrodes there are, and which second circuits in the Q second circuits are connected to these second touch sensitive electrodes. In a variant of the embodiment above, when a second circuit did not sense the drive signal, and the second circuits before and after this second circuit have detected the drive signal, the second touch sensitive electrode connected with this second circuit is determined to be faulty, and information related to this defect is reported to a host of the electronic system. Accordingly, this embodiment is capable of detecting which second touch sensitive electrodes are faulty and notifying the host and in turn the user about the defects. In a variant of the embodiment above, the touch sensitive processing method further includes: determining how the second touch sensitive electrode connector is arranged with respect to the second apparatus connector based on the timing order in which the N consecutive second circuits detected the drive signal. Accordingly, this embodiment is capable of allowing the touch sensitive processing apparatus to know how the second touch sensitive electrode connector is arranged with respect to the second apparatus connector. In a variant of the embodiment above, the touch sensitive processing method further includes: calculating a phase shift between each neighboring pair of second circuits of the N consecutive second circuits receiving the drive signal; and when the phase shift is larger than a phase shift threshold, determining at least one of the two second touch sensitive electrodes connected with the pair of second circuits is faulty and reporting information related to the defect to a host of the electronic system. As such, this embodiment is capable of detecting which second touch sensitive electrodes are faulty, and informing the host and in turn the user about the defects.

In a variant of the above embodiment, the touch panel further includes: N parallel second touch sensitive electrodes covering the touch panel, wherein each first touch sensitive electrode intersects with N second touch sensitive electrodes to form N touch sensitive sensing areas, and N is a positive integer equal to or greater than 2, and a second touch sensitive electrode connector for sequentially bundling the N second touch sensitive electrodes. The electronic system further includes a second apparatus connector for sequentially bundling Q second circuits that are connected with the N second touch sensitive electrodes and connecting with the second touch sensitive electrode connector, wherein Q is a positive integer greater than N. The touch sensitive processing method further includes: connecting, by the interconnection network, a drive circuit of the touch sensitive processing apparatus with the Q second circuits; having the drive circuit sequentially emit a drive signal from one of the Q second circuits via the interconnection network; when the detecting circuit is able to receive the drive signal from the M first circuits, recording the second circuit emitting the drive signal as being connected to a second touch sensitive electrode. As such, this embodiment is capable of detecting how many second touch sensitive electrodes there are, and which second circuits in the Q second circuits are connected to these second touch sensitive electrodes. In a variant of the embodiment above, when a first circuit did not sense the drive signal, and the first circuits before and after this first circuit have detected the drive signal, the first touch sensitive electrode connected with this first circuit is determined to be faulty, and information related to this defect is reported to a host of the electronic system. Accordingly, this embodiment is capable of detecting which first touch sensitive electrodes are faulty and notifying the host and in turn the user about the defects. In a variant of the embodiment above, when the P consecutive first circuits did not sense the drive signal, the second touch sensitive electrode that emitted the drive signal is determined to be faulty, and information related to this defect is reported to a host of the electronic system. Accordingly, this embodiment is capable of detecting which second touch sensitive electrodes are faulty and notifying the host and in turn the user about the defects. In a variant of the embodiment above, the touch sensitive processing method further includes: determining how the first touch sensitive electrode connector is arranged with respect to the first apparatus connector based on the timing order in which the M consecutive first circuits detected the drive signal. Accordingly, this embodiment is capable of allowing the touch sensitive processing apparatus to know how the first touch sensitive electrode connector is arranged with respect to the first apparatus connector. In a variant of the embodiment above, the touch sensitive processing method further includes: calculating a phase shift between each neighboring pair of first circuits of the M consecutive first circuits receiving the drive signal; and when the phase shift is larger than a phase shift threshold, determining at least one of the two first touch sensitive electrodes connected with the pair of first circuits is faulty and reporting information related to the defect to a host of the electronic system. As such, the embodiment is capable of detecting which first touch sensitive electrodes are faulty, and informing the host about the defects, which in turn allows a user to know about the defects.

In a variant of the above embodiment, the touch panel further includes: N parallel second touch sensitive electrodes covering the touch panel, wherein each first touch sensitive electrode intersects with N second touch sensitive electrodes to form N touch sensitive sensing areas, and N is a positive integer equal to or greater than 2, and a second touch sensitive electrode connector for sequentially bundling the N second touch sensitive electrodes. The electronic system further includes a second apparatus connector for sequentially bundling Q second circuits that are connected with the N second touch sensitive electrodes and connecting with the second touch sensitive electrode connector, wherein Q is a positive integer greater than N. The touch sensitive processing method further includes: connecting, by the interconnection network, the detecting circuit with the Q second circuits; having the detecting circuit detect, via the interconnection network, an impedance value of each of the Q second circuits sequentially via the interconnection network, and determining that there are N consecutive second circuits in the Q second circuits connected to the N second touch sensitive electrodes based on the impedance values. As such, this embodiment is capable of detecting how many second touch sensitive electrodes there are, and which second circuits in the Q second circuits are connected with these second touch sensitive electrodes. In a variant of the above embodiment, when the impedance value of a second circuit among the N consecutive second circuits is greater than a second threshold, the second touch sensitive electrode connected with this second circuit is determined to be faulty, and information related to the defect is reported to a host of the electronic system. As such, the embodiment is capable of detecting which second touch sensitive electrodes are faulty, and informing the host and in turn the user about the defects.

In a variant of the above embodiment, when the impedance value of a first circuit among the M consecutive first circuits is greater than a first threshold, the first touch sensitive electrode connected with this first circuit is determined to be faulty, and information related to the defect is reported to a host of the electronic system. As such, the embodiment is capable of detecting which first touch sensitive electrodes are faulty, and informing the host and in turn the user about the defects.

In a variant of the above embodiment, the first touch sensitive electrode connector is determined to be connected to the first apparatus connector or the second apparatus connector based on the numbers of the first touch sensitive electrodes and the second touch sensitive electrodes on the touch panel and the sizes of M and N. Accordingly, this embodiment allows a user of the host to know the connection relationships between the first and the second touch sensitive electrode connectors and the first and the second apparatus connectors.

In an embodiment of the present invention, an electronic system for configuring interconnection parameters between a touch panel and a touch sensitive processing apparatus is provided. The electronic system includes: the touch panel and the touch sensitive processing apparatus. The touch panel includes M parallel first touch sensitive electrodes covering the touch panel, wherein M is a positive integer equal to or greater than 2; N parallel second touch sensitive electrodes covering the touch panel, wherein each first touch sensitive electrode intersects with the N second touch sensitive electrodes to form N touch sensitive sensing areas, and N is a positive integer equal to or greater than 2; a first touch sensitive electrode connector for sequentially bundling the M first touch sensitive electrodes; and a second touch sensitive electrode connector for sequentially bundling the N second touch sensitive electrodes. The electronic system further includes: a first apparatus connector for sequentially bundling P first circuits that are connected with the M first touch sensitive electrodes and connecting with the first touch sensitive electrode connector, wherein P is a positive integer greater than M, and a second apparatus connector for sequentially bundling Q second circuits that are connected with the N second touch sensitive electrodes and connecting with the second touch sensitive electrode connector, wherein Q is a positive integer greater than N. The touch sensitive processing apparatus includes: a detecting circuit, a drive circuit; an interconnection network for connecting the P first circuits of the first apparatus connector with the drive circuit and for connecting the Q second circuits of the second apparatus connector with the detecting circuit; and a microprocessor connected with the drive circuit, the detecting circuit and the interconnection network. The microprocessor is configured for having the drive circuit emit a drive signal from at least one of the first touch sensitive electrodes via the interconnection network; and having the detecting circuit detect, via the interconnection network, that there are N consecutive second circuits in the Q second circuits connected with the N consecutive second touch sensitive electrodes. Accordingly, this embodiment is capable of knowing how many second circuits are connected with the second touch sensitive electrodes, and which of these second circuits are connected with the second touch sensitive electrodes.

In a variant of the embodiment above, the microprocessor is further configured for: calculating a phase shift between each neighboring pair of second circuits of the N consecutive second circuits receiving the drive signal; and when the phase shift is larger than a phase shift threshold, determining at least one of the two second touch sensitive electrodes connected with the pair of second circuits is faulty and reporting information related to the defect to a host of the electronic system. As such, this embodiment is capable of detecting which second touch sensitive electrodes are faulty, and informing the host and in turn the user about the defects.

In a variant of the embodiment above, when the detecting circuits detects that there are N+2G consecutive second circuits receiving the drive signal, wherein G is a positive integer, the microprocessor is further configured for: calculating a phase shift between each neighboring pair of second circuits of the N+2G consecutive second circuits receiving the drive signal; and among the N+2G consecutive second circuits, if the differences between the phase shifts of the first G second circuits and the last G second circuits and the phase shifts of the interposed N consecutive second circuits are larger than a phase shift difference threshold, determining that the first and the last G second circuits are connected to guard traces, and the interposed N consecutive second circuits are connected to the second touch sensitive electrodes. As such, this embodiment is capable of knowing how many guard traces are at the sides of the second touch sensitive electrodes.

In a variant of the embodiment above, the microprocessor is further configured for: determining how the second touch sensitive electrode connector is arranged with respect to the second apparatus connector based on the timing order in which the N consecutive second circuits detected the drive signal. Accordingly, this embodiment allows the touch sensitive processing apparatus to know how the second touch sensitive electrode connector is arranged with respect to the second apparatus connector.

In a variant of the above embodiment, when twice the M is greater than P, the microprocessor is further configured for having the drive circuit emit a drive signal from the first touch sensitive electrode connected with the Xth first touch sensitive electrode via the interconnection network, wherein X is one of the following: when P/2 is an integer, X is P/2; when P/2 is not an integer, X is the smallest integer greater than P/2; and when P/2 is not an integer, X is the largest integer less than P/2. Accordingly, when the number of the first touch sensitive electrodes is more than half of the number of the first circuits, i.e. twice M is greater than P, then the middle one of these first circuits is bound to be connected to a first touch sensitive electrode, and this middle one of the first circuits can be the P/2th first circuit, the smallest integer greater than P/2, or the largest integer less than P/2.

In a variant of the above embodiment, the microprocessor is further configured for having the drive circuit emit a drive signal from one of the second touch sensitive electrodes connected with the N consecutive second circuits via the interconnection network; and having the detecting circuit detect, via the interconnection network, that there are M consecutive first circuits in the P first circuits connected with the M consecutive first touch sensitive electrodes. Accordingly, this embodiment is capable of knowing how many first circuits are connected with the second touch sensitive electrodes, and which of these first circuits are connected with the first touch sensitive electrodes. In a variant of the embodiment above, the microprocessor is further configured for: calculating a phase shift between each neighboring pair of first circuits of the M consecutive first circuits receiving the drive signal; and when the phase shift is larger than a phase shift threshold, determining at least one of the two first touch sensitive electrodes connected with the pair of first circuits is faulty and reporting information related to the defect to a host of the electronic system. As such, this embodiment is capable of detecting which first touch sensitive electrodes are faulty, and informing the host and in turn the user about the defects. In a variant of the embodiment above, when the detecting circuits detects that there are M+2H consecutive first circuits receiving the drive signal, wherein H is a positive integer, the microprocessor is further configured for: calculating a phase shift between each neighboring pair of first circuits of the M+2H consecutive first circuits receiving the drive signal; and among the M+2H consecutive first circuits, if the differences between the phase shifts of the first H first circuits and the last H first circuits and the phase shifts of the interposed N consecutive first circuits are larger than a phase shift difference threshold, determining that the first and the last H first circuits are connected to guard traces, and the interposed M consecutive first circuits are connected to the first touch sensitive electrodes. As such, this embodiment is capable of knowing how many guard traces are at the sides of the first touch sensitive electrodes. In a variant of the embodiment above, the microprocessor is further configured for: determining how the first touch sensitive electrode connector is arranged with respect to the first apparatus connector based on the timing order in which the M consecutive first circuits detected the drive signal. Accordingly, this embodiment allows the touch sensitive processing apparatus to know how the first touch sensitive electrode connector is arranged with respect to the first apparatus connector.

In an embodiment of the present invention, a touch sensitive processing apparatus for configuring interconnection parameters between a touch panel and the touch sensitive processing apparatus in an electronic system is provided. The touch panel includes M parallel first touch sensitive electrodes covering the touch panel, wherein M is a positive integer equal to or greater than 2; and N parallel second touch sensitive electrodes covering the touch panel, wherein each first touch sensitive electrode intersects with the N second touch sensitive electrodes to form N touch sensitive sensing areas, and N is a positive integer equal to or greater than 2. The touch panel further includes: a first touch sensitive electrode connector for sequentially bundling the M first touch sensitive electrodes; and a second touch sensitive electrode connector for sequentially bundling the N second touch sensitive electrodes. The electronic system includes: a first apparatus connector and a second apparatus connector, wherein the first apparatus connector is used for sequentially bundling P first circuits that are connected with the M first touch sensitive electrodes and connecting with the first touch sensitive electrode connector, wherein P is a positive integer greater than M, and the second apparatus connector is used for sequentially bundling Q second circuits that are connected with the N second touch sensitive electrodes and connecting with the second touch sensitive electrode connector, wherein Q is a positive integer greater than N. The touch sensitive processing apparatus includes: a detecting circuit, a drive circuit; an interconnection network for connecting the P first circuits of the first apparatus connector with the drive circuit and for connecting the Q second circuits of the second apparatus connector with the detecting circuit; and a microprocessor connected with the drive circuit, the detecting circuit and the interconnection network. The microprocessor is configured for having the drive circuit emit a drive signal from at least one of the first touch sensitive electrodes via the interconnection network; and having the detecting circuit detect, via the interconnection network, that there are N consecutive second circuits in the Q second circuits connected with the N consecutive second touch sensitive electrodes. Accordingly, this embodiment is capable of knowing how many second circuits are connected with the second touch sensitive electrodes, and which of these second circuits are connected with the second touch sensitive electrodes.

In a variant of the embodiment above, the microprocessor is further configured for: calculating a phase shift between each neighboring pair of second circuits of the N consecutive second circuits receiving the drive signal; and when the phase shift is larger than a phase shift threshold, determining at least one of the two second touch sensitive electrodes connected with the pair of second circuits is faulty and reporting information related to the defect to a host of the electronic system. As such, this embodiment is capable of detecting which second touch sensitive electrodes are faulty, and informing the host and in turn the user about the defects.

In a variant of the embodiment above, when the detecting circuits detects that there are N+2G consecutive second circuits receiving the drive signal, wherein G is a positive integer, the microprocessor is further configured for: calculating a phase shift between each neighboring pair of second circuits of the N+2G consecutive second circuits receiving the drive signal; and among the N+2G consecutive second circuits, if the differences between the phase shifts of the first G second circuits and the last G second circuits and the phase shifts of the interposed N consecutive second circuits are larger than a phase shift difference threshold, determining that the first and the last G second circuits are connected to guard traces, and the interposed N consecutive second circuits are connected to the second touch sensitive electrodes. As such, this embodiment is capable of knowing how many guard traces are at the sides of the second touch sensitive electrodes.

In a variant of the embodiment above, the microprocessor is further configured for: determining how the second touch sensitive electrode connector is arranged with respect to the second apparatus connector based on the timing order in which the N consecutive second circuits detected the drive signal. Accordingly, this embodiment allows the touch sensitive processing apparatus to know how the second touch sensitive electrode connector is arranged with respect to the second apparatus connector.

In a variant of the above embodiment, when twice the M is greater than P, the microprocessor is further configured for having the drive circuit emit a drive signal from the first touch sensitive electrode connected with the Xth first touch sensitive electrode via the interconnection network, wherein X is one of the following: when P/2 is an integer, X is P/2; when P/2 is not an integer, X is the smallest integer greater than P/2; and when P/2 is not an integer, X is the largest integer less than P/2. Accordingly, when the number of the first touch sensitive electrodes is more than half of the number of the first circuits, i.e. twice M is greater than P, then the middle one of these first circuits is bound to be connected to a first touch sensitive electrode, and this middle one of the first circuits can be the P/2th first circuit, the smallest integer greater than P/2, or the largest integer less than P/2.

In a variant of the above embodiment, the microprocessor is further configured for having the drive circuit emit a drive signal from one of the second touch sensitive electrodes connected with the N consecutive second circuits via the interconnection network; and having the detecting circuit detect, via the interconnection network, that there are M consecutive first circuits in the P first circuits connected with the M consecutive first touch sensitive electrodes. Accordingly, this embodiment is capable of knowing how many first circuits are connected with the second touch sensitive electrodes, and which of these first circuits are connected with the first touch sensitive electrodes. In a variant of the embodiment above, the microprocessor is further configured for: calculating a phase shift between each neighboring pair of first circuits of the M consecutive first circuits receiving the drive signal; and when the phase shift is larger than a phase shift threshold, determining at least one of the two first touch sensitive electrodes connected with the pair of first circuits is faulty and reporting information related to the defect to a host of the electronic system. As such, this embodiment is capable of detecting which first touch sensitive electrodes are faulty, and informing the host and in turn the user about the defects. In a variant of the embodiment above, when the detecting circuits detects that there are M+2H consecutive first circuits receiving the drive signal, wherein H is a positive integer, the microprocessor is further configured for: calculating a phase shift between each neighboring pair of first circuits of the M+2H consecutive first circuits receiving the drive signal; and among the M+2H consecutive first circuits, if the differences between the phase shifts of the first H first circuits and the last H first circuits and the phase shifts of the interposed N consecutive first circuits are larger than a phase shift difference threshold, determining that the first and the last H first circuits are connected to guard traces, and the interposed M consecutive first circuits are connected to the first touch sensitive electrodes. As such, this embodiment is capable of knowing how many guard traces are at the sides of the first touch sensitive electrodes. In a variant of the embodiment above, the microprocessor is further configured for: determining how the first touch sensitive electrode connector is arranged with respect to the first apparatus connector based on the timing order in which the M consecutive first circuits detected the drive signal. Accordingly, this embodiment allows the touch sensitive processing apparatus to know how the first touch sensitive electrode connector is arranged with respect to the first apparatus connector.

In an embodiment of the present invention, a touch sensitive processing method for configuring interconnection parameters between a touch panel and a touch sensitive processing apparatus in an electronic system is provided. The touch panel includes M parallel first touch sensitive electrodes covering the touch panel, wherein M is a positive integer equal to or greater than 2; and N parallel second touch sensitive electrodes covering the touch panel, wherein each first touch sensitive electrode intersects with the N second touch sensitive electrodes to form N touch sensitive sensing areas, and N is a positive integer equal to or greater than 2. The touch panel further includes: a first touch sensitive electrode connector for sequentially bundling the M first touch sensitive electrodes; and a second touch sensitive electrode connector for sequentially bundling the N second touch sensitive electrodes. The electronic system includes: a first apparatus connector and a second apparatus connector, wherein the first apparatus connector is used for sequentially bundling P first circuits that are connected with the M first touch sensitive electrodes and connecting with the first touch sensitive electrode connector, wherein P is a positive integer greater than M, and the second apparatus connector is used for sequentially bundling Q second circuits that are connected with the N second touch sensitive electrodes and connecting with the second touch sensitive electrode connector, wherein Q is a positive integer greater than N. The touch sensitive processing method includes: connecting, via an interconnection network, the P first circuits of the first apparatus connector with a drive circuit of the touch sensitive processing apparatus, and the Q second circuits of the second apparatus connector with a detecting circuit of the touch sensitive processing apparatus; having the drive circuit emit a drive signal from at least one of the first touch sensitive electrodes via the interconnection network; and having the detecting circuit detect, via the interconnection network, that there are N consecutive second circuits in the Q second circuits connected with the N consecutive second touch sensitive electrodes. Accordingly, this embodiment is capable of knowing how many second circuits are connected with the second touch sensitive electrodes, and which of these second circuits are connected with the second touch sensitive electrodes.

In a variant of the embodiment above, the touch sensitive processing method further includes: calculating a phase shift between each neighboring pair of second circuits of the N consecutive second circuits receiving the drive signal; and when the phase shift is larger than a phase shift threshold, determining at least one of the two second touch sensitive electrodes connected with the pair of second circuits is faulty and reporting information related to the defect to a host of the electronic system. As such, this embodiment is capable of detecting which second touch sensitive electrodes are faulty, and informing the host and in turn the user about the defects.

In a variant of the embodiment above, when the detecting circuits detects that there are N+2G consecutive second circuits receiving the drive signal, wherein G is a positive integer, the touch sensitive processing method further includes: calculating a phase shift between each neighboring pair of second circuits of the N+2G consecutive second circuits receiving the drive signal; and among the N+2G consecutive second circuits, if the differences between the phase shifts of the first G second circuits and the last G second circuits and the phase shifts of the interposed N consecutive second circuits are larger than a phase shift difference threshold, determining that the first and the last G second circuits are connected to guard traces, and the interposed N consecutive second circuits are connected to the second touch sensitive electrodes. As such, this embodiment is capable of knowing how many guard traces are at the sides of the second touch sensitive electrodes.

In a variant of the embodiment above, the touch sensitive processing method further includes: determining how the second touch sensitive electrode connector is arranged with respect to the second apparatus connector based on the timing order in which the N consecutive second circuits detected the drive signal. Accordingly, this embodiment allows the touch sensitive processing apparatus to know how the second touch sensitive electrode connector is arranged with respect to the second apparatus connector.

In a variant of the above embodiment, when twice the M is greater than P, the touch sensitive processing method further includes: having the drive circuit emit a drive signal from the first touch sensitive electrode connected with the Xth first touch sensitive electrode via the interconnection network, wherein X is one of the following: when P/2 is an integer, X is P/2; when P/2 is not an integer, X is the smallest integer greater than P/2; and when P/2 is not an integer, X is the largest integer less than P/2. Accordingly, when the number of the first touch sensitive electrodes is more than half of the number of the first circuits, i.e. twice M is greater than P, then the middle one of these first circuits is bound to be connected to a first touch sensitive electrode, and this middle one of the first circuits can be the P/2th first circuit, the smallest integer greater than P/2, or the largest integer less than P/2.

In a variant of the above embodiment, the touch sensitive processing method further includes: having the drive circuit emit a drive signal from one of the second touch sensitive electrodes connected with the N consecutive second circuits via the interconnection network; and having the detecting circuit detect, via the interconnection network, that there are M consecutive first circuits in the P first circuits connected with the M consecutive first touch sensitive electrodes. Accordingly, this embodiment is capable of knowing how many first circuits are connected with the second touch sensitive electrodes, and which of these first circuits are connected with the first touch sensitive electrodes. In a variant of the embodiment above, the touch sensitive processing method further includes: calculating a phase shift between each neighboring pair of first circuits of the M consecutive first circuits receiving the drive signal; and when the phase shift is larger than a phase shift threshold, determining at least one of the two first touch sensitive electrodes connected with the pair of first circuits is faulty and reporting information related to the defect to a host of the electronic system. As such, this embodiment is capable of detecting which first touch sensitive electrodes are faulty, and informing the host and in turn the user about the defects. In a variant of the embodiment above, when the detecting circuits detects that there are M+2H consecutive first circuits receiving the drive signal, wherein H is a positive integer, the touch sensitive processing method further includes: calculating a phase shift between each neighboring pair of first circuits of the M+2H consecutive first circuits receiving the drive signal; and among the M+2H consecutive first circuits, if the differences between the phase shifts of the first H first circuits and the last H first circuits and the phase shifts of the interposed N consecutive first circuits are larger than a phase shift difference threshold, determining that the first and the last H first circuits are connected to guard traces, and the interposed M consecutive first circuits are connected to the first touch sensitive electrodes. As such, this embodiment is capable of knowing how many guard traces are at the sides of the first touch sensitive electrodes. In a variant of the embodiment above, the touch sensitive processing method further includes: determining how the first touch sensitive electrode connector is arranged with respect to the first apparatus connector based on the timing order in which the M consecutive first circuits detected the drive signal. Accordingly, this embodiment allows the touch sensitive processing apparatus to know how the first touch sensitive electrode connector is arranged with respect to the first apparatus connector.

In an embodiment of the present invention, an electronic system for detecting defects of a touch panel is provided. The electronic system includes: a host, the touch panel and a touch sensitive processing apparatus. The host is used for executing an operating system to control the electronic system. The touch panel includes a plurality of parallel first touch sensitive electrodes and a plurality of parallel second touch sensitive electrodes, wherein the plurality of first and second touch sensitive electrodes form a plurality of touch sensitive areas. The touch sensitive processing apparatus includes: a detecting circuit, a drive circuit; an interconnection network for connecting the plurality of second touch sensitive electrodes with the detecting circuit and for connecting the plurality of first touch sensitive electrodes with the drive circuit; and a microprocessor configured for having the drive circuit emit a drive signal from at least one of the first touch sensitive electrodes; having the detecting circuit detect the drive signal via the plurality of second touch sensitive electrodes; calculating a phase shift between each neighboring pair of second touch sensitive electrodes of the plurality of second touch sensitive electrodes; and when the phase shift is larger than a phase shift threshold, determining at least one of the two second touch sensitive electrodes is faulty and reporting information related to the defect to the host. As such, this embodiment is capable of detecting which second touch sensitive electrodes are faulty, and informing the host and in turn the user about the defects.

In a variant of the above embodiment, the drive signal is emitted from the first one of the plurality of first touch sensitive electrodes. Accordingly, this embodiment is capable of testing the second touch sensitive electrodes to see if there are any defects related to their connector under the scenario that the chance of the first touch sensitive electrode emitting the drive signal being faulty is minimized. In a variant of the above embodiment, the microprocessor is further configured for having the drive signal emit the drive signal from the last one of the plurality of first touch sensitive electrodes; having the detecting circuit detect the drive signal via the plurality of second touch sensitive electrodes; calculating a phase shift between each neighboring pair of second touch sensitive electrodes of the plurality of second touch sensitive electrodes; and when the phase shift is larger than a phase shift threshold, determining at least one of the two second touch sensitive electrodes is faulty and reporting information related to the defect to the host. Accordingly, this embodiment is capable of testing almost the entire lengths of these second touch sensitive electrodes to see if there are any defects.

In a variant of the above embodiment, the microprocessor is further configured for connecting, via the interconnection network, at least one of the second touch sensitive electrodes with the drive circuit, and the plurality of first touch sensitive electrodes with the detecting circuit; having the drive circuit emit the drive signal from the at least one second first touch sensitive electrode; having the detecting circuit detect the drive signal via the plurality of first touch sensitive electrodes; calculating a phase shift between each neighboring pair of first touch sensitive electrodes of the plurality of first touch sensitive electrodes; and when the phase shift is larger than a phase shift threshold, determining at least one of the two first touch sensitive electrodes is faulty and reporting information related to the defect to the host. As such, this embodiment is capable of detecting which first touch sensitive electrodes are faulty, and informing the host and in turn the user about the defects. In a variant of the above embodiment, the drive signal is emitted from the first one of the plurality of second touch sensitive electrodes. Accordingly, this embodiment is capable of testing the second touch sensitive electrodes to see if there are any defects related to their connector under the scenario that the chance of the second touch sensitive electrode emitting the drive signal being faulty is minimized. In a variant of the above embodiment, the microprocessor is further configured for having the drive signal emit the drive signal from the last one of the plurality of second touch sensitive electrodes; having the detecting circuit detect the drive signal via the plurality of first touch sensitive electrodes; calculating a phase shift between each neighboring pair of first touch sensitive electrodes of the plurality of first touch sensitive electrodes; and when the phase shift is larger than a phase shift threshold, determining at least one of the two first touch sensitive electrodes is faulty and reporting information related to the defect to the host. Accordingly, this embodiment is capable of testing almost the entire lengths of these first touch sensitive electrodes to see if there are any defects. In a variant of the above embodiment, when the phase shifts of first (and the last) H first touch sensitive electrodes are greater than the phase shift threshold, determining that the first (and the last) H first touch sensitive electrodes are guard traces, wherein H is a positive integer. Accordingly, this embodiment is capable of knowing how many guard traces are at the sides of the first touch sensitive electrodes.

In a variant of the above embodiment, when the phase shifts of first (and the last) G second touch sensitive electrodes are greater than the phase shift threshold, determining that the first (and the last) G second touch sensitive electrodes are guard traces, wherein G is a positive integer. Accordingly, this embodiment is capable of knowing how many guard traces are at the sides of the second touch sensitive electrodes.

In an embodiment of the present invention, a touch sensitive processing apparatus for detecting defects of a touch panel of an electronic system is provided. The electronic system includes: a host and the touch panel. The host is used for executing an operating system to control the electronic system. The touch panel includes a plurality of parallel first touch sensitive electrodes and a plurality of parallel second touch sensitive electrodes, wherein the plurality of first and second touch sensitive electrodes form a plurality of touch sensitive areas. The touch sensitive processing apparatus includes: a detecting circuit, a drive circuit; an interconnection network for connecting the plurality of second touch sensitive electrodes with the detecting circuit and for connecting the plurality of first touch sensitive electrodes with the drive circuit; and a microprocessor configured for having the drive circuit emit a drive signal from at least one of the first touch sensitive electrodes; having the detecting circuit detect the drive signal via the plurality of second touch sensitive electrodes; calculating a phase shift between each neighboring pair of second touch sensitive electrodes of the plurality of second touch sensitive electrodes; and when the phase shift is larger than a phase shift threshold, determining at least one of the two second touch sensitive electrodes is faulty and reporting information related to the defect to the host. As such, this embodiment is capable of detecting which second touch sensitive electrodes are faulty, and informing the host and in turn the user about the defects.

In a variant of the above embodiment, the drive signal is emitted from the first one of the plurality of first touch sensitive electrodes. Accordingly, this embodiment is capable of testing the second touch sensitive electrodes to see if there are any defects related to their connector under the scenario that the chance of the first touch sensitive electrode emitting the drive signal being faulty is minimized. In a variant of the above embodiment, the microprocessor is further configured for having the drive signal emit the drive signal from the last one of the plurality of first touch sensitive electrodes; having the detecting circuit detect the drive signal via the plurality of second touch sensitive electrodes; calculating a phase shift between each neighboring pair of second touch sensitive electrodes of the plurality of second touch sensitive electrodes; and when the phase shift is larger than a phase shift threshold, determining at least one of the two second touch sensitive electrodes is faulty and reporting information related to the defect to the host. Accordingly, this embodiment is capable of testing almost the entire lengths of these second touch sensitive electrodes to see if there are any defects.

In a variant of the above embodiment, the microprocessor is further configured for connecting, via the interconnection network, at least one of the second touch sensitive electrodes with the drive circuit, and the plurality of first touch sensitive electrodes with the detecting circuit; having the drive circuit emit the drive signal from the at least one second first touch sensitive electrode; having the detecting circuit detect the drive signal via the plurality of first touch sensitive electrodes; calculating a phase shift between each neighboring pair of first touch sensitive electrodes of the plurality of first touch sensitive electrodes; and when the phase shift is larger than a phase shift threshold, determining at least one of the two first touch sensitive electrodes is faulty and reporting information related to the defect to the host. As such, this embodiment is capable of detecting which first touch sensitive electrodes are faulty, and informing the host and in turn the user about the defects. In a variant of the above embodiment, the drive signal is emitted from the first one of the plurality of second touch sensitive electrodes. Accordingly, this embodiment is capable of testing the second touch sensitive electrodes to see if there are any defects related to their connector under the scenario that the chance of the second touch sensitive electrode emitting the drive signal being faulty is minimized. In a variant of the above embodiment, the microprocessor is further configured for having the drive signal emit the drive signal from the last one of the plurality of second touch sensitive electrodes; having the detecting circuit detect the drive signal via the plurality of first touch sensitive electrodes; calculating a phase shift between each neighboring pair of first touch sensitive electrodes of the plurality of first touch sensitive electrodes; and when the phase shift is larger than a phase shift threshold, determining at least one of the two first touch sensitive electrodes is faulty and reporting information related to the defect to the host. Accordingly, this embodiment is capable of testing almost the entire lengths of these first touch sensitive electrodes to see if there are any defects. In a variant of the above embodiment, when the phase shifts of first (and the last) H first touch sensitive electrodes are greater than the phase shift threshold, determining that the first (and the last) H first touch sensitive electrodes are guard traces, wherein H is a positive integer. Accordingly, this embodiment is capable of knowing how many guard traces are at the sides of the first touch sensitive electrodes.

In a variant of the above embodiment, when the phase shifts of first (and the last) G second touch sensitive electrodes are greater than the phase shift threshold, determining that the first (and the last) G second touch sensitive electrodes are guard traces, wherein G is a positive integer. Accordingly, this embodiment is capable of knowing how many guard traces are at the sides of the second touch sensitive electrodes.

In an embodiment of the present invention, a touch sensitive processing method adaptable to a touch sensitive processing apparatus for detecting defects of a touch panel of an electronic system is provided. The electronic system includes: a host, the touch sensitive processing apparatus and the touch panel. The host is used for executing an operating system to control the electronic system. The touch panel includes a plurality of parallel first touch sensitive electrodes and a plurality of parallel second touch sensitive electrodes, wherein the plurality of first and second touch sensitive electrodes form a plurality of touch sensitive areas. The touch sensitive processing apparatus includes: a detecting circuit, a drive circuit and an interconnection network. The touch sensitive processing method includes: connecting, via the interconnection network, the plurality of second touch sensitive electrodes with the detecting circuit, and the plurality of first touch sensitive electrodes with the drive circuit; having the drive circuit emit a drive signal from at least one of the first touch sensitive electrodes; having the detecting circuit detect the drive signal via the plurality of second touch sensitive electrodes; calculating a phase shift between each neighboring pair of second touch sensitive electrodes of the plurality of second touch sensitive electrodes; and when the phase shift is larger than a phase shift threshold, determining at least one of the two second touch sensitive electrodes is faulty and reporting information related to the defect to the host. As such, this embodiment is capable of detecting which second touch sensitive electrodes are faulty, and informing the host and in turn the user about the defects.

In a variant of the above embodiment, the drive signal is emitted from the first one of the plurality of first touch sensitive electrodes. Accordingly, this embodiment is capable of testing the second touch sensitive electrodes to see if there are any defects related to their connector under the scenario that the chance of the first touch sensitive electrode emitting the drive signal being faulty is minimized. In a variant of the above embodiment, the touch sensitive processing method further includes: having the drive signal emit the drive signal from the last one of the plurality of first touch sensitive electrodes; having the detecting circuit detect the drive signal via the plurality of second touch sensitive electrodes; calculating a phase shift between each neighboring pair of second touch sensitive electrodes of the plurality of second touch sensitive electrodes; and when the phase shift is larger than a phase shift threshold, determining at least one of the two second touch sensitive electrodes is faulty and reporting information related to the defect to the host. Accordingly, this embodiment is capable of testing almost the entire lengths of these second touch sensitive electrodes to see if there are any defects.

In a variant of the above embodiment, the touch sensitive processing method further includes: connecting, via the interconnection network, at least one of the second touch sensitive electrodes with the drive circuit, and the plurality of first touch sensitive electrodes with the detecting circuit; having the drive circuit emit the drive signal from the at least one second first touch sensitive electrode; having the detecting circuit detect the drive signal via the plurality of first touch sensitive electrodes; calculating a phase shift between each neighboring pair of first touch sensitive electrodes of the plurality of first touch sensitive electrodes; and when the phase shift is larger than a phase shift threshold, determining at least one of the two first touch sensitive electrodes is faulty and reporting information related to the defect to the host. As such, this embodiment is capable of detecting which first touch sensitive electrodes are faulty, and informing the host and in turn the user about the defects. In a variant of the above embodiment, the drive signal is emitted from the first one of the plurality of second touch sensitive electrodes. Accordingly, this embodiment is capable of testing the second touch sensitive electrodes to see if there are any defects related to their connector under the scenario that the chance of the second touch sensitive electrode emitting the drive signal being faulty is minimized. In a variant of the above embodiment, the touch sensitive processing method further includes: having the drive signal emit the drive signal from the last one of the plurality of second touch sensitive electrodes; having the detecting circuit detect the drive signal via the plurality of first touch sensitive electrodes; calculating a phase shift between each neighboring pair of first touch sensitive electrodes of the plurality of first touch sensitive electrodes; and when the phase shift is larger than a phase shift threshold, determining at least one of the two first touch sensitive electrodes is faulty and reporting information related to the defect to the host. Accordingly, this embodiment is capable of testing almost the entire lengths of these first touch sensitive electrodes to see if there are any defects. In a variant of the above embodiment, when the phase shifts of first (and the last) H first touch sensitive electrodes are greater than the phase shift threshold, determining that the first (and the last) H first touch sensitive electrodes are guard traces, wherein H is a positive integer. Accordingly, this embodiment is capable of knowing how many guard traces are at the sides of the first touch sensitive electrodes.

In a variant of the above embodiment, when the phase shifts of first (and the last) G second touch sensitive electrodes are greater than the phase shift threshold, determining that the first (and the last) G second touch sensitive electrodes are guard traces, wherein G is a positive integer. Accordingly, this embodiment is capable of knowing how many guard traces are at the sides of the second touch sensitive electrodes.

In an embodiment of the present invention, a host for determining correspondences between a plurality of display processing apparatuses and a plurality of touch sensitive processing apparatuses is provided. The host is connected with an electronic system including a first touch screen and a second touch screen. The first touch screen includes a first display interface and a first touch sensitive interface. The second touch screen includes a second display interface and a second touch sensitive interface. The host includes: a first display processing apparatus for connecting with the first display interface; a second display processing apparatus for connecting with the second display interface; a first touch sensitive processing apparatus for connecting with one of the first display interface and the second display interface; a second touch sensitive processing apparatus for connecting with the other one of the first display interface and the second display interface; a peripheral interface for connecting with the first display processing apparatus, the second display processing apparatus, the first touch sensitive processing apparatus and the second touch sensitive processing apparatus; and a processor connected with the peripheral interface configured for: having the first display processing apparatus display a first prompt message via the first touch screen; having the first touch sensitive processing apparatus and the second touch sensitive processing apparatus receive a first touch event; when the first touch event came from the first touch sensitive processing apparatus, then determining that the first touch screen is connected with the first touch sensitive processing apparatus; and when the first touch event came from the second touch sensitive processing apparatus, then determining that the first touch screen is connected with the second touch sensitive processing apparatus. Accordingly, this embodiment is capable of determining the correspondences between a plurality of display processing apparatuses and a plurality of touch sensitive processing apparatuses.

In a variant of the above embodiment, the first prompt message includes a touch sensitive area, when the first touch event came from the first touch sensitive processing apparatus and corresponds to the touch sensitive area, the first touch screen is then determined to be connected with the first touch sensitive processing apparatus. Accordingly, this embodiment is capable of minimizing misjudgments due to accidental touches by the user.

In a variant of the above embodiment, the processor is further configured for having the second display processing apparatus display a first prohibiting message via the second touch screen for asking the user not to touch the second touch screen. Accordingly, this embodiment is capable of minimizing misjudgments due to accidental touches by the user.

In a variant of the above embodiment, the processor is further configured for having the first display processing apparatus display the first prompt message via the first touch screen only after the first touch sensitive processing apparatus and the second touch sensitive processing apparatus have not received any touch events for a period of time. Accordingly, this embodiment is capable of minimizing misjudgments due to accidental touches by the user.

In a variant of the above embodiment, the processor is further configured for, after determining that the first touch screen is connected with the first touch sensitive processing apparatus, having the second display processing apparatus display a second prompt message via the second touch screen, having the second touch sensitive processing apparatus receive a second touch event; and determining that the second touch screen is connected with the second touch sensitive processing apparatus. Accordingly, this embodiment is capable of reconfirming the correspondences of the plurality of display processing apparatuses and the plurality of touch sensitive processing apparatuses. In a variant of the above embodiment, the processor is further configured for having the first display processing apparatus display a second prohibiting message via the first touch screen for asking the user not to touch the first touch screen. Accordingly, this embodiment is capable of minimizing misjudgments due to accidental touches by the user.

In an embodiment of the present invention, a method adaptable to a processor of a host of an electronic system for determining correspondences between a plurality of display processing apparatuses and a plurality of touch sensitive processing apparatuses is provided. The electronic system includes a first touch screen and a second touch screen. The first touch screen includes a first display interface and a first touch sensitive interface. The second touch screen includes a second display interface and a second touch sensitive interface. The host includes: a first display processing apparatus for connecting with the first display interface; a second display processing apparatus for connecting with the second display interface; a first touch sensitive processing apparatus for connecting with one of the first display interface and the second display interface; a second touch sensitive processing apparatus for connecting with the other one of the first display interface and the second display interface; and a peripheral interface for connecting with the first display processing apparatus, the second display processing apparatus, the first touch sensitive processing apparatus and the second touch sensitive processing apparatus. The method includes: having the first display processing apparatus display a first prompt message via the first touch screen; having the first touch sensitive processing apparatus and the second touch sensitive processing apparatus receive a first touch event; when the first touch event came from the first touch sensitive processing apparatus, then determining that the first touch screen is connected with the first touch sensitive processing apparatus; and when the first touch event came from the second touch sensitive processing apparatus, then determining that the first touch screen is connected with the second touch sensitive processing apparatus. Accordingly, this embodiment is capable of determining the correspondences between a plurality of display processing apparatuses and a plurality of touch sensitive processing apparatuses.

In a variant of the above embodiment, the first prompt message includes a touch sensitive area, when the first touch event came from the first touch sensitive processing apparatus and corresponds to the touch sensitive area, the first touch screen is then determined to be connected with the first touch sensitive processing apparatus. Accordingly, this embodiment is capable of minimizing misjudgments due to accidental touches by the user.

In a variant of the above embodiment, the method further includes having the second display processing apparatus display a first prohibiting message via the second touch screen for asking the user not to touch the second touch screen. Accordingly, this embodiment is capable of minimizing misjudgments due to accidental touches by the user.

In a variant of the above embodiment, the method further includes having the first display processing apparatus display the first prompt message via the first touch screen only after the first touch sensitive processing apparatus and the second touch sensitive processing apparatus have not received any touch events for a period of time. Accordingly, this embodiment is capable of minimizing misjudgments due to accidental touches by the user.

In a variant of the above embodiment, the method further includes, after determining that the first touch screen is connected with the first touch sensitive processing apparatus, having the second display processing apparatus display a second prompt message via the second touch screen, having the second touch sensitive processing apparatus receive a second touch event; and determining that the second touch screen is connected with the second touch sensitive processing apparatus. Accordingly, this embodiment is capable of reconfirming the correspondences of the plurality of display processing apparatuses and the plurality of touch sensitive processing apparatuses. In a variant of the above embodiment, the method further includes having the first display processing apparatus display a second prohibiting message via the first touch screen for asking the user not to touch the first touch screen. Accordingly, this embodiment is capable of minimizing misjudgments due to accidental touches by the user.

In an embodiment of the present invention, an electronic system for determining correspondences between a plurality of display processing apparatuses and a plurality of touch sensitive processing apparatuses is provided. The electronic system includes a first touch screen, a second touch screen and a host. The first touch screen includes a first display interface and a first touch sensitive interface. The second touch screen includes a second display interface and a second touch sensitive interface. The host includes: a first display processing apparatus for connecting with the first display interface; a second display processing apparatus for connecting with the second display interface; a first touch sensitive processing apparatus for connecting with one of the first display interface and the second display interface; a second touch sensitive processing apparatus for connecting with the other one of the first display interface and the second display interface; a peripheral interface for connecting with the first display processing apparatus, the second display processing apparatus, the first touch sensitive processing apparatus and the second touch sensitive processing apparatus; and a processor connected with the peripheral interface configured for: having the first display processing apparatus display a first prompt message via the first touch screen; having the first touch sensitive processing apparatus and the second touch sensitive processing apparatus receive a first touch event; when the first touch event came from the first touch sensitive processing apparatus, then determining that the first touch screen is connected with the first touch sensitive processing apparatus; and when the first touch event came from the second touch sensitive processing apparatus, then determining that the first touch screen is connected with the second touch sensitive processing apparatus. Accordingly, this embodiment is capable of determining the correspondences between a plurality of display processing apparatuses and a plurality of touch sensitive processing apparatuses.

The invention claimed is:

1. An electronic system for configuring interconnection parameters between a touch panel and a touch sensitive processing apparatus comprising:
the touch panel including:
M parallel first touch sensitive electrodes covering the touch panel, wherein M is a positive integer equal to or greater than 2; and
a first touch sensitive electrode connector for sequentially bundling the M first touch sensitive electrodes;
a first apparatus connector for sequentially bundling P first circuits that are connected with the M first touch sensitive electrodes and connecting with the first touch sensitive electrode connector, wherein P is a positive integer greater than M; and
the touch sensitive processing apparatus including:
a detecting circuit;
an interconnection network for connecting the P first circuits of the first apparatus connector with the detecting circuit; and
a microprocessor connected with the detecting circuit and the interconnection network and configured for detecting, by the detecting circuit, an impedance value of each of the P first circuits sequentially via the interconnection network to determine that there are M consecutive first circuits in the P first circuits connected with the M consecutive first touch sensitive electrodes based on the impedance values.

2. The electronic system of claim 1, wherein
the touch panel further includes:
N parallel second touch sensitive electrodes covering the touch panel, wherein each first touch sensitive electrode intersects with the N second touch sensitive electrodes to form N touch sensitive sensing areas, and N is a positive integer equal to or greater than 2; and
a second touch sensitive electrode connector for sequentially bundling the N second touch sensitive electrodes,
wherein the electronic system further includes:
a second apparatus connector for sequentially bundling Q second circuits that are connected with the N second touch sensitive electrodes and connecting with the second touch sensitive electrode connector, wherein Q is a positive integer greater than N;
wherein the touch sensitive processing apparatus further includes:

a drive circuit, wherein the interconnection network is further used for connecting the drive circuit with the M consecutive first circuits;
wherein the microprocessor is further configured for having the drive circuit emit a drive signal from any one of the M first circuits via the interconnection network; connecting, by the interconnection network, the Q second circuits with the detecting circuit to detect that there are N consecutive second circuits that sensed the drive signal; and recording that the N consecutive second circuits are connected with the N consecutive second touch sensitive electrodes.

3. The electronic system of claim 2, wherein when a second circuit did not sense the drive signal, and the second circuits before and after this second circuit have detected the drive signal, the microprocessor then determines that the second touch sensitive electrode connected with this second circuit is faulty, and reports information related to this defect to a host of the electronic system.

4. The electronic system of claim 2, further comprising a display screen and a host connected with the display screen, wherein the display screen and the touch panel form a touch screen, wherein the host is configured for:
having the touch screen display a touch point at a touch sensitive area intersecting the Xth first touch sensitive electrode and the Yth second touch sensitive electrode;
having the touch sensitive processing apparatus, via the interconnection network, perform capacitive detection using the M consecutive first touch sensitive electrodes and the N consecutive second touch sensitive electrodes to detect a touch event corresponding to the touch point;
based on the first touch sensitive electrode and the second touch sensitive electrode corresponding to the touch event, and the Xth first touch sensitive electrode and the Yth second touch sensitive electrode corresponding to the touch point, determining how the M consecutive first touch sensitive electrodes and the N consecutive second touch sensitive electrodes are arranged on the touch screen.

5. The electronic system of claim 2, further comprising a display screen and a host connected with the display screen, wherein the display screen and the touch panel form a touch screen, wherein the host is configured for:
having the touch screen display a touch point at a touch sensitive area intersecting the Xth first touch sensitive electrode and the Yth second touch sensitive electrode;
having the touch sensitive processing apparatus, via the interconnection network, perform capacitive detection using the M consecutive first touch sensitive electrodes and the N consecutive second touch sensitive electrodes to detect a touch event corresponding to the touch point;
based on the first touch sensitive electrode and the second touch sensitive electrode corresponding to the touch event, and the Xth first touch sensitive electrode and the Yth second touch sensitive electrode corresponding to the touch point, determining whether the first touch sensitive electrode connector is connected to the first apparatus connector or the second apparatus connector.

6. The electronic system of claim 2, wherein the microprocessor determines whether the first touch sensitive electrode connector is connected to the first apparatus connector or the second apparatus connector based on the numbers of the first touch sensitive electrodes and the second touch sensitive electrodes on the touch panel and the sizes of M and N.

7. The electronic system of claim 2, wherein microprocessor is further configured for determining how the second touch sensitive electrode connector is arranged with respect to the second apparatus connector based on the timing order in which the N consecutive second circuits detected the drive signal.

8. The electronic system of claim 2, wherein the microprocessor is configured for:
calculating a phase shift between each neighboring pair of second circuits of the N consecutive second circuits receiving the drive signal; and
when the phase shift is larger than a phase shift threshold, determining at least one of the two second touch sensitive electrodes connected with the pair of second circuits is faulty and reporting information related to the defect to a host of the electronic system.

9. The electronic system of claim 1, wherein
the touch panel further includes:
N parallel second touch sensitive electrodes covering the touch panel, wherein each first touch sensitive electrode intersects with N second touch sensitive electrodes to form N touch sensitive sensing areas, and N is a positive integer equal to or greater than 2; and
a second touch sensitive electrode connector for sequentially bundling the N second touch sensitive electrodes, wherein the electronic system further includes:
a second apparatus connector for sequentially bundling Q second circuits that are connected with the N second touch sensitive electrodes and connecting with the second touch sensitive electrode connector, wherein Q is a positive integer greater than N wherein the touch sensitive processing apparatus further includes:
a drive circuit, wherein the interconnection network is further used for connecting the drive circuit with the Q second circuits;
wherein the microprocessor is further configured for
having the drive circuit sequentially emit a drive signal from one of the Q second circuits via the interconnection network; when the detecting circuit is able to receive the drive signal from the M first circuits, recording the second circuit emitting the drive signal as being connected to a second touch sensitive electrode.

10. The electronic system of claim 9, wherein when a first circuit did not sense the drive signal, and the first circuits before and after this first circuit have detected the drive signal, the microprocessor then determines that the first touch sensitive electrode connected with this first circuit is faulty, and reports information related to this defect to a host of the electronic system.

11. The electronic system of claim 9, wherein when the P consecutive first circuits did not sense the drive signal, the microprocessor then determines that the second touch sensitive electrode that emitted the drive signal is faulty, and reports information related to this defect to a host of the electronic system.

12. The electronic system of claim 9, further comprising a display screen and a host connected with the display screen, wherein the display screen and the touch panel form a touch screen, wherein the host is configured for:
having the touch screen display a touch point at a touch sensitive area intersecting the Xth first touch sensitive electrode and the Yth second touch sensitive electrode;
having the touch sensitive processing apparatus, via the interconnection network, perform capacitive detection using the M consecutive first touch sensitive electrodes and the N consecutive second touch sensitive electrodes to detect a touch event corresponding to the touch point;
based on the first touch sensitive electrode and the second touch sensitive electrode corresponding to the touch event, and the Xth first touch sensitive electrode and the Yth second touch sensitive electrode corresponding to the touch point, determining how the M consecutive first touch sensitive electrodes and the N consecutive second touch sensitive electrodes are arranged on the touch screen.

13. The electronic system of claim 9, further comprising a display screen and a host connected with the display screen, wherein the display screen and the touch panel form a touch screen, wherein the host is configured for:
having the touch screen display a touch point at a touch sensitive area intersecting the Xth first touch sensitive electrode and the Yth second touch sensitive electrode;
having the touch sensitive processing apparatus, via the interconnection network, perform capacitive detection using the M consecutive first touch sensitive electrodes and the N consecutive second touch sensitive electrodes to detect a touch event corresponding to the touch point;
based on the first touch sensitive electrode and the second touch sensitive electrode corresponding to the touch event, and the Xth first touch sensitive electrode and the Yth second touch sensitive electrode corresponding to the touch point, determining whether the first touch sensitive electrode connector is connected to the first apparatus connector or the second apparatus connector.

14. The electronic system of claim 9, wherein the microprocessor determines whether the first touch sensitive electrode connector is connected to the first apparatus connector or the second apparatus connector based on the numbers of the first touch sensitive electrodes and the second touch sensitive electrodes on the touch panel and the sizes of M and N.

15. The electronic system of claim 9, wherein the microprocessor is further configured for determining how the first touch sensitive electrode connector is arranged with respect to the first apparatus connector based on the timing order in which the M consecutive first circuits detected the drive signal.

16. The electronic system of claim 9, wherein the microprocessor is configured for:
calculating a phase shift between each neighboring pair of first circuits of the M consecutive first circuits receiving the drive signal; and
when the phase shift is larger than a phase shift threshold, determining at least one of the two first touch sensitive electrodes connected with the pair of first circuits is faulty and reporting information related to the defect to a host of the electronic system.

17. The electronic system of claim 1, wherein
the touch panel further includes:
N parallel second touch sensitive electrodes covering the touch panel, wherein each first touch sensitive electrode intersects with N second touch sensitive electrodes to form N touch sensitive sensing areas, and N is a positive integer equal to or greater than 2; and
a second touch sensitive electrode connector for sequentially bundling the N second touch sensitive electrodes, wherein the electronic system further includes:

a second apparatus connector for sequentially bundling Q second circuits that are connected with the N second touch sensitive electrodes and connecting with the second touch sensitive electrode connector, wherein Q is a positive integer greater than N;

wherein the interconnection network is further used for connecting the detecting circuit with the Q second circuits, the microprocessor is further configured for detecting, by the detecting circuit, an impedance value of each of the Q second circuits sequentially via the interconnection network, and determining that there are N consecutive second circuits in the Q second circuits connected to the N second touch sensitive electrodes based on the impedance values.

18. The electronic system of claim 17, wherein when the impedance value of a second circuit among the N consecutive second circuits is greater than a second threshold, the microprocessor determines that the second touch sensitive electrode connected with this second circuit is faulty, and reports information related to the defect to a host of the electronic system.

19. The electronic system of claim 1, wherein when the impedance value of a first circuit among the M consecutive first circuits is greater than a first threshold, the microprocessor determines that the first touch sensitive electrode connected with this first circuit is faulty, and reports information related to the defect to a host of the electronic system.

20. A touch sensitive processing apparatus for configuring interconnection parameters between a touch panel in an electronic system and the touch sensitive processing apparatus, wherein the touch panel includes M parallel first touch sensitive electrodes covering the touch panel, wherein M is a positive integer equal to or greater than 2, and a first touch sensitive electrode connector for sequentially bundling the M first touch sensitive electrodes, wherein the electronic system includes a first apparatus connector for sequentially bundling P first circuits that are connected with the M first touch sensitive electrodes and connecting with the first touch sensitive electrode connector, wherein P is a positive integer greater than M, the touch sensitive processing apparatus includes:
 a detecting circuit;
 an interconnection network for connecting the P first circuits of the first apparatus connector with the detecting circuit; and
 a microprocessor connected with the detecting circuit and the interconnection network and configured for detecting, by the detecting circuit, an impedance value of each of the P first circuits sequentially via the interconnection network to determine that there are M consecutive first circuits in the P first circuits connected with the M consecutive first touch sensitive electrodes based on the impedance values.

21. The touch sensitive processing apparatus of claim 20, wherein
 the touch panel further includes:
 N parallel second touch sensitive electrodes covering the touch panel, wherein each first touch sensitive electrode intersects with the N second touch sensitive electrodes to form N touch sensitive sensing areas, and N is a positive integer equal to or greater than 2; and
 a second touch sensitive electrode connector for sequentially bundling the N second touch sensitive electrodes, wherein the electronic system further includes:
 a second apparatus connector for sequentially bundling Q second circuits that are connected with the N second touch sensitive electrodes and connecting with the second touch sensitive electrode connector, wherein Q is a positive integer greater than N;
wherein the touch sensitive processing apparatus further includes:
 a drive circuit, wherein the interconnection network is further used for connecting the drive circuit with the M consecutive first circuits;
wherein the microprocessor is further configured for having the drive circuit emit a drive signal from any one of the M first circuits via the interconnection network; connecting, by the interconnection network, the Q second circuits with the detecting circuit to detect that there are N consecutive second circuits that sensed the drive signal; and recording that the N consecutive second circuits are connected with the N consecutive second touch sensitive electrodes.

22. The touch sensitive processing apparatus of claim 21, wherein when a second circuit did not sense the drive signal, and the second circuits before and after this second circuit have detected the drive signal, the microprocessor then determines that the second touch sensitive electrode connected with this second circuit is faulty, and reports information related to this defect to a host of the electronic system.

23. The touch sensitive processing apparatus of claim 21, wherein the microprocessor determines whether the first touch sensitive electrode connector is connected to the first apparatus connector or the second apparatus connector based on the numbers of the first touch sensitive electrodes and the second touch sensitive electrodes on the touch panel and the sizes of M and N.

24. The touch sensitive processing apparatus of claim 21, wherein microprocessor is further configured for determining how the second touch sensitive electrode connector is arranged with respect to the second apparatus connector based on the timing order in which the N consecutive second circuits detected the drive signal.

25. The touch sensitive processing apparatus of claim 21, wherein the microprocessor is configured for:
 calculating a phase shift between each neighboring pair of second circuits of the N consecutive second circuits receiving the drive signal; and
 when the phase shift is larger than a phase shift threshold, determining at least one of the two second touch sensitive electrodes connected with the pair of second circuits is faulty and reporting information related to the defect to a host of the electronic system.

26. The touch sensitive processing apparatus of claim 20, wherein
 the touch panel further includes:
 N parallel second touch sensitive electrodes covering the touch panel, wherein each first touch sensitive electrode intersects with N second touch sensitive electrodes to form N touch sensitive sensing areas, and N is a positive integer equal to or greater than 2; and
 a second touch sensitive electrode connector for sequentially bundling the N second touch sensitive electrodes,
wherein the electronic system further includes:
 a second apparatus connector for sequentially bundling Q second circuits that are connected with the N second touch sensitive electrodes and connecting with the second touch sensitive electrode connector, wherein Q is a positive integer greater than N wherein the touch sensitive processing apparatus further includes:

a drive circuit, wherein the interconnection network is further used for connecting the drive circuit with the Q second circuits;

wherein the microprocessor is further configured for having the drive circuit sequentially emit a drive signal from one of the Q second circuits via the interconnection network; when the detecting circuit is able to receive the drive signal from the M first circuits, recording the second circuit emitting the drive signal as being connected to a second touch sensitive electrode.

27. The touch sensitive processing apparatus of claim 26, wherein when a first circuit did not sense the drive signal, and the first circuits before and after this first circuit have detected the drive signal, the microprocessor then determines that the first touch sensitive electrode connected with this first circuit is faulty, and reports information related to this defect to a host of the electronic system.

28. The touch sensitive processing apparatus of claim 26, wherein when the P consecutive first circuits did not sense the drive signal, the microprocessor then determines that the second touch sensitive electrode that emitted the drive signal is faulty, and reports information related to this defect to a host of the electronic system.

29. The touch sensitive processing apparatus of claim 26, wherein the microprocessor determines whether the first touch sensitive electrode connector is connected to the first apparatus connector or the second apparatus connector based on the numbers of the first touch sensitive electrodes and the second touch sensitive electrodes on the touch panel and the sizes of M and N.

30. The touch sensitive processing apparatus of claim 26, wherein the microprocessor is further configured for determining how the first touch sensitive electrode connector is arranged with respect to the first apparatus connector based on the timing order in which the M consecutive first circuits detected the drive signal.

31. The touch sensitive processing apparatus of claim 26, wherein the microprocessor is configured for:

calculating a phase shift between each neighboring pair of first circuits of the M consecutive first circuits receiving the drive signal; and when the phase shift is larger than a phase shift threshold, determining at least one of the two first touch sensitive electrodes connected with the pair of first circuits is faulty and reporting information related to the defect to a host of the electronic system.

32. The touch sensitive processing apparatus of claim 20, wherein the touch panel further includes:

N parallel second touch sensitive electrodes covering the touch panel, wherein each first touch sensitive electrode intersects with N second touch sensitive electrodes to form N touch sensitive sensing areas, and N is a positive integer equal to or greater than 2; and a second touch sensitive electrode connector for sequentially bundling the N second touch sensitive electrodes, wherein the electronic system further includes:

a second apparatus connector for sequentially bundling Q second circuits that are connected with the N second touch sensitive electrodes and connecting with the second touch sensitive electrode connector, wherein Q is a positive integer greater than N;

wherein the interconnection network is further used for connecting the detecting circuit with the Q second circuits, the microprocessor is further configured for detecting, by the detecting circuit, an impedance value of each of the Q second circuits sequentially via the interconnection network, and determining that there are N consecutive second circuits in the Q second circuits connected to the N second touch sensitive electrodes based on the impedance values.

33. The touch sensitive processing apparatus of claim 32, wherein when the impedance value of a second circuit among the N consecutive second circuits is greater than a second threshold, the microprocessor determines that the second touch sensitive electrode connected with this second circuit is faulty, and reports information related to the defect to a host of the electronic system.

34. The touch sensitive processing apparatus of claim 20, wherein when the impedance value of a first circuit among the M consecutive first circuits is greater than a first threshold, the microprocessor determines that the first touch sensitive electrode connected with this first circuit is faulty, and reports information related to the defect to a host of the electronic system.

35. A touch sensitive processing method for configuring interconnection parameters between a touch panel and the touch sensitive processing apparatus in an electronic system, wherein the touch panel includes M parallel first touch sensitive electrodes covering the touch panel, wherein M is a positive integer equal to or greater than 2, and a first touch sensitive electrode connector for sequentially bundling the M first touch sensitive electrodes, wherein the electronic system includes a first apparatus connector for sequentially bundling P first circuits that are connected with the M first touch sensitive electrodes and connecting with the first touch sensitive electrode connector, wherein P is a positive integer greater than M, the touch sensitive processing method comprises:

connecting, by an interconnection network of the touch sensitive processing apparatus, the P first circuits of the first apparatus connector with a detecting circuit of the touch sensitive processing apparatus; and having the detecting circuit detect, via the interconnection network, an impedance value of each of the P first circuits sequentially to determine that there are M consecutive first circuits in the P first circuits connected with the M consecutive first touch sensitive electrodes based on the impedance values.

36. The touch sensitive processing method of claim 35, wherein the touch panel further includes:

N parallel second touch sensitive electrodes covering the touch panel, wherein each first touch sensitive electrode intersects with the N second touch sensitive electrodes to form N touch sensitive sensing areas, and N is a positive integer equal to or greater than 2; and a second touch sensitive electrode connector for sequentially bundling the N second touch sensitive electrodes, wherein the electronic system further includes:

a second apparatus connector for sequentially bundling Q second circuits that are connected with the N second touch sensitive electrodes and connecting with the second touch sensitive electrode connector, wherein Q is a positive integer greater than N;

wherein the touch sensitive processing method further includes:
connecting, via the interconnection network, a drive circuit of the touch sensitive processing apparatus with the M consecutive first circuits;
having the drive circuit emit a drive signal from any one of the M first circuits via the interconnection network;
connecting, by the interconnection network, the Q second circuits with the detecting circuit to detect that there are N consecutive second circuits that sensed the drive signal; and
recording that the N consecutive second circuits are connected with the N consecutive second touch sensitive electrodes.

37. The touch sensitive processing method of claim 36, further comprising:
when a second circuit did not sense the drive signal, and the second circuits before and after this second circuit have detected the drive signal, determining that the second touch sensitive electrode connected with this second circuit is faulty, and reporting information related to this defect to a host of the electronic system.

38. The touch sensitive processing method of claim 36, further comprising:
determining whether the first touch sensitive electrode connector is connected to the first apparatus connector or the second apparatus connector based on the numbers of the first touch sensitive electrodes and the second touch sensitive electrodes on the touch panel and the sizes of M and N.

39. The touch sensitive processing method of claim 36, further comprising:
determining how the second touch sensitive electrode connector is arranged with respect to the second apparatus connector based on the timing order in which the N consecutive second circuits detected the drive signal.

40. The touch sensitive processing method of claim 36, further comprising:
calculating a phase shift between each neighboring pair of second circuits of the N consecutive second circuits receiving the drive signal; and
when the phase shift is larger than a phase shift threshold, determining at least one of the two second touch sensitive electrodes connected with the pair of second circuits is faulty and reporting information related to the defect to a host of the electronic system.

41. The touch sensitive processing method of claim 35, wherein
the touch panel further includes:
N parallel second touch sensitive electrodes covering the touch panel, wherein each first touch sensitive electrode intersects with N second touch sensitive electrodes to form N touch sensitive sensing areas, and N is a positive integer equal to or greater than 2; and
a second touch sensitive electrode connector for sequentially bundling the N second touch sensitive electrodes,
wherein the electronic system further includes:
a second apparatus connector for sequentially bundling Q second circuits that are connected with the N second touch sensitive electrodes and connecting with the second touch sensitive electrode connector, wherein Q is a positive integer greater than N;
wherein the touch sensitive processing method further includes:
connecting, via the interconnection network, a drive circuit of the touch sensitive processing apparatus with the Q second circuits;
having the drive circuit sequentially emit a drive signal from one of the Q second circuits via the interconnection network; and
when the detecting circuit is able to receive the drive signal from the M first circuits, recording the second circuit emitting the drive signal as being connected to a second touch sensitive electrode.

42. The touch sensitive processing method of claim 41, further comprising:
determining whether the first touch sensitive electrode connector is connected to the first apparatus connector or the second apparatus connector based on the numbers of the first touch sensitive electrodes and the second touch sensitive electrodes on the touch panel and the sizes of M and N.

43. The touch sensitive processing method of claim 41, further comprising:
determining how the first touch sensitive electrode connector is arranged with respect to the first apparatus connector based on the timing order in which the M consecutive first circuits detected the drive signal.

44. The touch sensitive processing method of claim 41, further comprising:
calculating a phase shift between each neighboring pair of first circuits of the M consecutive first circuits receiving the drive signal; and
when the phase shift is larger than a phase shift threshold, determining at least one of the two first touch sensitive electrodes connected with the pair of first circuits is faulty and reporting information related to the defect to a host of the electronic system.

45. The touch sensitive processing method of claim 35, wherein
the touch panel further includes:
N parallel second touch sensitive electrodes covering the touch panel, wherein each first touch sensitive electrode intersects with N second touch sensitive electrodes to form N touch sensitive sensing areas, and N is a positive integer equal to or greater than 2; and
a second touch sensitive electrode connector for sequentially bundling the N second touch sensitive electrodes,
wherein the electronic system further includes:
a second apparatus connector for sequentially bundling Q second circuits that are connected with the N second touch sensitive electrodes and connecting with the second touch sensitive electrode connector, wherein Q is a positive integer greater than N;
wherein the touch sensitive processing method further includes:
connecting, via the interconnection network, the detecting circuit with the Q second circuits; and
detecting, by the detecting circuit, an impedance value of each of the Q second circuits sequentially via the interconnection network to determine that there are N consecutive second circuits in the Q second circuits connected to the N second touch sensitive electrodes based on the impedance values.

46. The touch sensitive processing method of claim 45, further comprising:
when the impedance value of a second circuit among the N consecutive second circuits is greater than a second threshold, determining that the second touch sensitive electrode connected with this second circuit is faulty, and reporting information related to the defect to a host of the electronic system.

47. The touch sensitive processing method of claim 45, further comprising:
when a first circuit did not sense the drive signal, and the first circuits before and after this first circuit have detected the drive signal, determining that the first touch sensitive electrode connected with this first circuit is faulty, and reporting information related to this defect to a host of the electronic system.

48. The touch sensitive processing method of claim 45, further comprising:
when the P consecutive first circuits did not sense the drive signal, determining that the second touch sensitive electrode that emitted the drive signal is faulty, and reporting information related to this defect to a host of the electronic system.

49. The touch sensitive processing method of claim 35, further comprising:
when the impedance value of a first circuit among the M consecutive first circuits is greater than a first threshold, determining that the first touch sensitive electrode connected with this first circuit is faulty, and reporting information related to the defect to a host of the electronic system.

* * * * *